(12) United States Patent
Asami

(10) Patent No.: US 7,957,074 B2
(45) Date of Patent: Jun. 7, 2011

(54) IMAGING LENS SYSTEM AND IMAGING APPARATUS USING THE IMAGING LENS SYSTEM

(75) Inventor: Taro Asami, Saitama (JP)

(73) Assignee: Fujinon Corporation, Saitama-shi (JP)

(*) Notice: Subject to any disclaimer, the term of this patent is extended or adjusted under 35 U.S.C. 154(b) by 24 days.

(21) Appl. No.: 12/471,836

(22) Filed: May 26, 2009

(65) Prior Publication Data

US 2009/0296234 A1 Dec. 3, 2009

(30) Foreign Application Priority Data

May 27, 2008 (JP) ................. P2008-137990
May 27, 2008 (JP) ................. P2008-137991

(51) Int. Cl.
G02B 13/18 (2006.01)
G02B 3/02 (2006.01)
G02B 9/62 (2006.01)

(52) U.S. Cl. ...................... 359/713; 359/762
(58) Field of Classification Search .............. 359/753, 359/756, 762, 713

See application file for complete search history.

(56) References Cited

U.S. PATENT DOCUMENTS 7,301,578 B2 * 11/2007 Ohzawa et al. .............. 359/753
2007/0217035 A1 9/2007 Baba

FOREIGN PATENT DOCUMENTS

| JP | 2006-284620 A | 10/2006 |
| JP | 2007-249073 A | 9/2007 |
| JP | 2009-92797 A | 4/2009 |
| JP | 2009-92798 A | 4/2009 |

* cited by examiner

Primary Examiner — Alicia M Harrington
(74) Attorney, Agent, or Firm — Birch, Stewart, Kolasch & Birch, LLP

(57) ABSTRACT

An imaging lens system is provided an includes: in order from the object side, a first lens which has a negative power; a second lens which has a negative power; a third lens; a fourth lens which has a positive power; a fifth lens; and a sixth lens which has a positive power. The first lens is made of glass, and the second to sixth lenses are made of plastic. At least one lens surface of each of the second to sixth lenses is aspheric, and each of the third lens and the fifth lens is made of a material having an Abbe number of 45 or less at the d-line.

18 Claims, 66 Drawing Sheets

FIG. 11A

| | LENS DATA | | | |
|---|---|---|---|---|
| SURFACE NUMBER | Ri | Di | Ndj | νdj |
| 1 | 17.37 | 1.62 | 1.7725 | 49.6 |
| 2 | 4.62 | 2.50 | | |
| *3 | 3.47 | 1.20 | 1.5316 | 55.4 |
| *4 | 1.10 | 1.05 | | |
| *5 | 2.96 | 2.80 | 1.6140 | 25.5 |
| *6 | 8.40 | 0.53 | | |
| St 7 | 0.00 | 0.18 | | |
| *8 | 6.70 | 1.75 | 1.5316 | 55.4 |
| *9 | −0.79 | 0.22 | | |
| *10 | −0.70 | 0.75 | 1.6140 | 25.5 |
| *11 | −1.47 | 0.13 | | |
| *12 | −505.36 | 1.01 | 1.5316 | 55.4 |
| *13 | −2.90 | 1.00 | | |
| 14 | 0.00 | 0.50 | 1.5168 | 64.2 |
| 15 | 0 | 0.51 | | |
| IMAGING PLANE 16 | 0 | 0 | | |

FIG. 11B

| SCHEMATIC SPECIFICATION ||
|---|---|
| Fno | 2.8 |
| ω | 95.6° |
| IH | 2.40 |
| BF(in Air) | 1.84 |
| L(in Air) | 15.58 |
| f | 1.12 |
| f1 | −8.62 |
| f2 | −3.69 |
| f3 | 6.23 |
| f4 | 1.44 |
| f5 | −3.51 |
| f6 | 5.49 |
| f45 | 2.91 |

FIG. 11C

| SURFACE NUMBER | ASPHERIC COEFFICIENT | | | | | | | | | |
|---|---|---|---|---|---|---|---|---|---|---|
| | K | A3 | A4 | A5 | A6 | A7 | A8 | A9 | A10 | A11 |
| 3 | 0.00E+00 | -8.24E-02 | 8.90E-03 | 1.98E-03 | -8.82E-05 | -7.82E-05 | -6.05E-06 | 1.22E-07 | 2.86E-07 | 8.20E-08 |
| 4 | 0.00E+00 | -1.56E-01 | 1.04E-01 | -1.10E-02 | 1.08E-03 | -1.42E-04 | -4.76E-04 | -3.23E-04 | -1.26E-04 | -2.89E-05 |
| 5 | 0.00E+00 | 2.96E-03 | 5.30E-02 | -1.41E-02 | -7.03E-03 | 5.18E-03 | 1.71E-03 | -2.22E-03 | -1.46E-03 | 7.11E-04 |
| 6 | 0.00E+00 | 1.38E-02 | 3.74E-02 | -3.02E-02 | 2.76E-02 | 3.33E-02 | -8.67E-03 | -4.25E-02 | -3.00E-02 | 2.42E-02 |
| 8 | 0.00E+00 | -1.00E-01 | 9.71E-01 | -4.96E+00 | 1.03E+01 | -1.43E+00 | -1.62E+01 | -2.11E+01 | 4.26E+01 | 1.01E+02 |
| 9 | 0.00E+00 | 3.00E-02 | 2.70E-01 | 5.93E-03 | -2.86E-01 | -3.73E-02 | 5.87E-01 | 4.40E-02 | 1.25E-02 | -3.18E-03 |
| 10 | 0.00E+00 | 1.30E-01 | 4.25E-01 | -1.50E-01 | -1.94E-01 | -6.95E-02 | 2.32E-01 | 5.12E-02 | 4.09E-02 | 1.80E-02 |
| 11 | 0.00E+00 | 8.12E-02 | 1.35E-02 | 5.23E-02 | -2.74E-02 | -2.19E-02 | -2.40E-03 | 4.89E-03 | 4.22E-03 | 1.94E-03 |
| 12 | 0.00E+00 | 3.18E-02 | 6.99E-03 | 4.30E-03 | 1.61E-03 | -5.59E-05 | -1.55E-04 | 3.78E-05 | 2.17E-05 | 7.72E-06 |
| 13 | 0.00E+00 | 2.11E-02 | 2.18E-02 | -1.41E-04 | 4.61E-03 | 2.09E-03 | -5.62E-04 | 1.03E-04 | 1.79E-05 | -1.06E-05 |

| SURFACE NUMBER | ASPHERIC COEFFICIENT | | | | | | | | |
|---|---|---|---|---|---|---|---|---|---|
| | A12 | A13 | A14 | A15 | A16 | A17 | A18 | A19 | A20 |
| 3 | -3.03E-08 | 3.29E-09 | 1.37E-09 | 1.53E-10 | 6.16E-12 | -7.35E-12 | -2.00E-12 | -6.42E-13 | -1.11E-13 |
| 4 | 1.80E-05 | 1.09E-06 | -5.55E-07 | -1.18E-06 | -7.08E-07 | 1.92E-07 | 3.65E-07 | 1.96E-07 | -1.08E-07 |
| 5 | 3.13E-04 | 2.35E-05 | -4.08E-05 | -2.75E-05 | -6.25E-06 | 1.05E-06 | 2.00E-06 | 8.23E-07 | -3.61E-07 |
| 6 | 2.39E-02 | -2.48E-02 | -1.53E-03 | 2.33E-02 | 1.68E-03 | 1.62E-03 | 1.62E-03 | -3.17E-03 | -9.63E-03 |
| 8 | -5.66E+01 | -1.98E+02 | -6.98E+01 | 1.60E+02 | -1.98E+02 | 1.29E+03 | -1.71E+02 | -2.51E+03 | 1.66E+03 |
| 9 | -2.26E-03 | -5.65E-05 | -1.45E-04 | -2.70E-03 | -3.84E-03 | -2.19E-03 | 1.09E-03 | 2.61E-03 | -2.90E-04 |
| 10 | 1.49E-03 | -6.83E-03 | -8.12E-03 | -5.60E-03 | -2.13E-03 | 6.37E-04 | 1.73E-03 | 1.21E-03 | -6.02E-04 |
| 11 | 2.73E-04 | -3.61E-04 | -3.91E-04 | -2.06E-04 | -5.37E-05 | 3.53E-05 | 4.90E-05 | 2.28E-05 | -1.69E-05 |
| 12 | -5.13E-08 | -3.12E-06 | -3.65E-06 | | | | | | |
| 13 | -1.30E-05 | -8.81E-06 | -4.68E-06 | | | | | | |

FIG. 11D

| ABSOLUTE VALUE OF RADIUS OF CURVATURE IN PERIPHERAL PORTION OF EFFECTIVE DIAMETER | | |
|---|---|---|
| SURFACE NUMBER | SIGN | ABSOLUTE VALUE OF RADIUS OF CURVATURE |
| 3 | X3-P3 | 17.19 |
| 4 | X4-P4 | 3.07 |
| 5 | X5-P5 | 2.46 |
| 6 | X6-P6 | 4.50 |
| 8 | X8-P8 | 167.73 |
| 9 | X9-P9 | 1.36 |
| 10 | X10-P10 | 2.40 |
| 11 | X11-P11 | 134.25 |
| 12 | X12-P12 | 3.08 |
| 13 | X13-P13 | 3.88 |

FIG. 12A

| LENS DATA | | | | |
|---|---|---|---|---|
| SURFACE NUMBER | Ri | Di | Ndj | $\nu$ dj |
| 1 | 18.33 | 1.45 | 1.7550 | 52.3 |
| 2 | 4.56 | 2.40 | | |
| *3 | 2.80 | 1.20 | 1.5316 | 55.4 |
| *4 | 1.13 | 1.05 | | |
| *5 | 4.43 | 3.70 | 1.5836 | 30.2 |
| *6 | 19.32 | 0.53 | | |
| St 7 | 0.00 | 0.18 | | |
| *8 | 6.20 | 1.75 | 1.5316 | 55.4 |
| *9 | −0.81 | 0.22 | | |
| *10 | −0.69 | 0.75 | 1.6140 | 25.5 |
| *11 | −1.65 | 0.13 | | |
| *12 | 10.44 | 1.00 | 1.5316 | 55.4 |
| *13 | −3.18 | 1.00 | | |
| 14 | 0.00 | 0.50 | 1.5168 | 64.2 |
| 15 | 0 | 0.67 | | |
| IMAGING PLANE 16 | 0 | 0 | | |

FIG. 12B

| SCHEMATIC SPECIFICATION ||
|---|---|
| Fno | 2.8 |
| ω | 95.4° |
| IH | 2.40 |
| BF(in Air) | 2.00 |
| L(in Air) | 16.37 |
| f | 1.12 |
| f1 | −8.42 |
| f2 | −4.75 |
| f3 | 9.03 |
| f4 | 1.47 |
| f5 | −2.74 |
| f6 | 4.70 |
| f45 | 3.49 |

FIG. 12C

| SURFACE NUMBER | K | A3 | A4 | A5 | A6 | A7 | A8 | A9 | A10 | A11 |
|---|---|---|---|---|---|---|---|---|---|---|
| | | | | | ASPHERIC COEFFICIENT | | | | | |
| 3 | 0.00E+00 | -8.69E-02 | 8.23E-03 | 1.87E-03 | -1.01E-04 | -7.88E-05 | -5.82E-06 | 2.37E-07 | 3.21E-07 | 9.02E-08 |
| 4 | 0.00E+00 | -1.67E-01 | 1.05E-01 | -9.61E-03 | 1.63E-03 | 7.21E-05 | -3.91E-04 | -2.91E-04 | -1.15E-04 | -2.66E-05 |
| 5 | 0.00E+00 | 9.95E-03 | 4.83E-02 | -1.43E-02 | -3.94E-03 | 5.21E-03 | 1.65E-03 | -2.26E-03 | -1.48E-03 | 7.08E-04 |
| 6 | 0.00E+00 | 8.92E-03 | 1.03E-02 | -3.39E-02 | 2.64E-02 | 3.10E-02 | -7.49E-03 | -3.78E-02 | -2.52E-02 | 2.62E-02 |
| 8 | 0.00E+00 | -9.74E-02 | 9.35E-01 | -4.95E-01 | 1.03E+00 | -1.45E+00 | -1.62E+01 | -2.11E+01 | 4.26E+01 | 1.01E+02 |
| 9 | 0.00E+00 | 2.13E-02 | 2.51E-01 | -5.86E-04 | -2.84E-01 | -3.22E-01 | 6.33E-02 | 4.65E-02 | 1.28E-02 | -4.36E-03 |
| 10 | 0.00E+00 | 1.57E-01 | 4.32E-01 | -1.49E-01 | -1.93E-01 | -6.99E-02 | 2.23E-02 | 5.03E-02 | 4.03E-02 | 1.77E-02 |
| 11 | 0.00E+00 | 8.87E-02 | 2.15E-02 | 5.88E-02 | -2.56E-02 | -2.31E-02 | -4.28E-03 | 3.85E-03 | 3.78E-03 | 1.89E-03 |
| 12 | 0.00E+00 | 4.22E-03 | -3.03E-03 | 2.15E-03 | 2.25E-03 | 6.07E-04 | 2.70E-04 | | | |
| 13 | 0.00E+00 | 1.48E-02 | 1.29E-02 | 2.73E-04 | 1.16E-03 | 1.54E-03 | 8.41E-04 | | | |

| SURFACE NUMBER | A12 | A13 | A14 | A15 | A16 | A17 | A18 | A19 | A20 |
|---|---|---|---|---|---|---|---|---|---|
| | | | | | ASPHERIC COEFFICIENT | | | | |
| 3 | -2.88E-08 | 3.48E-09 | 1.36E-09 | 1.37E-10 | 1.59E-13 | -8.58E-12 | -1.97E-12 | -4.32E-13 | 2.98E-14 |
| 4 | 1.79E-05 | 6.15E-07 | -8.99E-07 | -1.36E-06 | -7.88E-07 | 1.64E-07 | 3.57E-07 | 2.05E-07 | -1.03E-07 |
| 5 | 3.16E-04 | 2.60E-05 | -3.93E-05 | -2.67E-05 | -5.92E-06 | 1.15E-06 | 2.01E-06 | 8.12E-07 | -3.76E-07 |
| 6 | 2.37E-02 | -2.76E-02 | -5.62E-03 | 1.85E-02 | -1.19E-03 | 1.81E-04 | 2.82E-03 | 2.79E-04 | -4.45E-03 |
| 8 | -5.65E+01 | -1.98E+02 | -6.96E+01 | 1.60E+02 | -1.98E+02 | 1.29E+02 | -1.72E+02 | -2.52E+03 | 1.66E+03 |
| 9 | -3.96E-03 | -1.57E-03 | -1.11E-03 | -3.08E-03 | -3.76E-03 | -1.88E-03 | 1.45E-03 | 2.86E-03 | -2.04E-04 |
| 10 | 1.42E-03 | -6.76E-03 | -8.01E-03 | -5.49E-03 | -2.05E-03 | 6.85E-04 | 1.75E-03 | 1.21E-03 | -6.16E-04 |
| 11 | 3.37E-04 | -2.79E-04 | -3.31E-04 | -1.77E-04 | -4.70E-05 | 3.12E-05 | 4.30E-05 | 2.07E-05 | -1.47E-05 |

FIG. 12D

| ABSOLUTE VALUE OF RADIUS OF CURVATURE IN PERIPHERAL PORTION OF EFFECTIVE DIAMETER | | |
|---|---|---|
| SURFACE NUMBER | SIGN | ABSOLUTE VALUE OF RADIUS OF CURVATURE |
| 3 | X3−P3 | 15.96042 |
| 4 | X4−P4 | 2.776608 |
| 5 | X5−P5 | 2.716878 |
| 6 | X6−P6 | 17.22123 |
| 8 | X8−P8 | 16.30051 |
| 9 | X9−P9 | 1.335133 |
| 10 | X10−P10 | 2.428253 |
| 11 | X11−P11 | 62.05087 |
| 12 | X12−P12 | 3.492132 |
| 13 | X13−P13 | 4.258828 |

FIG. 13A

| LENS DATA | | | | |
|---|---|---|---|---|
| SURFACE NUMBER | Ri | Di | Ndj | νdj |
| 1 | 17.45 | 1.55 | 1.7725 | 49.6 |
| 2 | 4.40 | 2.44 | | |
| *3 | 3.80 | 1.18 | 1.5316 | 55.4 |
| *4 | 0.93 | 1.00 | | |
| *5 | 2.12 | 2.81 | 1.6140 | 25.5 |
| *6 | 11.64 | 0.53 | | |
| St 7 | 0.00 | 0.18 | | |
| *8 | 7.89 | 1.75 | 1.5316 | 55.4 |
| *9 | −0.84 | 0.22 | | |
| *10 | −0.70 | 0.75 | 1.6140 | 25.5 |
| *11 | −1.35 | 0.13 | | |
| *12 | −5490.32 | 1.00 | 1.5316 | 55.4 |
| *13 | −3.00 | 1.00 | | |
| 14 | 0.00 | 0.50 | 1.5168 | 64.2 |
| 15 | 0 | 0.68 | | |
| IMAGING PLANE 16 | 0 | 0 | | |

FIG. 13B

| SCHEMATIC SPECIFICATION ||
|---|---|
| Fno | 2.8 |
| ω | 94.9° |
| IH | 2.40 |
| BF(in Air) | 2.01 |
| L(in Air) | 15.55 |
| f | 1.14 |
| f1 | −8.03 |
| f2 | −2.72 |
| f3 | 3.80 |
| f4 | 1.60 |
| f5 | −4.24 |
| f6 | 5.64 |
| f45 | 3.26 |

FIG. 13C

| SURFACE NUMBER | K | A3 | A4 | A5 | ASPHERIC COEFFICIENT A6 | A7 | A8 | A9 | A10 | A11 |
|---|---|---|---|---|---|---|---|---|---|---|
| 3 | 0.00E+00 | -8.06E-02 | 9.13E-03 | 2.01E-03 | -8.53E-05 | -7.82E-05 | -6.16E-06 | 7.60E-08 | 2.73E-07 | 7.86E-08 |
| 4 | 0.00E+00 | -1.58E-01 | 1.03E-01 | -1.16E-02 | 8.41E-04 | -2.30E-04 | -5.06E-04 | -3.33E-04 | -1.28E-04 | -2.95E-05 |
| 5 | 0.00E+00 | -6.76E-03 | 5.14E-02 | -1.43E-02 | -6.93E-04 | 5.18E-03 | 1.71E-03 | -2.23E-03 | -1.47E-03 | 7.08E-04 |
| 6 | 0.00E+00 | 4.39E-03 | 2.95E-02 | -3.45E-02 | 2.66E-02 | 3.37E-02 | -8.16E-03 | -4.24E-02 | -3.03E-02 | 2.35E-02 |
| 8 | 0.00E+00 | -1.02E-01 | 9.70E-01 | -4.96E+00 | 1.03E+01 | -1.43E+00 | -1.62E+01 | -2.11E+01 | 4.26E+01 | 1.01E+02 |
| 9 | 0.00E+00 | 3.16E-02 | 2.69E-01 | 5.02E-03 | -2.87E-02 | -3.79E-02 | 5.83E-02 | 4.37E-02 | 1.24E-02 | -3.24E-03 |
| 10 | 0.00E+00 | 1.30E-01 | 4.25E-01 | -1.50E-01 | -1.94E-01 | -6.97E-02 | 2.30E-02 | 5.10E-02 | 4.07E-02 | 1.78E-02 |
| 11 | 0.00E+00 | 7.99E-02 | 1.23E-02 | 5.13E-02 | -2.80E-02 | -2.23E-02 | -2.55E-03 | 4.83E-03 | 4.20E-03 | 1.93E-03 |
| 12 | 0.00E+00 | 3.15E-02 | 7.50E-03 | 4.55E-03 | 1.63E-03 | -8.78E-05 | -1.84E-04 | 2.22E-05 | 1.52E-05 | 5.74E-06 |
| 13 | 0.00E+00 | 2.54E-02 | 2.28E-02 | -2.41E-04 | 4.45E-03 | 2.05E-03 | -5.50E-04 | 1.21E-04 | 2.78E-05 | -7.10E-06 |

| SURFACE NUMBER | A12 | A13 | A14 | A15 | ASPHERIC COEFFICIENT A16 | A17 | A18 | A19 | A20 |
|---|---|---|---|---|---|---|---|---|---|
| 3 | -3.11E-08 | 3.14E-09 | 1.35E-09 | 1.51E-10 | 7.14E-12 | -6.45E-12 | -1.67E-12 | -5.37E-13 | -7.90E-14 |
| 4 | 1.79E-05 | 1.15E-06 | -4.86E-07 | -1.13E-06 | -6.83E-07 | 2.06E-07 | 3.73E-07 | 2.00E-07 | -1.06E-07 |
| 5 | 3.12E-04 | 2.30E-05 | -4.10E-05 | -2.75E-05 | -6.26E-06 | 1.05E-06 | 2.00E-06 | 8.24E-07 | -3.60E-07 |
| 6 | 2.32E-02 | -2.54E-02 | -2.13E-03 | 2.30E-02 | 1.65E-03 | 1.79E-03 | 2.31E-03 | -2.26E-03 | -8.24E-03 |
| 8 | -5.66E+01 | -1.98E+02 | -6.98E+01 | 1.60E+02 | -1.98E+02 | 1.29E+02 | -1.71E+02 | -2.51E+03 | 1.66E+03 |
| 9 | -2.25E-03 | -3.32E-06 | -7.52E-05 | -2.63E-03 | -3.79E-03 | -2.17E-03 | 1.08E-03 | 2.56E-03 | -3.72E-04 |
| 10 | 1.37E-03 | -6.92E-03 | -8.18E-03 | -5.63E-03 | -2.14E-03 | 6.54E-04 | 1.75E-03 | 1.23E-03 | -5.66E-04 |
| 11 | 2.76E-04 | -3.57E-04 | -3.87E-04 | -2.03E-04 | -5.18E-05 | 3.64E-05 | 4.95E-05 | 2.28E-05 | -1.72E-05 |
| 12 | -1.78E-07 | -2.67E-06 | -3.13E-06 | -4.45E-11 | -2.84E-11 | -1.78E-11 | -1.56E-13 | -9.20E-14 | -5.37E-14 |
| 13 | -1.28E-05 | -9.84E-06 | -5.89E-06 | 2.86E-11 | 1.65E-11 | 9.52E-12 | 7.88E-14 | 4.43E-14 | 2.50E-14 |

FIG. 13D

| SURFACE NUMBER | SIGN | ABSOLUTE VALUE OF RADIUS OF CURVATURE IN PERIPHERAL PORTION OF EFFECTIVE DIAMETER |
|---|---|---|
| | | ABSOLUTE VALUE OF RADIUS OF CURVATURE |
| 3 | X3-P3 | 21.48152 |
| 4 | X4-P4 | 2.31229 |
| 5 | X5-P5 | 2.262078 |
| 6 | X6-P6 | 7.966767 |
| 8 | X8-P8 | 18.58627 |
| 9 | X9-P9 | 1.391461 |
| 10 | X10-P10 | 2.57103 |
| 11 | X11-P11 | 12.61333 |
| 12 | X12-P12 | 3.059846 |
| 13 | X13-P13 | 3.454808 |

FIG. 14A

| | LENS DATA | | | |
|---|---|---|---|---|
| SURFACE NUMBER | Ri | Di | Ndj | $\nu$ dj |
| 1 | 12.59 | 1.93 | 1.7725 | 49.6 |
| 2 | 4.25 | 2.46 | | |
| *3 | 3.42 | 0.84 | 1.5316 | 55.4 |
| *4 | 1.05 | 0.95 | | |
| *5 | 3.56 | 3.20 | 1.6140 | 25.5 |
| *6 | 10.45 | 0.69 | | |
| St 7 | 0.00 | 0.08 | | |
| *8 | 5.76 | 1.70 | 1.5316 | 55.4 |
| *9 | −0.78 | 0.22 | | |
| *10 | −0.72 | 0.67 | 1.5836 | 30.2 |
| *11 | −1.45 | 0.13 | | |
| *12 | 11.90 | 1.00 | 1.5316 | 55.4 |
| *13 | −8.67 | 1.00 | | |
| 14 | 0.00 | 0.50 | 1.5168 | 64.2 |
| 15 | 0 | 0.68 | | |
| IMAGING PLANE 16 | 0 | 0 | | |

FIG. 14B

| SCHEMATIC SPECIFICATION ||
|---|---:|
| Fno | 2.8 |
| ω | 96.1° |
| IH | 2.40 |
| BF(in Air) | 2.01 |
| L(in Air) | 15.89 |
| f | 1.17 |
| f1 | −9.22 |
| f2 | −3.27 |
| f3 | 7.46 |
| f4 | 1.48 |
| f5 | −3.66 |
| f6 | 9.60 |
| f45 | 2.81 |

FIG. 14C

| SURFACE NUMBER | ASPHERIC COEFFICIENT | | | | | | | | | |
|---|---|---|---|---|---|---|---|---|---|---|
| | K | A3 | A4 | A5 | A6 | A7 | A8 | A9 | A10 | A11 |
| 3 | 0.00E+00 | -8.43E-02 | 8.73E-03 | 1.95E-03 | -9.16E-05 | -7.83E-05 | -5.94E-06 | 1.75E-07 | 3.03E-07 | 8.64E-08 |
| 4 | 0.00E+00 | -1.50E-01 | 1.05E-01 | -1.09E-02 | 1.11E-03 | -1.24E-04 | -4.67E-04 | -3.19E-04 | -1.24E-04 | -2.85E-05 |
| 5 | 0.00E+00 | -6.98E-04 | 5.26E-02 | -1.41E-02 | -7.54E-03 | 5.12E-03 | 1.67E-03 | -2.24E-03 | -1.47E-03 | 7.09E-04 |
| 6 | 0.00E+00 | 7.98E-03 | 3.04E-02 | -3.67E-02 | 2.27E-02 | 3.24E-02 | -5.08E-03 | -3.64E-02 | -2.42E-02 | 2.76E-02 |
| 8 | 0.00E+00 | -9.86E-02 | 9.64E-01 | -4.97E-01 | 1.03E+00 | -1.43E+00 | -1.62E+01 | -2.11E+01 | 4.26E+01 | 1.01E+02 |
| 9 | 0.00E+00 | 3.39E-02 | 2.67E-01 | 3.37E-03 | -2.88E-01 | -3.88E-02 | 5.76E-02 | 4.32E-02 | 1.20E-02 | -3.51E-03 |
| 10 | 0.00E+00 | 1.31E-01 | 4.26E-01 | -1.50E-01 | -1.94E-01 | -6.98E-02 | 2.29E-02 | 5.10E-02 | 4.09E-02 | 1.80E-02 |
| 11 | 0.00E+00 | 8.20E-02 | 1.40E-02 | 5.31E-02 | -2.65E-02 | -2.12E-02 | -1.91E-03 | 5.19E-03 | 4.38E-03 | 2.01E-03 |
| 12 | 0.00E+00 | 3.46E-02 | 7.82E-03 | 4.26E-03 | 1.36E-03 | -2.12E-04 | -2.37E-04 | 3.27E-07 | 6.61E-06 | 3.18E-06 |
| 13 | 0.00E+00 | 3.33E-02 | 2.06E-02 | -1.60E-03 | 3.69E-03 | 1.66E-03 | -7.45E-04 | 3.42E-05 | -4.01E-06 | -1.42E-05 |

| SURFACE NUMBER | ASPHERIC COEFFICIENT | | | | | | | | |
|---|---|---|---|---|---|---|---|---|---|
| | A12 | A13 | A14 | A15 | A16 | A17 | A18 | A19 | A20 |
| 3 | -2.93E-08 | 3.46E-09 | 1.39E-09 | 1.52E-10 | 4.51E-12 | -7.72E-12 | -1.94E-12 | -5.26E-13 | -3.22E-14 |
| 4 | 1.80E-05 | 1.05E-06 | -5.95E-07 | -1.20E-06 | -7.20E-07 | 1.87E-07 | 3.64E-07 | 1.96E-07 | -1.08E-07 |
| 5 | 3.14E-04 | 2.43E-05 | -4.03E-05 | -2.72E-05 | -6.11E-06 | 1.10E-06 | 2.01E-06 | 8.24E-07 | -3.64E-07 |
| 6 | 2.43E-02 | -2.76E-02 | -6.08E-03 | 1.68E-02 | -3.92E-03 | -2.50E-03 | 1.39E-03 | 2.17E-04 | -2.71E-04 |
| 8 | -5.66E+01 | -1.98E+02 | -6.98E+01 | 1.60E+02 | -1.98E+02 | 1.29E+03 | -1.70E+02 | -2.51E+03 | 1.66E+03 |
| 9 | -2.43E-03 | -1.25E-04 | -1.65E-04 | -2.71E-03 | -3.86E-03 | -2.23E-03 | 1.02E-03 | 2.51E-03 | -4.10E-04 |
| 10 | 1.51E-03 | -6.81E-03 | -8.10E-03 | -5.60E-03 | -2.14E-03 | 6.13E-04 | 1.70E-03 | 1.16E-03 | -6.57E-04 |
| 11 | 3.02E-04 | -3.55E-04 | -3.95E-04 | -2.13E-04 | -6.16E-05 | 2.84E-05 | 4.33E-05 | 1.84E-05 | -2.02E-05 |
| 12 | -1.44E-07 | -1.72E-06 | -2.05E-06 | | | | | | |
| 13 | -1.08E-05 | -5.59E-06 | -2.00E-06 | | | | | | |

FIG. 14D

| SURFACE NUMBER | SIGN | ABSOLUTE VALUE OF RADIUS OF CURVATURE IN PERIPHERAL PORTION OF EFFECTIVE DIAMETER |
|---|---|---|
| | | ABSOLUTE VALUE OF RADIUS OF CURVATURE |
| 3 | \|X3-P3\| | 14.85897 |
| 4 | \|X4-P4\| | 3.131419 |
| 5 | \|X5-P5\| | 3.122846 |
| 6 | \|X6-P6\| | 7.729161 |
| 8 | \|X8-P8\| | 1078.851 |
| 9 | \|X9-P9\| | 1.301838 |
| 10 | \|X10-P10\| | 2.258105 |
| 11 | \|X11-P11\| | 95.05732 |
| 12 | \|X12-P12\| | 2.984739 |
| 13 | \|X13-P13\| | 3.376045 |

FIG. 15A

| LENS DATA | | | | |
|---|---|---|---|---|
| SURFACE NUMBER | Ri | Di | Ndj | νdj |
| 1 | 14.28 | 1.00 | 1.7725 | 49.6 |
| 2 | 4.42 | 2.19 | | |
| *3 | 3.34 | 0.63 | 1.5316 | 55.4 |
| *4 | 1.03 | 0.90 | | |
| *5 | 3.28 | 2.72 | 1.6140 | 25.5 |
| *6 | 14.63 | 0.50 | | |
| St 7 | 0.00 | 0.09 | | |
| *8 | 6.57 | 1.48 | 1.5316 | 55.4 |
| *9 | −0.74 | 0.16 | | |
| *10 | −0.67 | 0.52 | 1.6140 | 25.5 |
| *11 | −1.66 | 0.13 | | |
| *12 | 14.19 | 1.01 | 1.5316 | 55.4 |
| *13 | −2.74 | 1.00 | | |
| 14 | 0.00 | 0.50 | 1.5168 | 64.2 |
| 15 | 0 | 0.67 | | |
| IMAGING PLANE 16 | 0 | 0 | | |

FIG. 15B

| SCHEMATIC SPECIFICATION ||
|---|---|
| Fno | 2.8 |
| ω | 95.9° |
| IH | 2.40 |
| BF(in Air) | 2.00 |
| L(in Air) | 13.34 |
| f | 1.11 |
| f1 | −8.67 |
| f2 | −3.09 |
| f3 | 6.32 |
| f4 | 1.34 |
| f5 | −2.31 |
| f6 | 4.42 |
| f45 | 3.25 |

FIG. 15C

| SURFACE NUMBER | ASPHERIC COEFFICIENT | | | | | | | | |
|---|---|---|---|---|---|---|---|---|---|
| SURF | K / KA | A3 / RB3 | A4 / RB4 | A5 / RB5 | A6 / RB6 | A7 / RB7 | A8 / RB8 | A9 / RB9 | A10 / RB10 | A11 / RB11 |
| 3 | 0.00E+00 | -8.38E-02 | 8.82E-03 | 1.97E-03 | -8.83E-05 | -7.76E-05 | -5.77E-06 | 2.21E-07 | 3.16E-07 | 8.99E-08 |
| 4 | 0.00E+00 | -1.39E-01 | 1.05E-01 | -1.13E-02 | 9.39E-04 | -1.93E-04 | -4.97E-04 | -3.33E-04 | -1.30E-04 | -3.12E-05 |
| 5 | 0.00E+00 | -2.51E-03 | 5.67E-02 | -1.26E-02 | -3.16E-04 | 5.27E-03 | 1.73E-03 | -2.21E-03 | -1.46E-03 | 7.13E-04 |
| 6 | 0.00E+00 | 7.68E-03 | 5.03E-02 | -2.03E-02 | 3.30E-02 | 3.72E-02 | -4.84E-03 | -3.87E-02 | -2.72E-02 | 2.54E-02 |
| 8 | 0.00E+00 | -9.05E-02 | 9.69E-01 | -4.95E+00 | 1.03E+01 | -1.42E+01 | -1.62E+01 | -2.12E+01 | 4.25E+01 | 1.01E+02 |
| 9 | 0.00E+00 | 3.96E-02 | 2.69E-01 | 1.62E-04 | -2.93E-01 | -4.30E-01 | 5.44E-02 | 4.12E-02 | 1.10E-02 | -3.71E-03 |
| 10 | 0.00E+00 | 1.23E-01 | 4.25E-01 | -1.47E-01 | -1.91E-01 | -6.76E-02 | 2.46E-02 | 5.25E-02 | 4.22E-02 | 1.93E-02 |
| 11 | 0.00E+00 | 8.53E-02 | 1.53E-02 | 5.27E-02 | -2.64E-02 | -2.06E-02 | -1.16E-02 | 5.73E-03 | 4.67E-03 | 2.10E-03 |
| 12 | 0.00E+00 | 3.26E-02 | 6.66E-03 | 3.89E-03 | 1.30E-03 | -1.70E-04 | -1.71E-04 | 4.77E-05 | 3.11E-05 | 1.24E-05 |
| 13 | 0.00E+00 | 2.35E-02 | 1.91E-02 | -1.95E-03 | 4.46E-03 | 2.34E-03 | -4.01E-04 | 1.61E-04 | 2.84E-05 | -1.31E-05 |

| SURFACE NUMBER | ASPHERIC COEFFICIENT | | | | | | | | |
|---|---|---|---|---|---|---|---|---|---|
| | A12 | A13 | A14 | A15 | A16 | A17 | A18 | A19 | A20 |
| 3 | -2.85E-08 | 3.67E-09 | 1.43E-09 | 1.55E-10 | 3.18E-12 | -8.81E-12 | -2.56E-12 | -8.18E-13 | -1.54E-13 |
| 4 | 1.68E-05 | 5.75E-07 | -7.77E-07 | -1.26E-06 | -7.37E-07 | 1.85E-07 | 3.67E-07 | 2.00E-07 | -1.05E-07 |
| 5 | 3.15E-04 | 2.43E-05 | -4.05E-05 | -2.73E-05 | -6.21E-06 | 1.05E-06 | 1.99E-06 | 8.17E-07 | -3.65E-07 |
| 6 | 2.37E-02 | -2.69E-02 | -4.85E-03 | 2.02E-02 | -1.09E-02 | -3.49E-03 | 1.63E-03 | -1.19E-03 | -4.60E-03 |
| 8 | -5.67E+01 | -1.98E+02 | -6.91E+01 | 1.62E+02 | 1.97E+02 | 1.29E+02 | -1.72E+02 | -2.52E+03 | 1.66E+03 |
| 9 | -2.15E-03 | 3.70E-04 | 3.43E-04 | -2.29E-03 | -3.56E-03 | -1.98E-03 | 1.34E-03 | 3.06E-03 | 5.35E-04 |
| 10 | 2.77E-03 | -5.69E-03 | -7.20E-03 | -4.95E-03 | -1.78E-03 | 6.75E-04 | 1.46E-03 | 6.40E-04 | -1.43E-03 |
| 11 | 2.89E-04 | -4.09E-04 | -4.54E-04 | -2.60E-04 | -9.14E-05 | 1.34E-05 | 3.95E-05 | 2.19E-05 | -1.24E-05 |
| 12 | 1.29E-06 | -3.31E-06 | -4.33E-06 | | | | | | |
| 13 | -1.65E-05 | -1.07E-05 | -5.16E-06 | | | | | | |

FIG. 15D

| ABSOLUTE VALUE OF RADIUS OF CURVATURE IN PERIPHERAL PORTION OF EFFECTIVE DIAMETER | | |
|---|---|---|
| SURFACE NUMBER | SIGN | ABSOLUTE VALUE OF RADIUS OF CURVATURE |
| 3 | X3-P3 | 21.53977 |
| 4 | X4-P4 | 2.908583 |
| 5 | X5-P5 | 2.37204 |
| 6 | X6-P6 | 3.519853 |
| 8 | X8-P8 | 24.06417 |
| 9 | X9-P9 | 1.228148 |
| 10 | X10-P10 | 1.907787 |
| 11 | X11-P11 | 28.32554 |
| 12 | X12-P12 | 2.913402 |
| 13 | X13-P13 | 4.092271 |

FIG. 16A

| LENS DATA | | | | |
|---|---|---|---|---|
| SURFACE NUMBER | Ri | Di | Ndj | $\nu$ dj |
| 1 | 16.75 | 1.42 | 1.7550 | 52.3 |
| 2 | 4.09 | 2.61 | | |
| *3 | 2.97 | 1.20 | 1.5316 | 55.4 |
| *4 | 1.50 | 1.05 | | |
| *5 | 7.42 | 3.41 | 1.6140 | 25.5 |
| *6 | 6.34 | 0.53 | | |
| St 7 | 0.00 | 0.18 | | |
| *8 | 6.20 | 1.75 | 1.5316 | 55.4 |
| *9 | −1.01 | 0.22 | | |
| *10 | −0.69 | 0.75 | 1.6140 | 25.5 |
| *11 | −1.63 | 0.13 | | |
| *12 | 10.44 | 1.00 | 1.5316 | 55.4 |
| *13 | −2.31 | 2.00 | | |
| 14 | 0.00 | 0.50 | 1.5168 | 64.2 |
| 15 | 0 | 0.69 | | |
| IMAGING PLANE 16 | 0 | 0 | | |

FIG. 16B

| SCHEMATIC SPECIFICATION | |
|---|---|
| Fno | 2.8 |
| ω | 95.6° |
| IH | 2.40 |
| BF(in Air) | 3.02 |
| L(in Air) | 17.28 |
| f | 1.20 |
| f1 | −7.54 |
| f2 | −8.03 |
| f3 | 361.63 |
| f4 | 1.78 |
| f5 | −2.80 |
| f6 | 3.66 |
| f45 | 5.42 |

FIG. 16C

| SURFACE NUMBER | ASPHERIC COEFFICIENT | | | | | | | | | |
|---|---|---|---|---|---|---|---|---|---|---|
| | K | A3 | A4 | A5 | A6 | A7 | A8 | A9 | A10 | A11 |
| 3 | 0.00E+00 | -8.46E-02 | 8.31E-03 | 1.89E-03 | -9.69E-05 | -7.82E-05 | -5.70E-06 | 2.59E-07 | 3.26E-07 | 9.16E-08 |
| 4 | 0.00E+00 | -1.76E-01 | 1.09E-01 | -8.02E-03 | 2.25E-03 | 2.81E-04 | -3.30E-04 | -2.76E-04 | -1.13E-04 | -2.67E-05 |
| 5 | 0.00E+00 | 1.71E-02 | 4.88E-02 | -1.45E-02 | -6.96E-03 | 5.06E-03 | 1.59E-03 | -2.28E-03 | -1.48E-03 | 7.09E-04 |
| 6 | 0.00E+00 | 9.11E-03 | -3.90E-03 | -3.98E-02 | 2.86E-02 | 3.04E-02 | -1.23E-02 | -4.28E-02 | -2.76E-02 | 2.70E-02 |
| 8 | 0.00E+00 | -9.54E-02 | 9.38E-01 | -4.95E+00 | 1.02E+01 | -1.44E+01 | -1.61E+01 | -2.09E+01 | 4.27E+01 | 1.01E+02 |
| 9 | 0.00E+00 | 2.69E-02 | 2.27E-01 | -1.27E-02 | -2.84E-01 | -2.99E-01 | 6.37E-02 | 4.54E-02 | 1.16E-02 | -4.79E-03 |
| 10 | 0.00E+00 | 1.49E-01 | 4.38E-01 | -1.48E-01 | -1.98E-01 | -7.47E-02 | 1.96E-02 | 4.92E-02 | 4.00E-02 | 1.77E-02 |
| 11 | 0.00E+00 | 7.44E-02 | 2.65E-02 | 5.88E-02 | -2.57E-02 | -2.31E-02 | -5.81E-03 | 3.85E-03 | 3.78E-03 | 1.89E-03 |
| 12 | 0.00E+00 | 7.46E-03 | -3.46E-03 | 4.12E-03 | 1.47E-03 | 5.87E-05 | 4.02E-04 | | | |
| 13 | 0.00E+00 | 1.48E-02 | 1.29E-02 | 2.71E-04 | 1.16E-03 | 1.55E-03 | 8.42E-04 | | | |

| SURFACE NUMBER | ASPHERIC COEFFICIENT | | | | | | | | |
|---|---|---|---|---|---|---|---|---|---|
| | A12 | A13 | A14 | A15 | A16 | A17 | A18 | A19 | A20 |
| 3 | -2.84E-08 | 3.57E-09 | 1.38E-09 | 1.39E-10 | -4.00E-13 | -9.10E-12 | -2.23E-12 | -5.43E-13 | -1.07E-14 |
| 4 | 1.75E-05 | 3.75E-07 | -1.01E-06 | -1.41E-06 | -8.04E-07 | 1.59E-07 | 3.56E-07 | 2.05E-07 | -1.03E-07 |
| 5 | 3.16E-04 | 2.65E-05 | -3.90E-05 | -2.65E-05 | -5.86E-06 | 1.17E-06 | 2.02E-06 | 8.10E-07 | -3.79E-07 |
| 6 | 2.68E-02 | -2.38E-02 | -1.45E-02 | 2.14E-02 | 2.65E-04 | 5.94E-04 | 2.20E-03 | -2.01E-03 | -7.88E-03 |
| 8 | -5.71E+01 | -1.99E+02 | -7.11E+01 | 1.60E+02 | -1.98E+02 | 1.29E+03 | -1.62E+02 | -2.51E+03 | 1.65E+03 |
| 9 | -3.56E-03 | -6.96E-04 | -1.15E-04 | -2.22E-03 | -3.22E-03 | -1.65E-03 | 1.35E-03 | 2.49E-03 | -7.99E-04 |
| 10 | 1.45E-03 | -6.76E-03 | -8.03E-03 | -5.51E-03 | -2.05E-03 | 7.00E-04 | 1.78E-03 | 1.24E-03 | -5.78E-04 |
| 11 | 3.33E-04 | -3.17E-04 | -3.46E-04 | -1.78E-04 | -7.77E-05 | 3.06E-05 | 4.14E-05 | 2.04E-05 | -1.21E-05 |

FIG. 16D

| ABSOLUTE VALUE OF RADIUS OF CURVATURE IN PERIPHERAL PORTION OF EFFECTIVE DIAMETER | | |
|---|---|---|
| SURFACE NUMBER | SIGN | ABSOLUTE VALUE OF RADIUS OF CURVATURE |
| 3 | X3-P3 | 20.8766 |
| 4 | X4-P4 | 2.698258 |
| 5 | X5-P5 | 2.833777 |
| 6 | X6-P6 | 9.375239 |
| 8 | X8-P8 | 16.76223 |
| 9 | X9-P9 | 1.409891 |
| 10 | X10-P10 | 2.20953 |
| 11 | X11-P11 | 8.326777 |
| 12 | X12-P12 | 2.964426 |
| 13 | X13-P13 | 3.855349 |

FIG. 17A

| LENS DATA | | | | |
|---|---|---|---|---|
| SURFACE NUMBER | Ri | Di | Ndj | $\nu$ dj |
| 1 | 16.48 | 1.50 | 1.7550 | 52.3 |
| 2 | 4.22 | 2.67 | | |
| *3 | 2.97 | 1.20 | 1.5316 | 55.4 |
| *4 | 1.51 | 1.05 | | |
| *5 | 7.91 | 3.39 | 1.6140 | 25.5 |
| *6 | 6.60 | 0.53 | | |
| St  7 | 0.00 | 0.18 | | |
| *8 | 6.20 | 1.75 | 1.5316 | 55.4 |
| *9 | −0.97 | 0.22 | | |
| *10 | −0.69 | 0.75 | 1.6140 | 25.5 |
| *11 | −1.60 | 0.13 | | |
| *12 | 10.44 | 1.00 | 1.5316 | 55.4 |
| *13 | −2.34 | 1.80 | | |
| 14 | 0.00 | 0.50 | 1.5168 | 64.2 |
| 15 | 0 | 0.67 | | |
| IMAGING PLANE 16 | 0 | 0 | | |

FIG. 17B

| SCHEMATIC SPECIFICATION ||
|---|---:|
| Fno | 2.8 |
| ω | 95.4° |
| IH | 2.40 |
| BF(in Air) | 3.02 |
| L(in Air) | 17.28 |
| f | 1.18 |
| f1 | −7.92 |
| f2 | −8.13 |
| f3 | −3966.11 |
| f4 | 1.73 |
| f5 | −2.85 |
| f6 | 3.70 |
| f45 | 4.88 |

FIG. 17C

| SURFACE NUMBER | K | ASPHERIC COEFFICIENT | | | | | | | | |
|---|---|---|---|---|---|---|---|---|---|---|
| | | A3 | A4 | A5 | A6 | A7 | A8 | A9 | A10 | A11 |
| 3 | 0.00E+00 | -8.47E-02 | 8.29E-03 | 1.89E-03 | -9.74E-05 | -7.83E-05 | -5.72E-06 | 2.57E-07 | 3.26E-07 | 9.15E-08 |
| 4 | 0.00E+00 | -1.75E-01 | 1.09E-01 | -8.02E-03 | -2.25E-03 | 2.81E-04 | -3.30E-04 | -2.76E-04 | -1.13E-04 | -2.68E-05 |
| 5 | 0.00E+00 | 1.75E-02 | 4.89E-02 | -1.45E-02 | -6.89E-04 | 5.06E-03 | 1.59E-03 | -2.28E-03 | -1.48E-03 | 7.09E-04 |
| 6 | 0.00E+00 | 1.02E-02 | -3.54E-03 | -3.95E-02 | 2.89E-02 | 3.08E-02 | -1.19E-02 | -4.25E-02 | -2.74E-02 | 2.72E-02 |
| 8 | 0.00E+00 | -9.54E-02 | 9.38E-01 | -4.96E+00 | 1.02E+01 | -1.45E+00 | -1.61E+01 | -2.09E+01 | 4.27E+01 | 1.01E+02 |
| 9 | 0.00E+00 | 2.86E-02 | 2.28E-01 | -1.24E-02 | -2.84E-01 | -2.99E-02 | 6.37E-01 | 4.53E-02 | 1.16E-02 | -4.81E-03 |
| 10 | 0.00E+00 | 1.48E-01 | 4.37E-01 | -1.48E-01 | -1.98E-01 | -7.47E-02 | 1.96E-02 | 4.92E-02 | 4.00E-02 | 1.77E-02 |
| 11 | 0.00E+00 | 7.54E-02 | 2.66E-02 | 5.88E-02 | -2.57E-02 | -2.31E-02 | -5.85E-03 | 3.85E-03 | 3.78E-03 | 1.89E-03 |
| 12 | 0.00E+00 | 6.84E-03 | -3.35E-03 | 4.23E-03 | 1.50E-03 | 5.02E-05 | 3.76E-04 | | | |
| 13 | 0.00E+00 | 1.48E-02 | 1.29E-02 | 2.71E-04 | 1.16E-03 | 1.55E-03 | 8.42E-04 | | | |

| SURFACE NUMBER | ASPHERIC COEFFICIENT | | | | | | | | |
|---|---|---|---|---|---|---|---|---|---|
| | A12 | A13 | A14 | A15 | A16 | A17 | A18 | A19 | A20 |
| 3 | -2.84E-08 | 3.58E-09 | 1.39E-09 | 1.40E-10 | -1.43E-13 | -9.03E-12 | -2.21E-12 | -5.38E-13 | -9.52E-15 |
| 4 | 1.75E-05 | 3.56E-07 | -1.02E-06 | -1.41E-06 | -8.06E-07 | 1.58E-07 | 3.55E-07 | 2.05E-07 | -1.03E-07 |
| 5 | 3.16E-04 | 2.65E-05 | -3.90E-05 | -2.65E-05 | -5.86E-06 | 1.17E-06 | 2.02E-06 | 8.10E-07 | -3.79E-07 |
| 6 | 2.69E-02 | -2.38E-02 | -1.44E-03 | 2.14E-02 | 2.42E-04 | 5.67E-04 | 2.17E-03 | -2.04E-03 | -7.90E-03 |
| 8 | -5.70E+01 | -1.99E+02 | -7.10E+01 | 1.60E+02 | -1.98E+02 | 1.29E+03 | -1.63E+02 | -2.51E+03 | 1.65E+03 |
| 9 | -3.58E-03 | -7.06E-04 | -1.23E-04 | -2.22E-03 | -3.22E-03 | -1.65E-03 | 1.35E-03 | 2.50E-03 | -7.89E-04 |
| 10 | 1.45E-03 | -6.76E-03 | -8.03E-03 | -5.51E-03 | -2.06E-03 | 6.96E-04 | 1.78E-03 | 1.24E-03 | -5.81E-04 |
| 11 | 3.33E-04 | -3.17E-04 | -3.46E-04 | -1.78E-04 | -7.60E-05 | 3.07E-05 | 4.19E-05 | 1.82E-05 | -1.15E-05 |

FIG. 17D

| ABSOLUTE VALUE OF RADIUS OF CURVATURE IN PERIPHERAL PORTION OF EFFECTIVE DIAMETER | | |
|---|---|---|
| SURFACE NUMBER | SIGN | ABSOLUTE VALUE OF RADIUS OF CURVATURE |
| 3 | X3-P3 | 19.74948 |
| 4 | X4-P4 | 2.764925 |
| 5 | X5-P5 | 2.858075 |
| 6 | X6-P6 | 9.10678 |
| 8 | X8-P8 | 19.47442 |
| 9 | X9-P9 | 1.393843 |
| 10 | X10-P10 | 2.145048 |
| 11 | X11-P11 | 7.529448 |
| 12 | X12-P12 | 2.988163 |
| 13 | X13-P13 | 3.78903 |

FIG. 18A

| LENS DATA | | | | |
|---|---|---|---|---|
| SURFACE NUMBER | Ri | Di | Ndj | ν dj |
| 1 | 19.18 | 1.25 | 1.7725 | 49.6 |
| 2 | 4.83 | 3.05 | | |
| *3 | 3.42 | 1.20 | 1.5316 | 55.4 |
| *4 | 1.11 | 1.05 | | |
| *5 | 3.25 | 2.80 | 1.6140 | 25.5 |
| *6 | 9.96 | 0.53 | | |
| St 7 | 0.00 | 0.18 | | |
| *8 | 6.10 | 1.75 | 1.5316 | 55.4 |
| *9 | −0.73 | 0.22 | | |
| *10 | −0.70 | 0.75 | 1.6140 | 25.5 |
| *11 | −2.62 | 0.13 | | |
| *12 | 21.98 | 1.01 | 1.5316 | 55.4 |
| *13 | −2.06 | 1.10 | | |
| 14 | 0.00 | 0.50 | 1.5168 | 64.2 |
| 15 | 0 | 0.68 | | |
| IMAGING PLANE 16 | 0 | 0 | | |

FIG. 18B

| SCHEMATIC SPECIFICATION ||
|---|---:|
| Fno | 2.8 |
| ω | 94.2° |
| IH | 2.40 |
| BF(in Air) | 2.11 |
| L(in Air) | 16.03 |
| f | 1.16 |
| f1 | −8.69 |
| f2 | −3.77 |
| f3 | 6.79 |
| f4 | 1.35 |
| f5 | −1.81 |
| f6 | 3.59 |
| f45 | 3.94 |

FIG. 18C

| SURFACE NUMBER | K | A3 | A4 | A5 | ASPHERIC COEFFICIENT A6 | A7 | A8 | A9 | A10 | A11 |
|---|---|---|---|---|---|---|---|---|---|---|
| 3 | -8.89E-03 | -8.23E-02 | 8.89E-03 | 1.97E-03 | -8.89E-05 | -7.82E-05 | -5.99E-06 | 1.55E-07 | 2.99E-07 | 8.61E-08 |
| 4 | -1.27E-03 | -1.55E-01 | 1.04E-01 | -1.11E-02 | 1.08E-03 | -1.28E-04 | -4.66E-04 | -3.19E-04 | -1.24E-04 | -2.82E-05 |
| 5 | 2.76E-02 | 2.20E-03 | 5.34E-02 | -1.40E-02 | -7.29E-04 | 5.16E-03 | 1.68E-03 | -2.24E-03 | -1.47E-03 | 7.07E-04 |
| 6 | -1.18E-02 | 1.45E-02 | 3.46E-02 | -3.25E-02 | 2.67E-02 | 3.31E-02 | -9.03E-03 | -4.34E-02 | -3.14E-02 | 2.26E-02 |
| 8 | -3.23E+00 | -1.00E-01 | 9.65E-01 | -4.97E-01 | 1.02E+01 | -1.45E+00 | -1.62E+01 | -2.11E+01 | 4.26E+01 | 1.01E+02 |
| 9 | -1.88E-03 | 3.09E-02 | 2.70E-01 | 6.75E-03 | -2.86E-02 | -3.68E-02 | 5.87E-02 | 4.36E-02 | 1.18E-02 | -4.01E-03 |
| 10 | -2.38E-03 | 1.34E-01 | 4.27E-01 | -1.50E-01 | -1.93E-01 | -6.95E-02 | 2.33E-01 | 5.14E-02 | 4.12E-02 | 1.82E-02 |
| 11 | 6.27E-02 | 7.71E-02 | 1.16E-02 | 5.16E-02 | -2.75E-02 | -2.19E-02 | -2.42E-03 | 4.85E-03 | 4.16E-03 | 1.88E-03 |
| 12 | -2.68E+01 | 3.19E-02 | 7.07E-03 | 4.24E-03 | 1.59E-03 | -4.04E-05 | -1.36E-04 | 5.04E-05 | 2.85E-05 | 1.10E-05 |
| 13 | -2.15E-02 | 2.59E-02 | 2.25E-02 | 5.06E-04 | 5.10E-04 | 2.35E-03 | -4.51E-04 | 1.46E-04 | 3.20E-05 | -6.62E-06 |

| SURFACE NUMBER | A12 | A13 | A14 | A15 | ASPHERIC COEFFICIENT A16 | A17 | A18 | A19 | A20 | |
|---|---|---|---|---|---|---|---|---|---|---|
| 3 | -2.91E-08 | 3.60E-09 | 1.45E-09 | 1.68E-10 | 8.35E-12 | -6.44E-12 | -2.02E-12 | -7.36E-13 | -1.65E-13 | |
| 4 | 1.82E-05 | 1.17E-06 | -5.06E-07 | -1.15E-06 | -6.93E-07 | 2.01E-07 | 3.71E-07 | 1.99E-07 | -1.06E-07 | |
| 5 | 3.12E-04 | 2.32E-05 | -4.09E-05 | -2.74E-05 | -6.21E-06 | 1.07E-06 | 2.01E-06 | 8.29E-07 | -3.58E-07 | |
| 6 | 2.23E-02 | -2.61E-02 | -2.59E-02 | 2.26E-02 | 1.61E-06 | 1.92E-03 | 2.51E-03 | -1.90E-03 | -8.07E-03 | |
| 8 | -5.65E+01 | -1.98E+02 | -6.97E+01 | 1.60E+02 | -1.98E+02 | 1.29E+03 | -1.71E+02 | -2.51E+03 | 1.66E+03 | |
| 9 | -3.05E-03 | -6.99E-04 | -5.99E-04 | -2.96E-03 | -3.91E-03 | -2.11E-03 | 1.28E-03 | 2.88E-03 | 3.92E-05 | |
| 10 | 1.65E-03 | -6.73E-03 | -8.07E-03 | -5.59E-03 | -2.14E-03 | 6.10E-04 | 1.70E-03 | 1.17E-03 | -6.39E-04 | |
| 11 | 2.29E-04 | -3.91E-04 | -4.10E-04 | -2.16E-04 | -5.85E-05 | 3.38E-05 | 4.92E-05 | 2.38E-05 | -1.56E-05 | |
| 12 | 1.49E-06 | -2.40E-06 | -3.30E-06 | -6.46E-09 | -1.59E-08 | -1.31E-08 | -8.44E-09 | -4.82E-09 | -2.51E-09 | |
| 13 | -1.24E-05 | -9.17E-06 | -5.19E-06 | -5.30E-08 | -3.46E-08 | -2.16E-08 | -1.32E-08 | -8.04E-09 | -4.89E-09 | |

FIG. 18D

| ABSOLUTE VALUE OF RADIUS OF CURVATURE IN PERIPHERAL PORTION OF EFFECTIVE DIAMETER | | |
|---|---|---|
| SURFACE NUMBER | SIGN | ABSOLUTE VALUE OF RADIUS OF CURVATURE |
| 3 | \|X3-P3\| | 25.91695 |
| 4 | \|X4-P4\| | 2.533233 |
| 5 | \|X5-P5\| | 2.440946 |
| 6 | \|X6-P6\| | 6.035943 |
| 8 | \|X8-P8\| | 20.97755 |
| 9 | \|X9-P9\| | 1.309458 |
| 10 | \|X10-P10\| | 2.172074 |
| 11 | \|X11-P11\| | 8.283806 |
| 12 | \|X12-P12\| | 2.70018 |
| 13 | \|X13-P13\| | 3.338316 |

FIG. 19

| EXAMPLE | CONDITIONAL EXPRESSION | | | | | | | |
|---|---|---|---|---|---|---|---|---|
| | (1) $f_{45}/f$ | (2) $(D_4+D_5)/f$ | (3) $f/f_3$ | (4) $L/f$ | (5) $f_5/f$ | (6) $D_4/f$ | (7) $\nu d_4/\nu d_5$ | (8) $D_1/f$ |
| 1 | 2.60 | 3.45 | 0.18 | 13.95 | −3.14 | 0.94 | 2.17 | 1.45 |
| 2 | 3.10 | 4.23 | 0.12 | 14.58 | −2.44 | 0.94 | 2.17 | 1.30 |
| 3 | 2.85 | 3.33 | 0.30 | 13.58 | −3.70 | 0.87 | 2.17 | 1.35 |
| 4 | 2.39 | 3.54 | 0.16 | 13.54 | −3.12 | 0.81 | 1.83 | 1.64 |
| 5 | 2.91 | 3.25 | 0.18 | 11.97 | −2.07 | 0.81 | 2.17 | 0.90 |
| 6 | 4.50 | 3.71 | 0.00 | 14.35 | −2.32 | 0.87 | 2.17 | 1.18 |
| 7 | 4.12 | 3.75 | 0.00 | 14.59 | −2.41 | 0.89 | 2.17 | 1.27 |
| 8 | 3.40 | 3.32 | 0.17 | 13.83 | −1.56 | 0.91 | 2.17 | 1.08 |
| 9 | 0.00 | 0.00 | 0.00 | 0.00 | 0.00 | 0.00 | 0.00 | 0.00 |

FIG. 34A

| LENS DATA | | | | |
|---|---|---|---|---|
| SURFACE NUMBER | Ri | Di | Ndj | $\nu$ dj |
| 1 | 17.14 | 1.67 | 1.7725 | 49.6 |
| 2 | 4.48 | 2.46 | | |
| *3 | 3.51 | 0.80 | 1.5316 | 55.4 |
| *4 | 1.03 | 1.26 | | |
| *5 | 2.78 | 2.91 | 1.6140 | 25.5 |
| *6 | 15.06 | 0.33 | | |
| St      7 | 0.00 | 0.11 | | |
| *8 | 24.45 | 0.85 | 1.5316 | 55.4 |
| *9 | −2.70 | 0.22 | | |
| *10 | −64.38 | 1.44 | 1.5316 | 55.4 |
| *11 | −0.79 | 0.13 | | |
| *12 | −0.68 | 1.01 | 1.6140 | 25.5 |
| *13 | −1.23 | 1.00 | | |
| 14 | 0.00 | 0.30 | 1.5168 | 64.2 |
| 15 | 0 | 0.86 | | |
| IMAGING PLANE 16 | 0 | 0 | | |

FIG. 34B

| SCHEMATIC SPECIFICATION | |
|---|---|
| Fno | 2.8 |
| ω | 95.1° |
| IH | 2.40 |
| BF(in Air) | 2.06 |
| L(in Air) | 15.23 |
| f | 1.11 |
| f1 | −8.34 |
| f2 | −3.08 |
| f3 | 5.10 |
| f4 | 4.62 |
| f5 | 1.49 |
| f6 | −7.77 |
| f12 | −1.79 |
| f56 | 2.92 |
| f123 | −4.47 |
| f456 | 2.47 |

FIG. 34C

| SURFACE NUMBER | K | A3 | A4 | A5 | ASPHERIC COEFFICIENT A6 | A7 | A8 | A9 | A10 | A11 |
|---|---|---|---|---|---|---|---|---|---|---|
| 3 | 0.00E+00 | -8.09E-02 | 9.13E-03 | 2.01E-03 | -8.52E-05 | -7.86E-05 | -6.43E-06 | -3.77E-08 | 2.35E-07 | 6.77E-08 |
| 4 | 0.00E+00 | -1.50E-01 | 1.08E-01 | -9.48E-03 | 1.53E-03 | -5.28E-05 | -4.78E-04 | -3.37E-04 | -1.35E-04 | -3.36E-05 |
| 5 | 0.00E+00 | 4.36E-04 | 5.17E-02 | -1.48E-02 | -9.66E-04 | 5.11E-03 | 1.70E-03 | -2.21E-03 | -1.46E-03 | 7.15E-04 |
| 6 | 0.00E+00 | 1.25E-02 | 4.56E-02 | -1.44E-02 | 3.77E-02 | 2.64E-02 | -2.92E-02 | -6.08E-02 | -3.51E-02 | 4.02E-02 |
| 8 | 0.00E+00 | -7.56E-03 | 2.87E-02 | -3.44E-02 | -3.00E-02 | 7.39E-02 | 2.33E-02 | 9.83E-02 | -2.07E-01 | -1.69E-01 |
| 9 | 0.00E+00 | -2.61E-03 | -1.48E-03 | -1.15E-02 | 2.78E-03 | 3.03E-02 | -2.99E-03 | -8.71E-03 | -1.45E-02 | -1.63E-02 |
| 10 | 0.00E+00 | -2.00E-02 | -2.34E-03 | -1.53E-02 | -6.69E-03 | -1.12E-02 | -1.28E-02 | -1.18E-02 | -9.41E-03 | -6.67E-03 |
| 11 | 0.00E+00 | 3.71E-02 | 2.76E-03 | 9.57E-03 | -2.86E-01 | -3.78E-02 | 5.83E-02 | 4.38E-02 | 1.26E-02 | -3.00E-03 |
| 12 | 0.00E+00 | 1.16E-01 | 4.15E-01 | -1.55E-01 | -1.96E-01 | -7.08E-02 | 2.22E-02 | 5.02E-02 | 4.00E-02 | 1.71E-02 |
| 13 | 0.00E+00 | 6.37E-02 | 1.68E-02 | 5.57E-02 | -2.62E-02 | -2.21E-02 | -2.92E-03 | 4.41E-03 | 3.90E-03 | 1.76E-03 |

| SURFACE NUMBER | A12 | A13 | A14 | A15 | ASPHERIC COEFFICIENT A16 | A17 | A18 | A19 | A20 | |
|---|---|---|---|---|---|---|---|---|---|---|
| 3 | -3.38E-08 | 2.66E-09 | 1.32E-09 | 1.83E-10 | 2.40E-11 | 1.21E-12 | 1.71E-12 | 2.02E-13 | -4.54E-13 | |
| 4 | 1.59E-05 | 2.96E-07 | -8.20E-07 | -1.25E-06 | -7.21E-07 | 1.94E-07 | 3.83E-07 | 2.06E-07 | -1.00E-07 | |
| 5 | 3.16E-04 | 2.54E-05 | -3.98E-05 | -2.69E-05 | -5.98E-06 | 1.15E-06 | 2.03E-06 | 8.22E-07 | -3.71E-07 | |
| 6 | 6.01E-02 | 1.49E-02 | 5.04E-02 | 6.24E-02 | -2.21E-02 | 2.22E-02 | 1.17E-01 | 3.62E-02 | -4.47E-01 | |
| 8 | -1.82E-01 | 1.95E-01 | 1.36E-01 | 2.60E-03 | -1.80E-01 | -2.33E-01 | 9.43E-01 | 1.96E+00 | -3.26E+00 | |
| 9 | -1.23E-02 | -1.57E-03 | 1.49E-02 | 3.55E-02 | 5.39E-02 | 6.07E-02 | 4.88E-02 | -3.39E-03 | -1.26E-01 | |
| 10 | -4.16E-03 | -2.08E-03 | -4.31E-04 | 8.74E-04 | 1.92E-03 | 2.70E-03 | 3.15E-03 | 3.18E-03 | 2.58E-03 | |
| 11 | -2.02E-03 | 1.81E-04 | 4.22E-05 | -2.59E-03 | -3.81E-03 | -2.24E-03 | 9.55E-04 | 2.40E-03 | -5.61E-04 | |
| 12 | 6.89E-04 | -7.50E-03 | -8.64E-03 | -5.04E-03 | -1.66E-03 | 6.30E-04 | 1.59E-03 | 1.24E-03 | -5.29E-04 | |
| 13 | 1.88E-04 | -3.93E-04 | -3.98E-04 | -1.98E-04 | -4.81E-05 | 4.00E-05 | 5.08E-05 | 2.29E-05 | -1.77E-05 | |

FIG. 34D

| ABSOLUTE VALUE OF RADIUS OF CURVATURE IN PERIPHERAL PORTION OF EFFECTIVE DIAMETER | | |
|---|---|---|
| SURFACE NUMBER | SIGN | ABSOLUTE VALUE OF RADIUS OF CURVATURE |
| 3 | X3-P3 | 29.31 |
| 4 | X4-P4 | 2.21 |
| 5 | X5-P5 | 2.22 |
| 6 | X6-P6 | 4.87 |
| 8 | X8-P8 | 26.79 |
| 9 | X9-P9 | 3.24 |
| 10 | X10-P10 | 2.70 |
| 11 | X11-P11 | 1.44 |
| 12 | X12-P12 | 1.93 |
| 13 | X13-P13 | 5.79 |

FIG. 35A

| LENS DATA | | | | |
|---|---|---|---|---|
| SURFACE NUMBER | Ri | Di | Ndj | ν dj |
| 1 | 18.02 | 1.50 | 1.7550 | 52.3 |
| 2 | 4.38 | 2.34 | | |
| *3 | 3.55 | 0.80 | 1.5316 | 55.4 |
| *4 | 1.06 | 1.13 | | |
| *5 | 2.93 | 2.94 | 1.6140 | 25.5 |
| *6 | 15.69 | 0.72 | | |
| St    7 | 0.00 | 0.00 | | |
| *8 | 33.14 | 0.70 | 1.5316 | 55.4 |
| *9 | −2.97 | 0.22 | | |
| *10 | 55.83 | 1.48 | 1.5316 | 55.4 |
| *11 | −0.79 | 0.13 | | |
| *12 | −0.71 | 1.01 | 1.6140 | 25.5 |
| *13 | −1.33 | 1.00 | | |
| 14 | 0.00 | 0.30 | 1.5168 | 64.2 |
| 15 | 0 | 0.92 | | |
| IMAGING PLANE 16 | 0 | 0 | | |

FIG. 35B

| SCHEMATIC SPECIFICATION | |
|---|---|
| Fno | 2.8 |
| ω | 96.1° |
| IH | 2.40 |
| BF(in Air) | 2.12 |
| L(in Air) | 15.10 |
| f | 1.10 |
| f1 | −7.86 |
| f2 | −3.21 |
| f3 | 5.40 |
| f4 | 5.17 |
| f5 | 1.47 |
| f6 | −6.38 |
| f12 | −1.81 |
| f56 | 2.93 |
| f123 | −4.01 |
| f456 | 2.48 |

FIG. 35C

| SURFACE NUMBER | K | A3 | A4 | A5 | ASPHERIC COEFFICIENT A6 | A7 | A8 | A9 | A10 | A11 |
|---|---|---|---|---|---|---|---|---|---|---|
| 3 | 0.00E+00 | -8.10E-02 | 9.01E-03 | 1.99E-03 | -8.56E-05 | -7.80E-05 | -6.16E-06 | 5.10E-08 | 2.59E-07 | 7.37E-08 |
| 4 | 0.00E+00 | -1.54E-01 | 1.07E-01 | -9.76E-03 | 1.47E-03 | -5.68E-05 | -4.72E-04 | -3.33E-04 | -1.33E-04 | -3.32E-05 |
| 5 | 0.00E+00 | 3.77E-03 | 5.17E-02 | -1.49E-02 | -9.85E-04 | 5.10E-03 | 1.70E-03 | -2.22E-03 | -1.46E-03 | 7.13E-04 |
| 6 | 0.00E+00 | 1.23E-02 | 4.08E-02 | -2.48E-02 | 3.18E-02 | 3.48E-02 | -9.40E-03 | -4.39E-02 | -3.07E-02 | 2.50E-02 |
| 8 | 0.00E+00 | 8.70E-03 | 1.35E-02 | -4.77E-02 | -9.01E-03 | 1.35E-01 | 9.12E-02 | 1.32E-01 | -2.34E-01 | -2.63E-01 |
| 9 | 0.00E+00 | 1.20E-02 | 1.52E-02 | -1.44E-03 | 6.33E-03 | 4.42E-03 | 7.18E-04 | -5.04E-04 | -2.75E-03 | -4.93E-03 |
| 10 | 0.00E+00 | -1.15E-03 | -3.25E-03 | -8.13E-03 | -1.20E-02 | -1.40E-02 | -1.41E-02 | -1.30E-02 | -1.11E-02 | -8.70E-03 |
| 11 | 0.00E+00 | 3.94E-02 | 2.74E-01 | 7.98E-03 | -2.86E-01 | -3.69E-02 | 5.90E-02 | 4.43E-02 | 1.28E-02 | -2.94E-03 |
| 12 | 0.00E+00 | 1.22E-01 | 4.19E-01 | -1.53E-01 | -1.95E-01 | -7.02E-02 | 2.28E-02 | 5.08E-02 | 4.06E-02 | 1.77E-02 |
| 13 | 0.00E+00 | 8.35E-02 | 1.77E-02 | 5.45E-02 | -2.69E-02 | -2.22E-02 | -2.88E-03 | 4.49E-03 | 3.96E-03 | 1.79E-03 |

| SURFACE NUMBER | A12 | A13 | A14 | A15 | ASPHERIC COEFFICIENT A16 | A17 | A18 | A19 | A20 |
|---|---|---|---|---|---|---|---|---|---|
| 3 | -3.25E-08 | 2.86E-09 | 1.32E-09 | 1.69E-10 | 1.51E-11 | -2.62E-12 | 2.86E-13 | -2.68E-13 | -6.00E-13 |
| 4 | 1.58E-05 | 1.20E-07 | -9.63E-07 | -1.34E-06 | -7.61E-07 | 1.74E-07 | 3.70E-07 | 2.03E-07 | -1.03E-07 |
| 5 | 3.15E-04 | 2.44E-05 | -4.04E-05 | -2.73E-05 | -6.15E-06 | 1.08E-06 | 2.01E-06 | 8.24E-07 | -3.63E-07 |
| 6 | 2.60E-02 | -2.12E-02 | 2.20E-03 | 2.75E-02 | 5.25E-03 | 4.21E-03 | 3.25E-04 | -3.06E-03 | -1.35E-02 |
| 8 | -3.44E-01 | -3.53E-02 | -1.78E-01 | -4.46E-01 | -8.92E-01 | -1.22E+00 | -8.24E-01 | 8.62E-01 | 4.08E+00 |
| 9 | -6.95E-03 | -8.47E-03 | -9.10E-03 | -8.11E-03 | -3.89E-03 | 5.06E-03 | 2.00E-02 | 4.50E-02 | 8.13E-02 |
| 10 | -6.05E-03 | -3.30E-03 | -6.06E-04 | 1.86E-03 | 3.90E-03 | 5.27E-03 | 5.70E-03 | 4.95E-03 | 2.69E-03 |
| 11 | -2.09E-03 | 4.34E-05 | -1.14E-04 | -2.73E-03 | -3.92E-03 | -2.31E-03 | 9.38E-04 | 2.43E-03 | -4.92E-04 |
| 12 | 1.22E-03 | -7.02E-03 | -8.23E-03 | -5.79E-03 | -2.41E-03 | 6.25E-04 | 1.78E-03 | 1.19E-03 | -4.52E-04 |
| 13 | 2.00E-04 | -3.90E-04 | -3.98E-04 | -2.03E-04 | -4.94E-05 | 3.89E-05 | 5.06E-05 | 2.29E-05 | -1.74E-05 |

FIG. 35D

| ABSOLUTE VALUE OF RADIUS OF CURVATURE IN PERIPHERAL PORTION OF EFFECTIVE DIAMETER | | |
|---|---|---|
| SURFACE NUMBER | SIGN | ABSOLUTE VALUE OF RADIUS OF CURVATURE |
| 3 | \|X3-P3\| | 15.56 |
| 4 | \|X4-P4\| | 3.93 |
| 5 | \|X5-P5\| | 2.70 |
| 6 | \|X6-P6\| | 3.01 |
| 8 | \|X8-P8\| | 19.84 |
| 9 | \|X9-P9\| | 3.91 |
| 10 | \|X10-P10\| | 3.26 |
| 11 | \|X11-P11\| | 1.41 |
| 12 | \|X12-P12\| | 2.15 |
| 13 | \|X13-P13\| | 10.98 |

FIG. 36A

| LENS DATA | | | | |
|---|---|---|---|---|
| SURFACE NUMBER | Ri | Di | Ndj | νdj |
| 1 | 18.69 | 1.80 | 1.7550 | 52.3 |
| 2 | 4.65 | 2.83 | | |
| *3 | 3.36 | 0.85 | 1.5316 | 55.4 |
| *4 | 1.02 | 0.99 | | |
| *5 | 3.13 | 3.37 | 1.6140 | 25.5 |
| *6 | 7.10 | 0.44 | | |
| St 7 | 0.00 | 0.18 | | |
| *8 | 9.55 | 0.80 | 1.5316 | 55.4 |
| *9 | −2.29 | 0.22 | | |
| *10 | 15.15 | 1.10 | 1.5316 | 55.4 |
| *11 | −0.93 | 0.18 | | |
| *12 | −0.73 | 1.01 | 1.6140 | 25.5 |
| *13 | −1.35 | 1.00 | | |
| 14 | 0.00 | 0.30 | 1.5168 | 64.2 |
| 15 | 0 | 0.81 | | |
| IMAGING PLANE 16 | 0 | 0 | | |

FIG. 36B

| SCHEMATIC SPECIFICATION | |
|---|---|
| Fno | 2.8 |
| ω | 95.2° |
| IH | 2.40 |
| BF(in Air) | 2.01 |
| L(in Air) | 15.76 |
| f | 1.08 |
| f1 | −8.67 |
| f2 | −3.14 |
| f3 | 6.88 |
| f4 | 3.56 |
| f5 | 1.68 |
| f6 | −6.49 |
| f12 | −1.79 |
| f56 | 3.42 |
| f123 | −2.51 |
| f456 | 2.38 |

FIG. 36C

| SURFACE NUMBER | ASPHERIC COEFFICIENT | | | | | | | | | |
|---|---|---|---|---|---|---|---|---|---|---|
| | K | A3 | A4 | A5 | A6 | A7 | A8 | A9 | A10 | A11 |
| 3 | 0.00E+00 | -8.07E-02 | 8.98E-03 | 1.97E-03 | -9.12E-05 | -7.94E-05 | -6.49E-06 | -1.39E-08 | 2.49E-07 | 7.33E-08 |
| 4 | 0.00E+00 | -1.54E-01 | 1.07E-01 | -9.44E-03 | 1.65E-03 | 1.21E-05 | -4.49E-04 | -3.26E-04 | -1.32E-04 | -3.33E-05 |
| 5 | 0.00E+00 | -4.53E-03 | 5.26E-02 | -1.41E-02 | -6.50E-04 | 5.18E-03 | 1.69E-03 | -2.24E-03 | -1.47E-03 | 7.07E-04 |
| 6 | 0.00E+00 | 1.04E-02 | 5.74E-02 | -1.89E-02 | 2.50E-02 | 2.53E-02 | -1.25E-02 | -3.66E-02 | -1.56E-02 | 4.45E-02 |
| 8 | 0.00E+00 | -6.99E-03 | 1.39E-02 | -4.76E-02 | -2.06E-02 | 1.04E-01 | 3.98E-02 | 6.35E-02 | -3.01E-01 | -2.95E-01 |
| 9 | 0.00E+00 | 2.86E-04 | -4.52E-03 | -1.71E-02 | -2.02E-03 | 1.20E-03 | -4.24E-04 | -1.16E-03 | -2.81E-03 | -3.38E-03 |
| 10 | 0.00E+00 | 2.53E-03 | 2.48E-03 | -1.17E-02 | -5.59E-03 | -7.71E-03 | -6.99E-03 | -4.73E-03 | -2.42E-03 | -8.70E-04 |
| 11 | 0.00E+00 | 3.63E-02 | 2.72E-01 | 6.31E-03 | -2.86E-01 | -3.69E-02 | 5.92E-02 | 4.44E-02 | 1.28E-02 | -2.95E-03 |
| 12 | 0.00E+00 | 1.18E-01 | 4.18E-01 | -1.54E-01 | -1.96E-01 | -7.14E-02 | 2.17E-02 | 4.99E-02 | 4.00E-02 | 1.73E-02 |
| 13 | 0.00E+00 | 7.06E-02 | 2.48E-02 | 6.01E-02 | -2.44E-02 | -2.14E-02 | -2.76E-03 | 4.42E-03 | 3.86E-03 | 1.71E-03 |

| SURFACE NUMBER | ASPHERIC COEFFICIENT | | | | | | | | |
|---|---|---|---|---|---|---|---|---|---|
| | A12 | A13 | A14 | A15 | A16 | A17 | A18 | A19 | A20 |
| 3 | -3.20E-08 | 3.15E-09 | 1.44E-09 | 2.08E-10 | 2.72E-11 | 6.77E-13 | 1.08E-12 | -1.21E-13 | -5.92E-13 |
| 4 | 1.55E-05 | -1.45E-07 | -1.12E-06 | -1.41E-06 | -7.93E-07 | 1.65E-07 | 3.69E-07 | 2.05E-07 | -1.01E-07 |
| 5 | 3.13E-04 | 2.42E-05 | -4.01E-05 | -2.70E-05 | -5.96E-06 | 1.18E-06 | 2.04E-06 | 8.23E-07 | -3.76E-07 |
| 6 | 4.48E-02 | -1.19E-02 | 1.41E-03 | 3.01E-02 | -2.07E-02 | -2.29E-02 | 1.27E-02 | -1.00E-02 | -9.54E-03 |
| 8 | -2.80E-01 | 2.36E-01 | 4.12E-01 | 5.44E-01 | 3.75E-01 | -5.37E-02 | -3.57E-01 | -3.91E-01 | -6.70E-01 |
| 9 | -3.01E-03 | -2.25E-03 | -1.87E-03 | -2.31E-03 | -3.02E-03 | -3.50E-03 | -3.54E-03 | -1.24E-04 | 6.88E-03 |
| 10 | -1.84E-04 | -9.66E-05 | -2.43E-04 | -3.13E-04 | -1.45E-04 | 2.12E-04 | 5.37E-04 | 5.64E-04 | -9.37E-05 |
| 11 | -2.07E-03 | 1.09E-04 | -2.88E-06 | -2.59E-03 | -3.79E-03 | -2.20E-03 | 1.00E-03 | 2.44E-03 | -5.16E-04 |
| 12 | 1.00E-03 | -7.15E-03 | -8.33E-03 | -6.49E-03 | -1.42E-03 | 1.12E-03 | 1.58E-03 | 7.32E-04 | -2.61E-04 |
| 13 | 1.48E-04 | -4.22E-04 | -4.17E-04 | -2.14E-04 | -5.18E-05 | 3.72E-05 | 4.99E-05 | 2.31E-05 | -1.60E-05 |

FIG. 36D

| ABSOLUTE VALUE OF RADIUS OF CURVATURE IN PERIPHERAL PORTION OF EFFECTIVE DIAMETER | | |
|---|---|---|
| SURFACE NUMBER | SIGN | ABSOLUTE VALUE OF RADIUS OF CURVATURE |
| 3 | X3-P3 | 23.00 |
| 4 | X4-P4 | 2.74 |
| 5 | X5-P5 | 2.62 |
| 6 | X6-P6 | 3.05 |
| 8 | X8-P8 | 25.91 |
| 9 | X9-P9 | 1.81 |
| 10 | X10-P10 | 3.90 |
| 11 | X11-P11 | 1.52 |
| 12 | X12-P12 | 1.87 |
| 13 | X13-P13 | 12.66 |

FIG. 37A

| | LENS DATA | | | |
|---|---|---|---|---|
| SURFACE NUMBER | Ri | Di | Ndj | $\nu$ dj |
| 1 | 15.47 | 1.50 | 1.7550 | 52.3 |
| 2 | 4.46 | 3.12 | | |
| *3 | 4.30 | 0.85 | 1.5316 | 55.4 |
| *4 | 1.17 | 0.94 | | |
| *5 | 2.65 | 2.80 | 1.6140 | 25.5 |
| *6 | 2.88 | 0.41 | | |
| St  7 | 0.00 | 0.18 | | |
| *8 | 4.24 | 1.20 | 1.5316 | 55.4 |
| *9 | −1.34 | 0.25 | | |
| *10 | −2.24 | 1.10 | 1.5316 | 55.4 |
| *11 | −0.79 | 0.20 | | |
| *12 | −0.82 | 1.01 | 1.6140 | 25.5 |
| *13 | −1.78 | 1.00 | | |
| 14 | 0.00 | 0.30 | 1.5168 | 64.2 |
| 15 | 0 | 0.80 | | |
| IMAGING PLANE 16 | 0 | 0 | | |

FIG. 37B

| SCHEMATIC SPECIFICATION | |
|---|---|
| Fno | 2.8 |
| ω | 95.1° |
| IH | 2.40 |
| BF(in Air) | 2.00 |
| L(in Air) | 15.55 |
| f | 1.18 |
| f1 | −8.81 |
| f2 | −3.34 |
| f3 | 9.53 |
| f4 | 2.07 |
| f5 | 1.83 |
| f6 | −4.11 |
| f12 | −1.87 |
| f56 | 5.85 |
| f123 | −1.83 |
| f456 | 2.35 |

FIG. 37C

| SURFACE NUMBER | K | A3 | A4 | A5 | ASPHERIC COEFFICIENT A6 | A7 | A8 | A9 | A10 | A11 |
|---|---|---|---|---|---|---|---|---|---|---|
| 3 | 0.00E+00 | -8.11E-02 | 9.30E-03 | 2.07E-03 | -6.96E-05 | -7.56E-05 | -6.09E-06 | -6.99E-08 | 2.01E-07 | 5.52E-08 |
| 4 | 0.00E+00 | -1.50E-01 | 9.89E-02 | -1.13E-02 | 1.42E-03 | -2.46E-05 | -4.75E-04 | -3.40E-04 | -1.36E-04 | -3.26E-05 |
| 5 | 0.00E+00 | -8.32E-03 | 6.20E-02 | -1.36E-02 | -1.28E-03 | 5.15E-03 | 1.82E-03 | -2.16E-03 | -1.45E-03 | 7.05E-04 |
| 6 | 0.00E+00 | 4.48E-03 | 1.30E-01 | 6.10E-03 | 3.10E-02 | 7.24E-02 | 1.06E-01 | 7.52E-02 | -6.85E-03 | -2.01E-01 |
| 8 | 0.00E+00 | -7.85E-03 | 5.40E-02 | -2.59E-02 | -1.65E-02 | 9.18E-02 | 5.73E-02 | 9.40E-02 | -2.52E-01 | -2.62E-01 |
| 9 | 0.00E+00 | 3.94E-02 | 1.50E-02 | -2.59E-03 | 9.88E-03 | 7.83E-03 | 3.79E-04 | -3.88E-03 | -5.94E-03 | -4.89E-03 |
| 10 | 0.00E+00 | 4.23E-02 | 3.00E-02 | -1.33E-03 | -2.00E-02 | -2.16E-02 | -1.40E-02 | -5.31E-03 | -3.17E-05 | 1.32E-03 |
| 11 | 0.00E+00 | 5.75E-02 | 2.90E-01 | 1.41E-02 | -2.84E-01 | -3.71E-02 | 5.77E-02 | 4.25E-02 | 1.12E-02 | -3.98E-03 |
| 12 | 0.00E+00 | 1.12E-01 | 4.20E-01 | -1.51E-01 | -1.96E-01 | -7.31E-02 | 1.97E-02 | 4.84E-02 | 3.89E-02 | 1.66E-02 |
| 13 | 0.00E+00 | 5.52E-02 | 1.76E-02 | 4.93E-02 | -2.98E-02 | -2.29E-02 | -2.82E-03 | 4.64E-03 | 4.05E-03 | 1.83E-03 |

| SURFACE NUMBER | A12 | A13 | A14 | A15 | ASPHERIC COEFFICIENT A16 | A17 | A18 | A19 | A20 | |
|---|---|---|---|---|---|---|---|---|---|---|
| 3 | -3.72E-08 | 1.93E-09 | 1.20E-09 | 1.79E-10 | 2.83E-11 | 2.76E-12 | 1.92E-12 | 7.50E-14 | -5.71E-13 | |
| 4 | 1.73E-05 | 1.33E-06 | -2.17E-07 | -9.60E-07 | -5.91E-07 | 2.32E-07 | 3.82E-07 | 1.95E-07 | -1.16E-07 | |
| 5 | 3.07E-04 | 2.07E-05 | -4.14E-05 | -2.71E-05 | -5.78E-06 | 1.36E-06 | 2.13E-06 | 8.39E-07 | -4.03E-07 | |
| 6 | -7.34E-01 | -1.90E-01 | -5.23E+00 | 1.36E+01 | -4.49E+00 | 3.11E+00 | -6.35E+00 | 5.24E+00 | -8.00E+00 | |
| 8 | -3.04E-01 | 2.16E-01 | 3.23E-01 | 4.51E-01 | 2.53E-01 | -1.90E-01 | -3.18E-01 | -2.25E-01 | -4.59E-02 | |
| 9 | -2.50E-03 | -4.51E-04 | 3.15E-05 | -1.22E-03 | -3.34E-03 | -4.89E-03 | -5.33E-03 | -1.07E-03 | 8.03E-03 | |
| 10 | 1.47E-04 | -1.84E-03 | -3.37E-03 | -3.81E-03 | -3.09E-03 | -1.54E-03 | 2.97E-04 | 1.86E-03 | 2.55E-03 | |
| 11 | -2.58E-03 | -1.70E-06 | 1.15E-04 | -2.39E-03 | -3.58E-03 | -2.05E-03 | 1.09E-03 | 2.47E-03 | -5.39E-04 | |
| 12 | 4.77E-04 | -7.48E-04 | -8.51E-03 | -5.05E-03 | -1.96E-03 | 2.73E-03 | 1.55E-03 | 1.02E-03 | -9.18E-04 | |
| 13 | 2.16E-04 | -3.86E-04 | -3.99E-04 | -2.00E-04 | -3.30E-05 | 3.89E-05 | 4.76E-05 | 2.03E-05 | -1.65E-05 | |

FIG. 37D

| ABSOLUTE VALUE OF RADIUS OF CURVATURE IN PERIPHERAL PORTION OF EFFECTIVE DIAMETER | | |
|---|---|---|
| SURFACE NUMBER | SIGN | ABSOLUTE VALUE OF RADIUS OF CURVATURE |
| 3 | X3-P3 | 13.85 |
| 4 | X4-P4 | 3.28 |
| 5 | X5-P5 | 2.21 |
| 6 | X6-P6 | 1.42 |
| 8 | X8-P8 | 3.56 |
| 9 | X9-P9 | 1.58 |
| 10 | X10-P10 | 1.46 |
| 11 | X11-P11 | 1.72 |
| 12 | X12-P12 | 5.06 |
| 13 | X13-P13 | 37.21 |

FIG. 38

| EXAMPLE | CONDITIONAL EXPRESSION | | | | | | | | |
|---|---|---|---|---|---|---|---|---|---|
| | (1) $f_{56}/f$ | (2) $(D_4+D_5)/f$ | (3) $f_3/f$ | (4) $L/f$ | (5) $f_6/f$ | (6) $f_{12}/f$ | (7) $\nu d_5 / \nu d_6$ | (8) $f_{123}/f_{456}$ | (9) $D_1/f$ |
| 1 | 2.62 | 3.74 | 4.58 | 13.67 | -6.98 | -1.60 | 2.17 | -1.81 | 1.50 |
| 2 | 2.65 | 3.69 | 4.89 | 13.66 | -5.78 | -1.64 | 2.17 | -1.62 | 1.36 |
| 3 | 3.17 | 4.04 | 6.37 | 14.60 | -6.01 | -1.66 | 2.17 | -1.05 | 1.67 |
| 4 | 4.97 | 3.18 | 8.09 | 13.21 | -3.49 | -1.59 | 2.17 | -0.78 | 1.27 |

IMAGING LENS SYSTEM AND IMAGING APPARATUS USING THE IMAGING LENS SYSTEM

This application is based on and claims priority under 35 U.S.C §119 from Japanese Patent Application Nos. 2008-137990 and 2008-137991, both filed on May 27, 2008, the entire disclosure of which is herein incorporated by reference.

BACKGROUND OF THE INVENTION

1. Field of the Invention

The present invention relates to an imaging lens system for forming an image of a subject and an imaging apparatus using the imaging lens system.

2. Description of Related Art

Generally, a small-sized, lightweight, and wide-angle imaging lens system with antiweatherability has been known, which is used in an imaging apparatus for an on-vehicle camera, a portable cellular phone camera, a surveillance camera, or the like. Such an imaging lens system forms an image of an object to be a target subject on a light receiving surface of an imaging device such as a CCD element or a CMOS element.

A small-sized, lightweight, and wide-angle imaging lens system formed of six lenses also has been known. As the known wide-angle imaging lens system formed of six lenses, an imaging lens system in which a spherical lens made of glass is used in the third lens from the object side has been known (refer to JP-A-2007-249073). In addition, an imaging lens system formed of five or six lenses including a plastic cemented lens has been known (JP-A-2006-284620). There are inventions disclosed in JP-A-2009-92797 and JP-A-2009-92798.

However, in the inventions disclosed in JP-A-2007-279073 or JP-A-2009-92798, the third lens can be made of glass. This causes an increase in cost. Further, by using an aspheric lens for the third lens, it is possible to satisfactorily correct field curvature additionally.

The lens system disclosed in JP-A-2006-284620 uses a cemented lens formed by cementing plastic aspheric lenses. When an aspheric lens is used in the cemented lens, manufacturing costs increase.

In recent years, imaging devices such as CCD elements and CMOS elements have been improved greatly in miniaturization and an increase in the number of pixels. Accordingly, imaging lens systems used in imaging apparatuses for an onboard camera, a mobile phone camera, a surveillance camera, and the like are required to achieve an increase in angle of view, reduction in size, and a decrease in aberration.

SUMMARY OF THE INVENTION

In consideration of the above-mentioned situations, an object of an illustrative, non-limiting embodiment of the invention is to provide an imaging lens system capable of achieving an increase in angle of view, reduction in size, and improvement in optical performance, and an imaging apparatus using the imaging lens system.

According to a first aspect of the invention, there is provided an imaging lens system including: in order from an object side thereof, a first lens which has a negative power; a second lens which has a negative power; a third lens; a fourth lens which has a positive power; a fifth lens; and a sixth lens which has a positive power. The first lens is made of glass, the second to sixth lenses are made of plastic, at least one lens surface of each of the second to sixth lenses is aspheric, and each of the third lens and the fifth lens is made of a material having an Abbe number of 45 or less at the d-line.

According to a second aspect of the invention, there is provided an imaging lens system including: in order from an object side thereof, a first lens which has a negative power and is a meniscus lens having a surface concave toward an image side of the imaging lens system; a second lens which has a negative power and in which at least one lens surface is aspheric; a third lens which has a positive power and in which at least an object side lens surface is aspheric, a central portion of the lens surface is convex, and the lens surface has a region, which has a larger positive power than the central portion, between the central portion and the peripheral portion within an effective diameter range; a fourth lens which has a positive power and of which at least one lens surface is aspheric; a fifth lens of which at least one lens surface is aspheric; and a sixth lens which has a positive power and of which at least one lens surface is aspheric.

The third lens may have a positive power and have an object side lens surface of which a central portion is convex.

The fifth lens may have a negative power.

In the imaging lens system of the first aspect and the imaging lens system of the second aspect, a stop may be disposed between the third lens and the fourth lens.

In the imaging lens system of the first aspect and the imaging lens system of the second aspect, the following Conditional Expression (1) may be satisfied.

$$2.0 < f45/f < 5.0 \quad (1)$$

f45 is a composite focal length of the fourth lens and the fifth lens, and f is a focal length of the imaging lens system.

In the imaging lens system of the first aspect and the imaging lens system of the second aspect, the following Conditional Expression (2) may be satisfied.

$$2.5 < (D4+D5)/f < 5.5 \quad (2)$$

D4 is an air space between the second lens and the third lens, D5 is a center thickness of the third lens, and f is a focal length of the imaging lens system.

In the imaging lens system of the first aspect and the imaging lens system of the second aspect, the following Conditional Expression (3) may be satisfied.

$$-0.1 < f/f3 < 0.5 \quad (3)$$

f3 is a focal length of the third lens, and f is a focal length of the imaging lens system.

A central portion of an image side lens surface of the second lens may be concave, and a peripheral portion thereof within an effective diameter range may have a smaller negative power than the central portion.

A central portion of an object side lens surface of the second lens may be convex and a peripheral portion thereof within an effective diameter range may have a smaller positive power than the central portion, or the central portion may be convex and the peripheral portion within the effective diameter range may have a negative power.

A central portion of an object side lens surface of the fifth lens may be concave, and a peripheral portion thereof within an effective diameter range may have a smaller negative power than the central portion.

A central portion of an image side lens surface of the fifth lens may be convex, and a peripheral portion thereof within an effective diameter range may have a smaller positive power than the central portion.

The fifth lens may be a meniscus lens having a surface concave toward the object side.

A central portion of an object side lens surface of the sixth lens may be convex, and a peripheral portion thereof within an effective diameter range may have a larger positive power than the central portion.

A central portion of an image side lens surface of the sixth lens may be convex, and a peripheral portion thereof within an effective diameter range may have a negative power.

In the imaging lens system of the first aspect and the imaging lens system of the second aspect, the following Conditional Expression (4) may be satisfied.

$$7 < L/f < 18 \quad (4)$$

f is a focal length of the imaging lens system, and L is a distance from an object side lens surface of the first lens to an imaging plane.

According to a third aspect of the invention, there is provided an imaging lens system including: in order from an object side thereof, a first lens which has a negative power; a second lens which has a negative power; a third lens; a fourth lens which has a positive power; a fifth lens which has a positive power; and a sixth lens which has a negative power. At least one lens surface of each of the second to sixth lenses is aspheric, and each of the third lens and the sixth lens is made of a material having an Abbe number of 45 or less at the d-line.

According to a fourth aspect of the invention, there is provided an imaging lens system including: in order from an object side thereof, a first lens which has a negative power and is a meniscus lens having a surface concave toward an image side of the imaging lens system; a second lens in which at least an image side lens surface is aspheric, a central portion of the lens surface is concave, and a peripheral portion thereof within an effective diameter range has a smaller negative power than the central portion; a third lens of which at least one lens surface is aspheric; a fourth lens which has a positive power and of which at least one lens surface is aspheric; a fifth lens which has a positive power and of which at least one lens surface is aspheric; and a sixth lens which has a negative power and of which at least one lens surface is aspheric.

In the imaging lens system of the third aspect and the imaging lens system of the fourth aspect, a stop may be disposed between the third lens and the fourth lens.

The third lens may have a positive power and have an object side lens surface of which a central portion is convex.

The first lens may be made of glass and each of the second to the sixth lenses may be made of plastic.

In the imaging lens system of the third aspect and the imaging lens system of the fourth aspect, the following Conditional Expression (11) may be satisfied.

$$2.0 < f56/f < 5.5 \quad (11)$$

f is a focal length of the imaging lens system, and f56 is a composite focal length of the fifth lens and the sixth lens.

In the imaging lens system of the third aspect and the imaging lens system of the fourth aspect, the following Conditional Expression (12) may be satisfied.

$$2.5 < (D4+D5)/f < 5.5 \quad (12)$$

f is a focal length of the imaging lens system, D4 is an air space between the second lens and the third lens, and D5 is a center thickness of the third lens.

In the imaging lens system of the third aspect and the imaging lens system of the fourth aspect, the following Conditional Expression (13) may be satisfied.

$$4.0 < f3/f < 9.0 \quad (13)$$

f is a focal length of the imaging lens system, and f3 is a focal length of the third lens.

A central portion of an image side lens surface of the second lens may be concave, and a peripheral portion thereof within an effective diameter range may have a smaller negative power than the central portion.

A central portion of an object side lens surface of the second lens may be convex and a peripheral portion thereof within an effective diameter range may have a smaller positive power than the central portion, or the central portion may be convex and the peripheral portion within the effective diameter range may have a negative power.

A central portion of an object side lens surface of the third lens may be convex, and the lens surface may have a region, which has a larger positive power than the central portion, within an effective diameter range.

A central portion of an image side lens surface of the fifth lens may be convex, and a peripheral portion thereof within an effective diameter range may have a smaller positive power than the central portion.

A central portion of an object side lens surface of the sixth lens may be concave, and a peripheral portion thereof within an effective diameter range may have a smaller negative power than the central portion.

A central portion of an image side lens surface of the sixth lens may be convex, and a peripheral portion thereof within an effective diameter range may have a smaller positive power than the central portion.

In the imaging lens system of the third aspect and the imaging lens system of the fourth aspect, the following Conditional Expression (14) may be satisfied.

$$11 < L/f < 18 \quad (14)$$

f is a focal length of the imaging lens system, and L is a distance from an object side lens surface of the first lens to an imaging plane.

According to another aspect of the invention, there is provided an imaging apparatus including: an imaging lens system according to any one of the first to the fourth aspect; and an imaging device which converts an optical image formed by the imaging lens system into an electric signal.

"The effective ray diameter of the lens surface" is defined as a diameter of a circle formed by intersection points between the lens surface and rays, which pass through outermost periphery (which is farthest from the optical axis) of the lens surface, among effective rays which pass through the lens surface. In addition, the effective ray passing through the lens surface is used to form a subject image.

Here, an effective ray diameter of the lens surface coincides with an effective diameter of the lens surface.

"The peripheral portion of the lens surface within the effective diameter range" is defined as a portion where the lens surface intersects with the rays, which pass through the outermost periphery (which is farthest from the optical axis of the lens) of the lens surface, among the rays passing through the lens surface within the effective diameter range.

"The lens which has a positive power" is defined as a lens which has a positive power in the paraxial region.

"The lens which has a negative power" is defined as a lens which has a negative power in the paraxial region.

"The central portion of the lens surface is convex and the peripheral portion thereof within the effective diameter range has a smaller positive power than the central portion", this configuration is defined as follows. The central portion and the peripheral portion within the effective diameter range forms a convex surface, and an absolute value of radius of curvature of the peripheral portion within the effective diameter range is larger than an absolute value of radius of curvature of the central portion.

"The central portion of the lens surface is convex and the peripheral portion thereof within the effective diameter range has a larger positive power than the central portion", this configuration is defined as follows. The central portion and the peripheral portion within the effective diameter range are formed as a convex surface, and an absolute value of radius of curvature of the peripheral portion within the effective diameter range is smaller than an absolute value of radius of curvature of the central portion.

"The central portion of the lens surface is convex and the peripheral portion within the effective diameter range has a negative power", this configuration is defined as follows. The central portion of the lens surface is convex, and the peripheral portion within the effective diameter range is concave.

"The central portion of the lens surface is concave, and the peripheral portion thereof within the effective diameter range has a smaller negative power than the central portion", this configuration is defined as follows. The central portion and the peripheral portion within the effective diameter range are formed as a concave surface, and an absolute value of radius of curvature of the peripheral portion within the effective diameter range is larger than an absolute value of radius of curvature of the central portion.

"The central portion of the lens surface is concave and the peripheral portion within the effective diameter range has a positive power", this configuration is defined as follows. The central portion of the lens surface is concave and the peripheral portion within the effective diameter range is convex.

"A power of the central portion of the lens surface is smaller than a power of the peripheral portion within the effective diameter", this configuration is defined as follows. The central portion and the peripheral portion within the effective diameter range are formed as a convex surface, and the peripheral portion within the effective diameter range has a smaller positive power than the central portion. Alternatively, the central portion and the peripheral portion within the effective diameter range are formed as a concave surface, and the peripheral portion within the effective diameter range has a smaller negative power than the central portion.

"The central portion of the lens surface is concave, and the peripheral portion thereof within the effective diameter range has a larger negative power than the central portion", this configuration is defined as follows. The central portion and the peripheral portion within the effective diameter range are formed as a concave surface, and an absolute value of radius of curvature of the peripheral portion within the effective diameter range is smaller than an absolute value of radius of curvature of the central portion.

"The central portion of the lens surface is convex, and the lens surface has a region, which has a larger positive power than the central portion, between the central portion of the lens surface and the peripheral portion thereof within the effective diameter range", this configuration is defined as follows. The entire surface from the central portion of the lens surface to the peripheral portion within the effective diameter range is formed as a convex surface. In addition, the lens surface has a region, which has a smaller absolute value of radius of curvature than the central portion, between the central portion and the peripheral portion within the effective diameter range.

"The lens surface has a region, which has a larger positive power than the central portion, between the central portion of the lens surface and the peripheral portion within the effective diameter range, and the peripheral portion within the effective diameter range has a smaller positive power than the central portion", this configuration is defined as follows. The entire surface from the central portion of the lens surface to the peripheral portion within the effective diameter range is formed as a convex surface. In addition, the lens surface has a region, which has a smaller absolute value of radius of curvature than the central portion, between the central portion and the peripheral portion within the effective diameter range. In addition, an absolute value of radius of curvature of the peripheral portion within the effective diameter range is larger than an absolute value of radius of curvature of the central portion.

The radius of curvature of the central portion is defined as a radius of curvature of the lens surface at a position where the lens surface intersects with the optical axis.

A value of radius of curvature is expressed in terms of an absolute value. The reason is that it is necessary to be clear in magnitude correlation of radius of curvatures.

BRIEF DESCRIPTION OF THE DRAWINGS

The features of the invention will appear more fully upon consideration of the exemplary embodiment of the invention, which are schematically set forth in the drawings, in which:

FIGS. 11A-11D are diagrams showing basic data of the imaging lens system according to Example 1;

FIGS. 12A-12D are diagrams showing basic data of the imaging lens system according to Example 2;

FIGS. 13A-13D are diagrams showing basic data of the imaging lens system according to Example 3;

FIGS. 14A-14D are diagrams showing basic data of the imaging lens system according to Example 4;

FIGS. 15A-15D are diagrams showing basic data of the imaging lens system according to Example 5.

FIGS. 16A-16D are diagrams showing basic data of the imaging lens system according to Example 6;

FIGS. 17A-17D are diagrams showing basic data of the imaging lens system according to Example 7;

FIGS. 18A-18D are diagrams showing basic data of the imaging lens system according to Example 8;

FIG. 19 is a diagram showing values corresponding to various parameters in Conditional Expressions (1) to (8) for each example;

FIGS. 34A-34D are diagrams showing basic data of the imaging lens system according to Example 9;

FIGS. 35A-35D are diagrams showing basic data of the imaging lens system according to Example 10;

FIGS. 36A-36D are diagrams showing basic data of the imaging lens system according to Example 11;

FIGS. 37A-37D are diagrams showing basic data of the imaging lens system according to Example 12;

FIG. 38 is a diagram showing values corresponding to various parameters in Conditional Expressions (11) to (19) for each example;

DETAILED DESCRIPTION OF THE EXEMPLARY EMBODIMENTS

Figure 1:
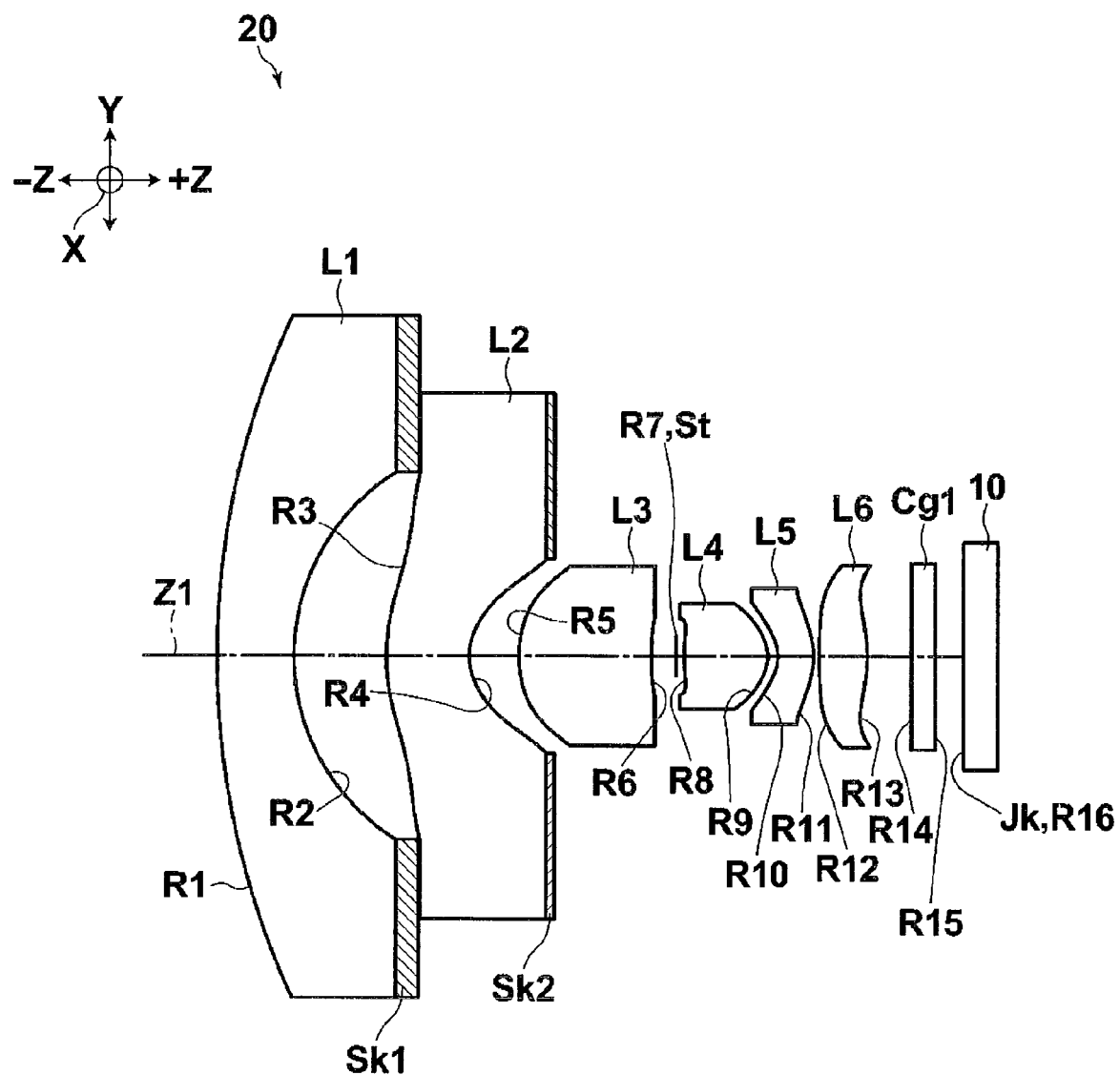
FIG. 1 is a diagram illustrating a schematic configuration of an imaging lens system according to an exemplary embodiment of the present invention.

According to the first aspect of the invention, an imaging lens system and an imaging apparatus using the imaging lens system are configured as follows. The imaging lens system includes, in order from an object side: a first lens which has a negative power; a second lens which has a negative power; a third lens; a fourth lens which has a positive power; a fifth lens; and a sixth lens which has a positive power. The first lens is made of glass, and the second to sixth lenses are made of plastic. At least one lens surface of each lens of the second to sixth lenses is aspheric, and each of the third lens and the fifth lens is made of a material having an Abbe number of 45 or less at the d-line. By adopting such a configuration, it is possible to achieve improvement in optical performance while achieving an increase in angle of view and reduction in size.

Since the negative first and second lenses are disposed closest to the object side, it is possible to take a ray incident at a large angle of view, and an increase in angle of view can be achieved in the optical system. Since at least one surface of the second lens is aspheric, it is possible to satisfactorily correct various aberrations, and it is also possible to downsize the lens system. Since on-axis rays and off-axis rays are separated in the second lens, making the lens aspheric is advantageous in aberration correction, and it becomes easier to correct distortion.

Furthermore, in the first lens, the on-axis rays and off-axis rays are separated. However, it is preferred that the first lens disposed closest to the object side of the lens system be made of glass as described later. The first lens is formed as a largest-aperture lens in the lens system. Under such a situation, it is preferred that the second lens, to which a plastic material is easily applied, be formed as an aspheric lens, in terms of lens manufacture and aberration correction.

Each of the third lens, the fourth lens, and the sixth lens is formed as a positive lens of which at least one surface is aspheric, and the aperture diaphragm is disposed between the third lens and the fourth lens. By adopting such a configuration, it is possible to satisfactorily correct spherical aberration, field curvature, and comatic aberration, and it is also possible to downsize the lens system.

Since each of the third lens and the fifth lens is made of a material having an Abbe number of 45 or less at the d-line, it is possible to satisfactorily correct longitudinal chromatic aberration and lateral chromatic aberration.

Since the first lens is made of glass, it is possible to fabricate an unbreakable imaging lens system with high anti-weatherability. Since the second to sixth lenses are made of plastic, it is possible to accurately form an aspheric shape, and it is possible to provide a low-cost and lightweight lens system.

According to the second aspect of the invention, an imaging lens system and an imaging apparatus using the imaging lens system are configured as follows. The imaging lens system includes, in order from an object side: a first lens which has a negative power and is a meniscus lens having a surface concave toward an image side; a second lens which has a negative power and of which at least one lens surface is aspheric; a third lens which has a positive power and in which at least an object side lens surface is aspheric, a central portion of the lens surface is convex, and the lens surface has a region, which has a larger positive power than the central portion, between the central portion and the peripheral portion; a fourth lens which has a positive power and of which at least one lens surface is aspheric; a fifth lens of which at least one lens surface is aspheric; and a sixth lens which has a positive power and of which at least one lens surface is aspheric. By adopting such a configuration, it is possible to achieve improvement in optical performance while achieving an increase in angle of view and reduction in size.

Since the negative first and second lenses are disposed closest to the object side in order from the object side, it is possible to take a ray incident at a large angle of view, and an increase in angle of view can be achieved in the optical system. Since the first lens is formed as a meniscus lens having a surface concave toward an image side, it is possible to satisfactorily correct field curvature.

Since at least one surface of the second lens is aspheric, it is possible to satisfactorily correct various aberrations, and it is also possible to downsize the lens system. Since on-axis rays and off-axis rays are separated in the second lens, making the lens aspheric is advantageous in aberration correction, and it becomes easier to correct distortion.

Furthermore, in the first lens, the on-axis rays and off-axis rays are separated. However, it is preferred that the first lens disposed closest to the object side of the lens system be made of glass as described later. The first lens is formed as a largest-aperture lens in the lens system. Under such a situation, it is preferred that the second lens, to which a plastic material is easily applied, be formed as an aspheric lens, in terms of lens manufacture and aberration correction.

The third lens is formed as a lens in which at least an object side lens surface is aspheric, the central portion of the lens surface is convex and the lens surface has a region, which has a larger positive power than the portion, between the central portion and the peripheral portion. By adopting such a configuration, it is possible to satisfactorily correct field curvature while securing a long back focal length.

Each of the fourth lens and the sixth lens is formed as a positive lens of which at least one surface is aspheric, the fifth lens is formed as a lens of which at least one surface is aspheric, and the aperture diaphragm is disposed between the third lens and the fourth lens. By adopting such a configuration, it is possible to satisfactorily correct spherical aberration, field curvature, and comatic aberration, and it is also possible to downsize the lens system.

According to the third aspect of the invention, an imaging lens system and an imaging apparatus using the imaging lens system are configured as follows. The imaging lens system includes, in order from an object side: a first lens which has a negative power; a second lens which has a negative power; a third lens; a fourth lens which has a positive power; a fifth lens which has a positive power; and a sixth lens which has a negative power. At least one lens surface of each lens of the second to sixth lenses is aspheric, and each of the third lens and the sixth lens is made of a material having an Abbe number of 45 or less at the d-line. By adopting such a configuration, it is possible to achieve improvement in optical performance while achieving an increase in angle of view and reduction in size.

Since the negative first and second lenses are disposed closest to the object side in order from the object side, it is possible to take a ray incident at a large angle of view, and an increase in angle of view can be achieved in the optical system. Since at least one surface of the second lens is aspheric, it is possible to satisfactorily correct various aberrations, and it is also possible to downsize the lens system. Since on-axis rays and off-axis rays are separated in the second lens, making the lens aspheric is advantageous in aberration correction, and it becomes easier to correct distortion.

Furthermore, in the first lens, the on-axis rays and off-axis rays are separated. However, it is preferred that the first lens disposed closest to the object side of the lens system be made of glass as described later. The first lens is formed as a largest-aperture lens in the lens system. Under such a situation, it is preferred that the second lens, to which a plastic material is easily applied, be formed as an aspheric lens, in terms of lens manufacture and aberration correction.

Since at least one lens surface of each lens of the second to sixth lenses is aspheric, it is possible to satisfactorily correct spherical aberration, field curvature, and comatic aberration lens system, and it is also possible to downsize the lens system.

Since each of the third lens and the sixth lens is made of a material having an Abbe number of 45 or less at the d-line, it is possible to satisfactorily correct longitudinal chromatic aberration and lateral chromatic aberration.

According to the fourth aspect of the invention, an imaging lens system and an imaging apparatus using the imaging lens system are configured as follows. The imaging lens system includes, in order from an object side: a first lens which has a negative power and is a meniscus lens having a surface concave toward an image side; a second lens in which at least an image side lens surface is aspheric, a central portion of the image side lens surface is concave, and a peripheral portion thereof within an effective diameter range has a smaller negative power than the central portion; a third lens of which at least one lens surface is aspheric; a fourth lens which has a positive power and of which at least one lens surface is aspheric; a fifth lens which has a positive power and of which at least one lens surface is aspheric; and a sixth lens which has a negative power and of which at least one lens surface is aspheric. By adopting such a configuration, it is possible to achieve improvement in optical performance while achieving an increase in angle of view and reduction in size.

Since the negative first and second lenses are disposed closest to the object side in order from the object side, it is possible to take a ray incident at a large angle of view, and an increase in angle of view can be achieved in the optical system. Since the first lens is formed as a meniscus lens having a surface concave toward an image side, it is possible to satisfactorily correct field curvature.

Since at least the image side lens surface of the second lens is aspheric, it is possible to satisfactorily correct various aberrations, and it is also possible to downsize the lens system. Since on-axis rays and off-axis rays are separated in the second lens, making the lens aspheric is advantageous in aberration correction, and it becomes easier to correct distortion.

Furthermore, in the first lens, the on-axis rays and off-axis rays are separated. However, it is preferred that the first lens disposed closest to the object side of the lens system be made of glass as described later. The first lens is formed as a largest-aperture lens in the lens system. Under such a situation, it is preferred that the second lens, to which a plastic material is easily applied, be formed as an aspheric lens, in terms of lens manufacture and aberration correction.

In the second lens, at least the image side lens surface is aspheric, the central portion of the lens surface is concave, and the peripheral portion thereof within an effective diameter range has a smaller negative power than the central portion. By adopting such a configuration, it is possible to concentrate rays without sudden deflection of rays passing through the periphery of the second lens. As a result, it is possible to satisfactorily correct distortion.

Since the third lens is formed as a lens of which at least one lens surface is aspheric, it is possible to satisfactorily correct field curvature.

Each of the fourth lens and the fifth lens is formed as a positive lens of which at least one surface is aspheric, the sixth lens is formed as a negative lens of which at least one surface is aspheric, and the aperture diaphragm is disposed between the third lens and the fourth lens. By adopting such a configuration, it is possible to satisfactorily correct spherical aberration, field curvature, and comatic aberration, and it is also possible to downsize the lens system.

Hereinafter, exemplary embodiments of the imaging lens according to first to fourth aspects of the invention and the imaging apparatus using the imaging lens system will be described in detail with reference to the accompanying drawings.

FIG. 1 is a sectional diagram illustrating a schematic configuration of an imaging apparatus using the imaging lens system according to the first or second aspect of the invention.

Figure 2:
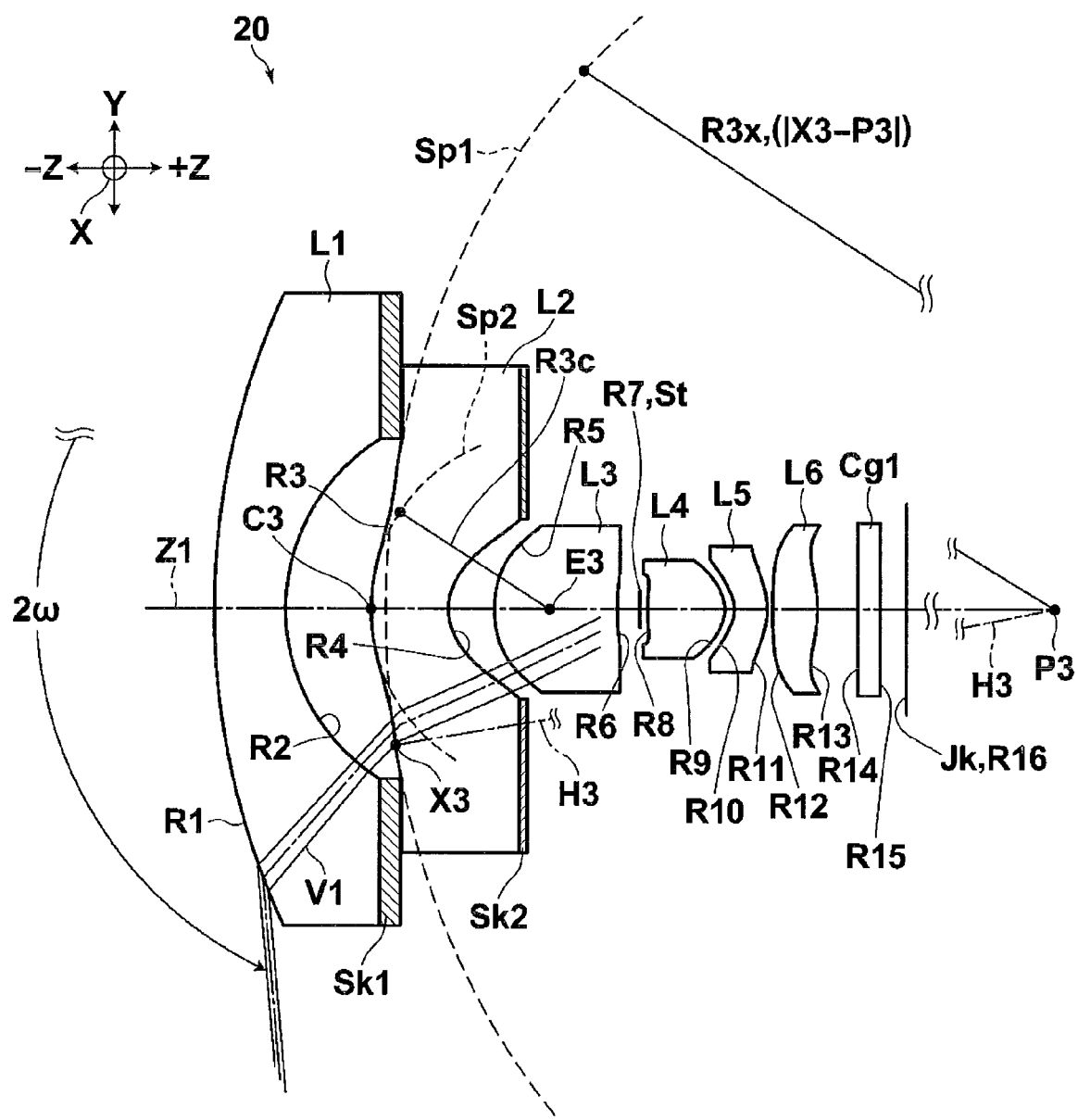
FIG. 2 is a diagram explaining the schematic configuration shown in FIG. 1 with additional lines for explanation.
Figure 3:
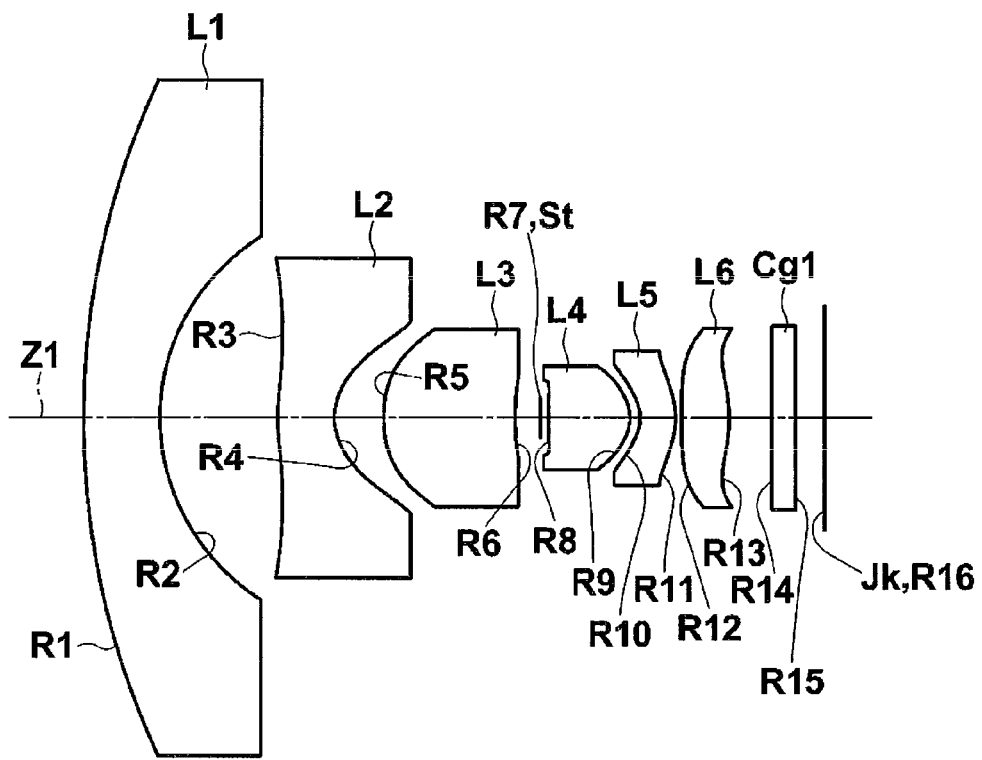
FIG. 3 is a sectional diagram illustrating a schematic configuration of an imaging lens system according to Example 1.
Figure 4:
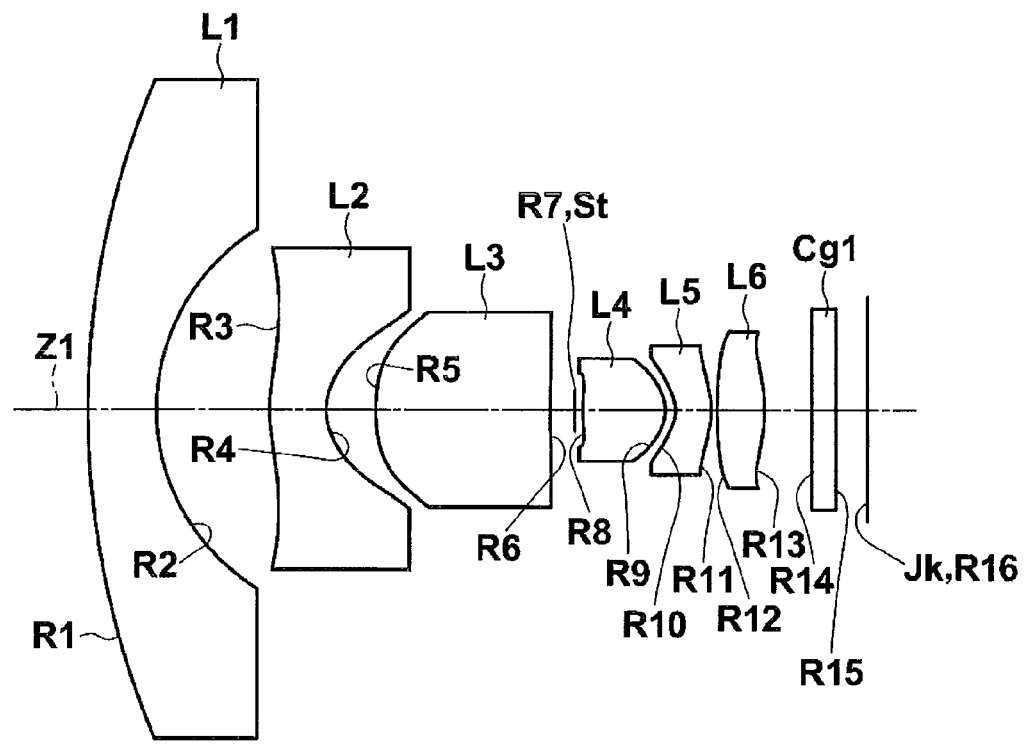
FIG. 4 is a sectional diagram illustrating a schematic configuration of an imaging lens system according to Example 2.
Figure 5:
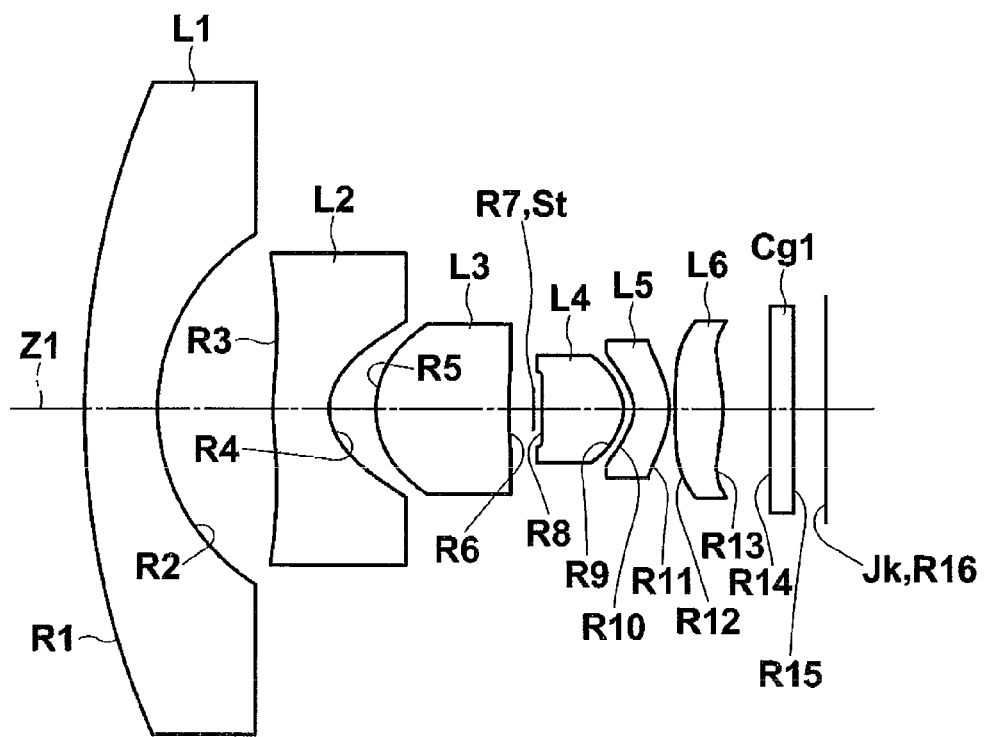
FIG. 5 is a sectional diagram illustrating a schematic configuration of an imaging lens system according to Example 3.
Figure 6:
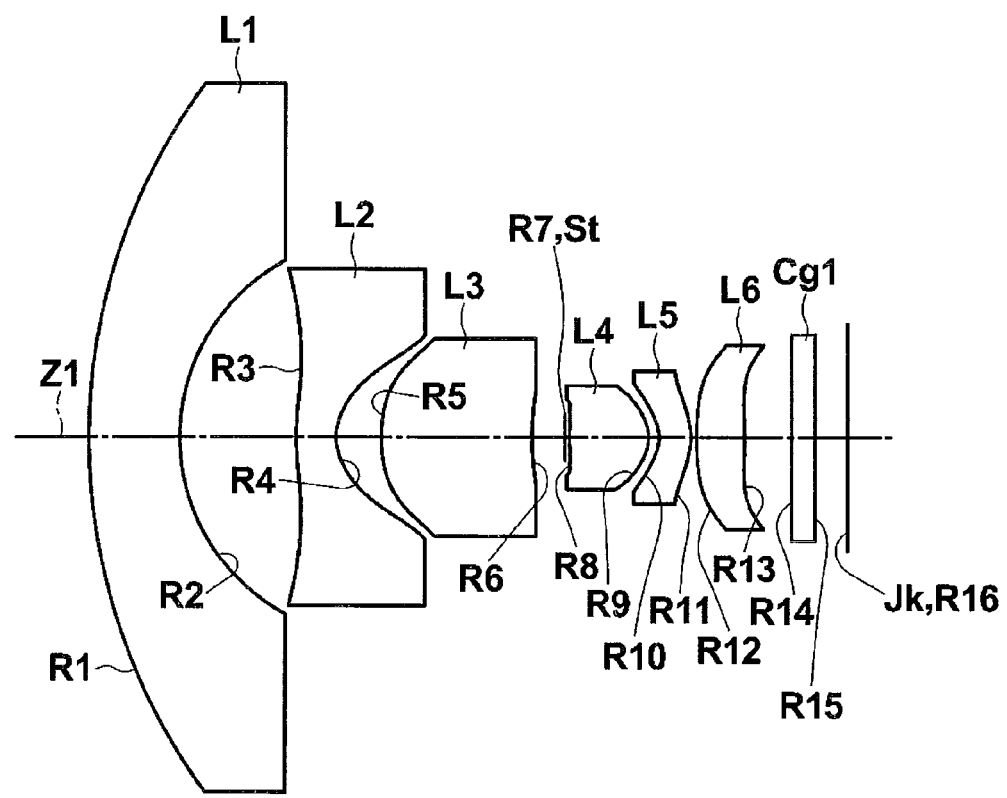
FIG. 6 is a sectional diagram illustrating a schematic configuration of an imaging lens system according to Example 4.
Figure 7:
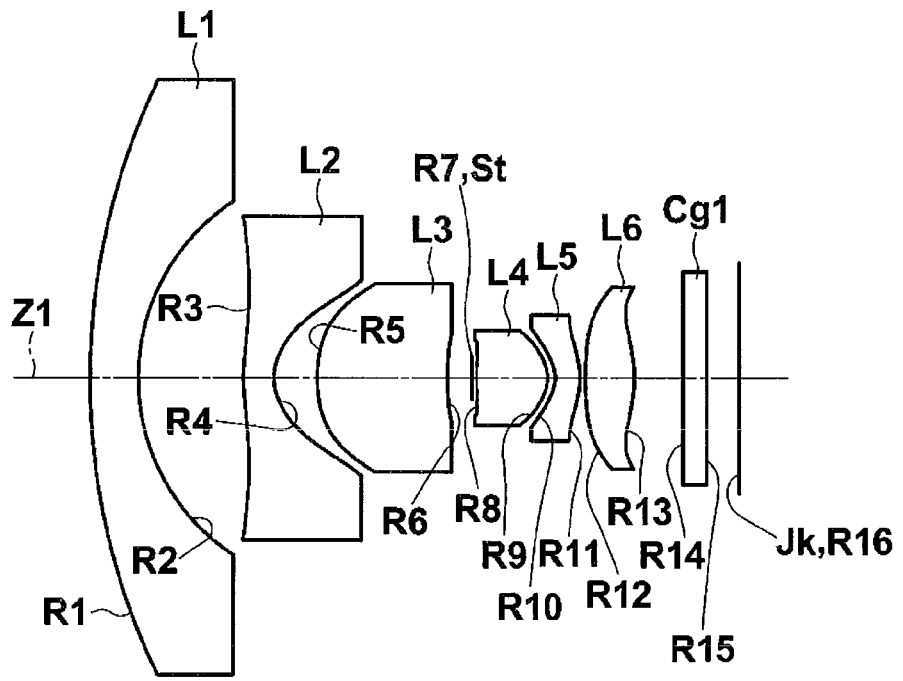
FIG. 7 is a sectional diagram illustrating a schematic configuration of an imaging lens system according to Example 5.
Figure 8:
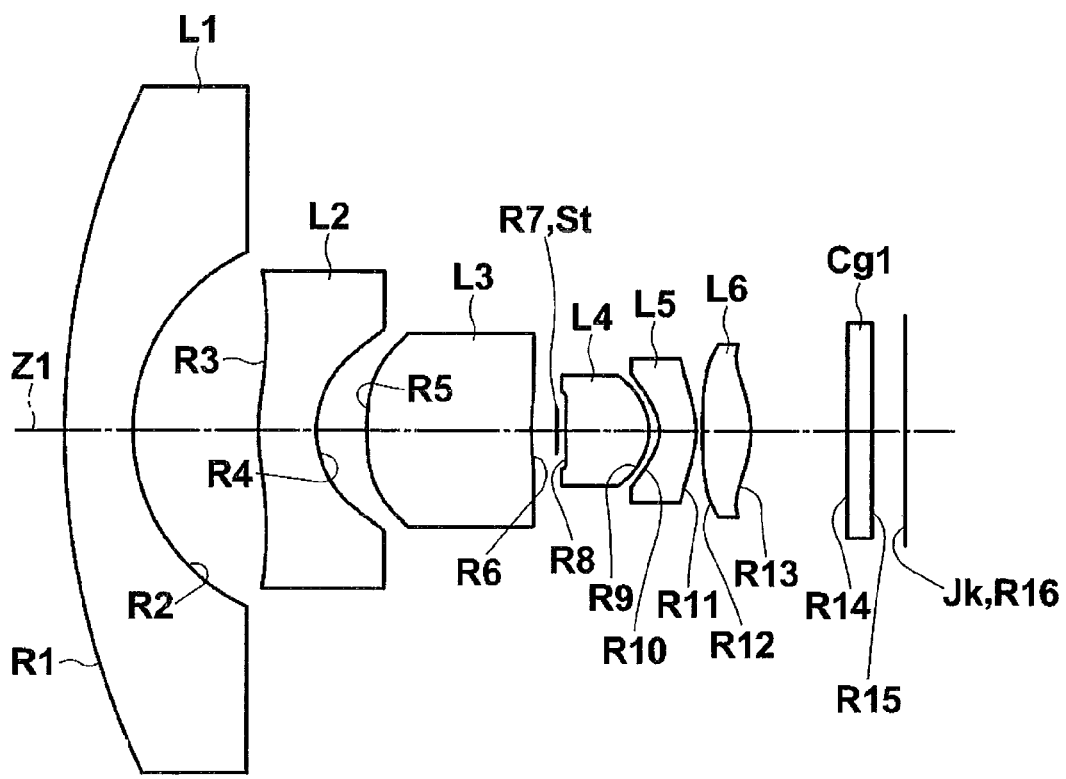
FIG. 8 is a sectional diagram illustrating a schematic configuration of an imaging lens system according to Example 6.
Figure 9:
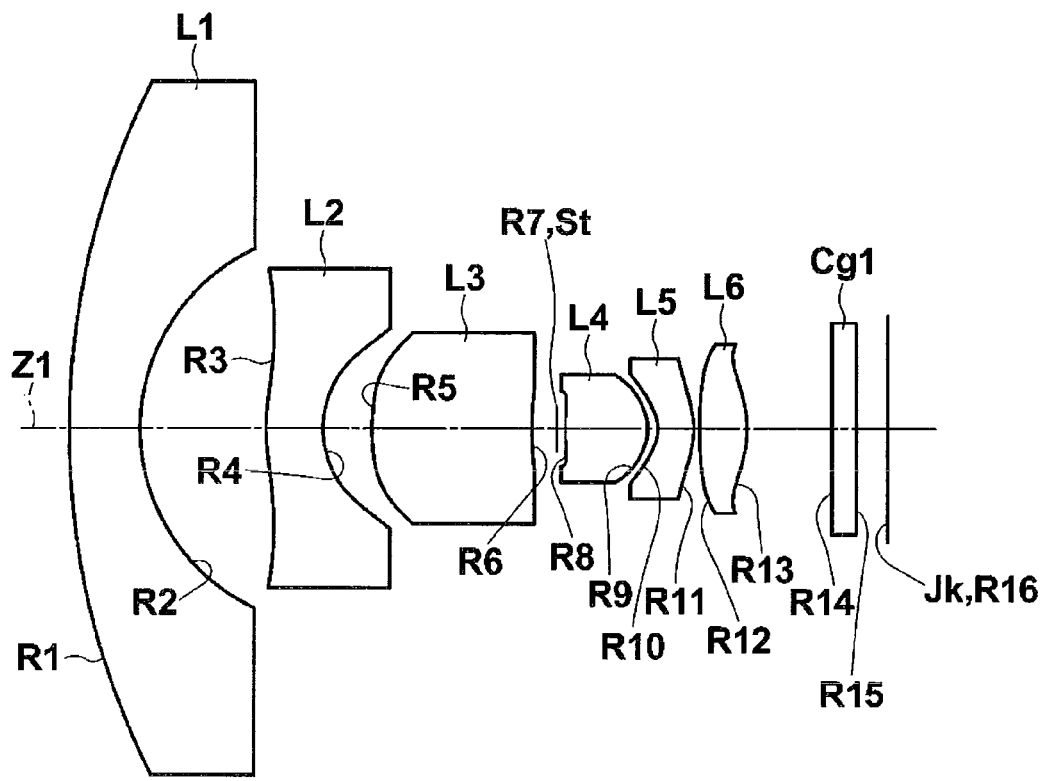
FIG. 9 is a sectional diagram illustrating a schematic configuration of an imaging lens system according to Example 7
Figure 10:
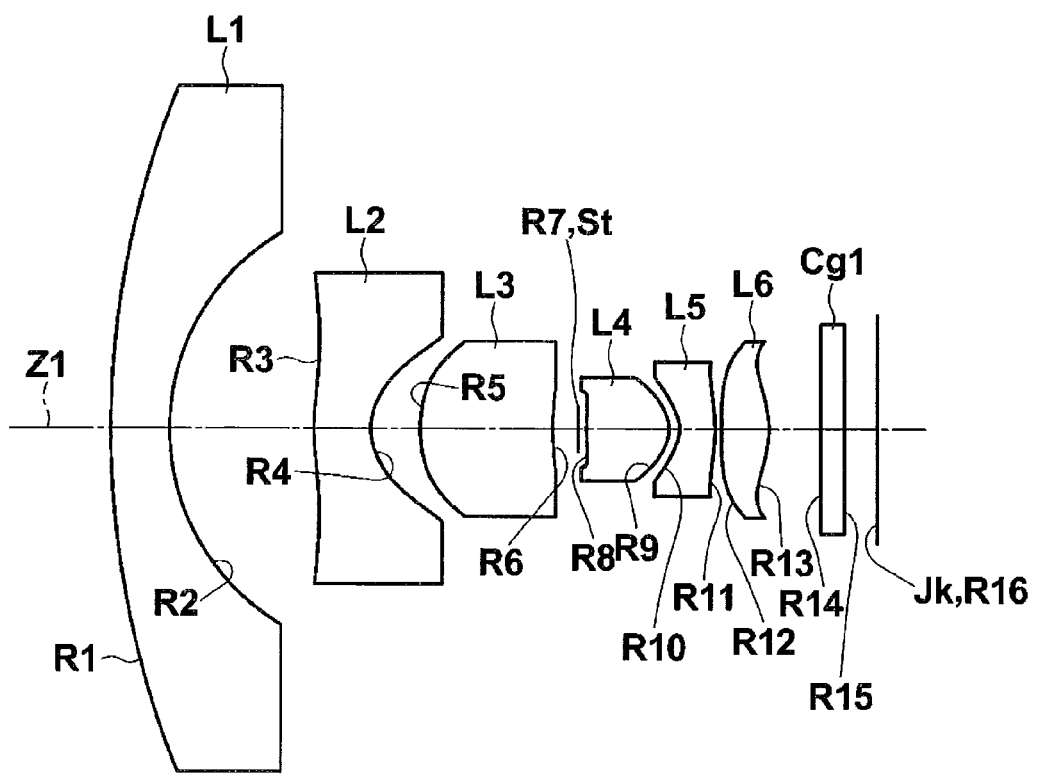
FIG. 10 is a sectional diagram illustrating a schematic configuration of an imaging lens system according to Example 8.
Figure 20:
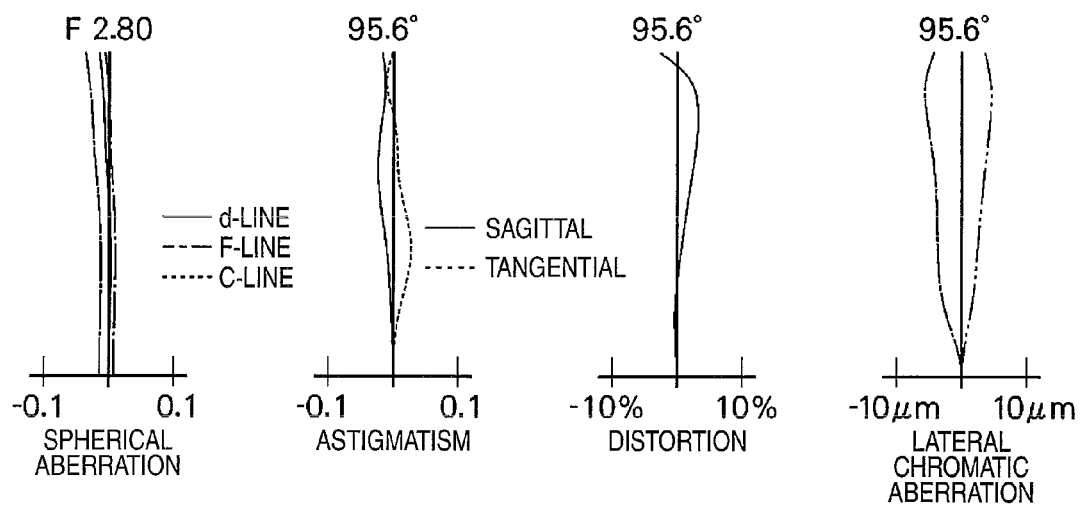
FIG. 20 is diagrams showing various aberrations of the imaging lens system according to Example 1.
Figure 21:
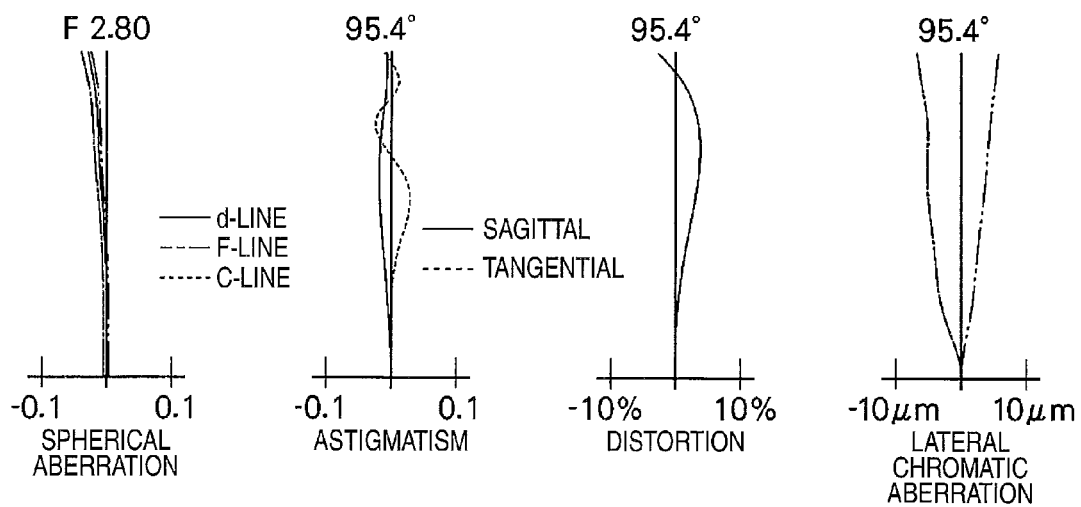
FIG. 21 is diagrams showing various aberrations of the imaging lens system according to Example 2.
Figure 22:
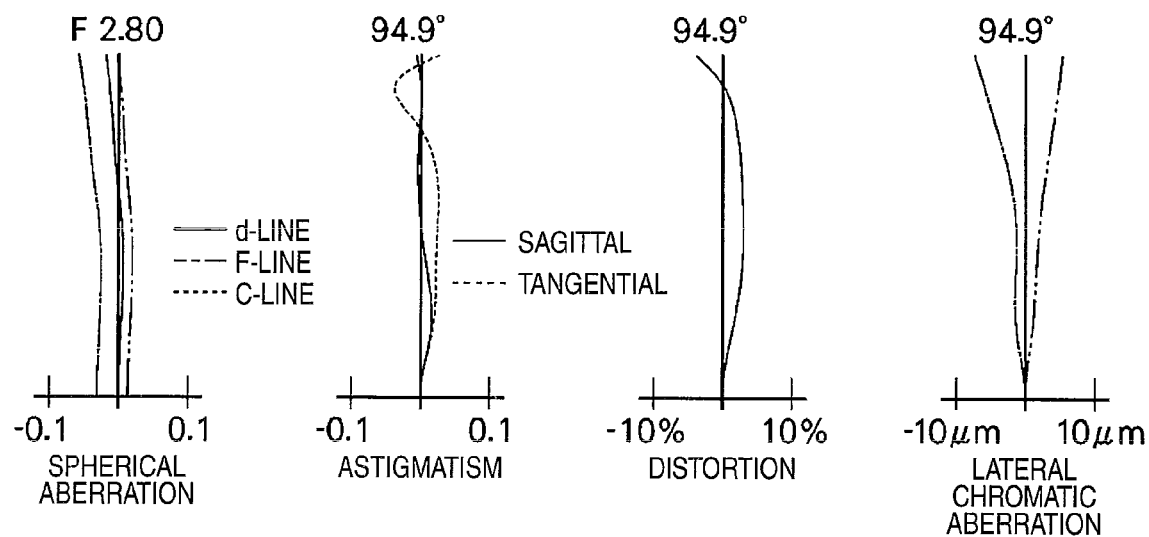
FIG. 22 is diagrams showing various aberrations of the imaging lens system according to Example 3.
Figure 23:
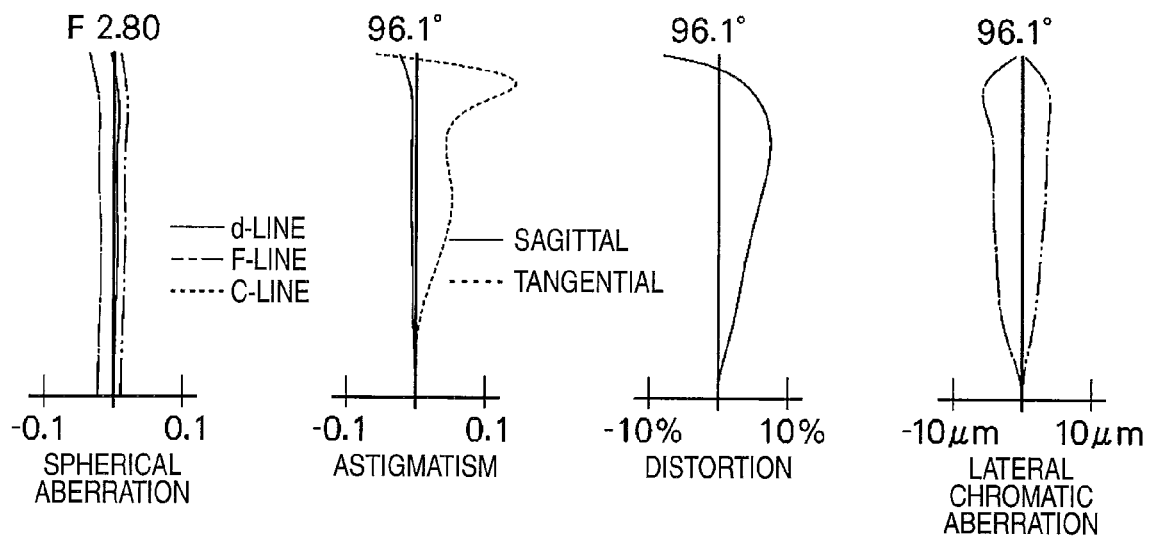
FIG. 23 is diagrams showing various aberrations of the imaging lens system according to Example 4.
Figure 24:
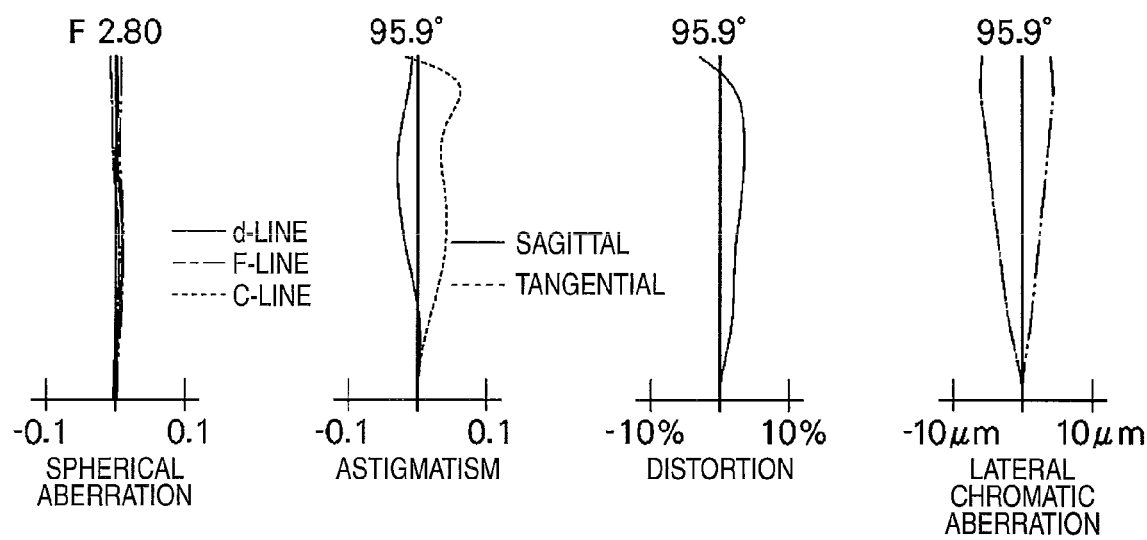
FIG. 24 is diagrams showing various aberrations of the imaging lens system according to Example 5.
Figure 25:
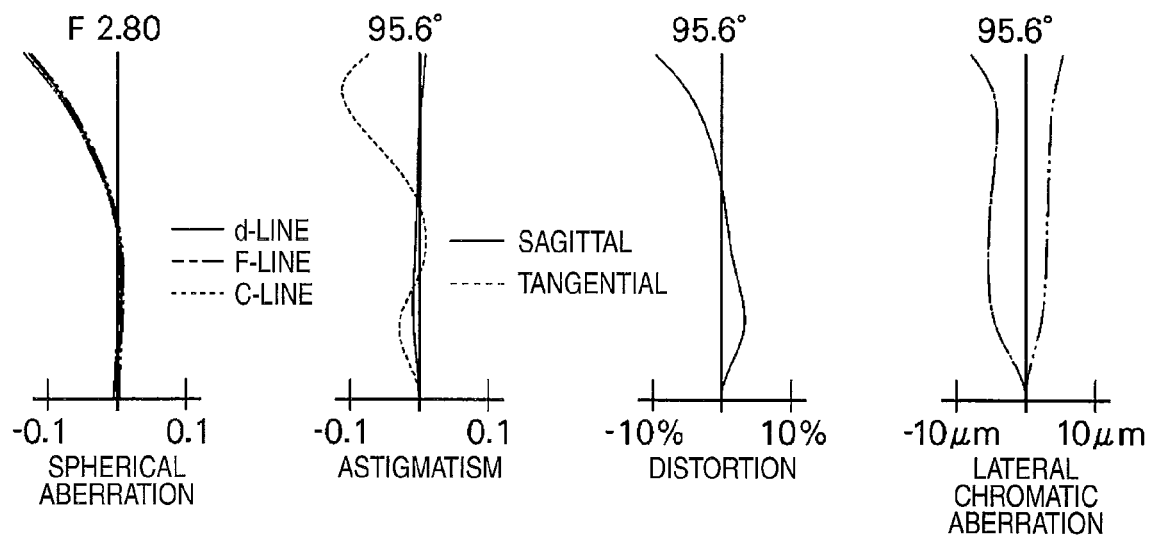
FIG. 25 is diagrams showing various aberrations of the imaging lens system according to Example 6.
Figure 26:
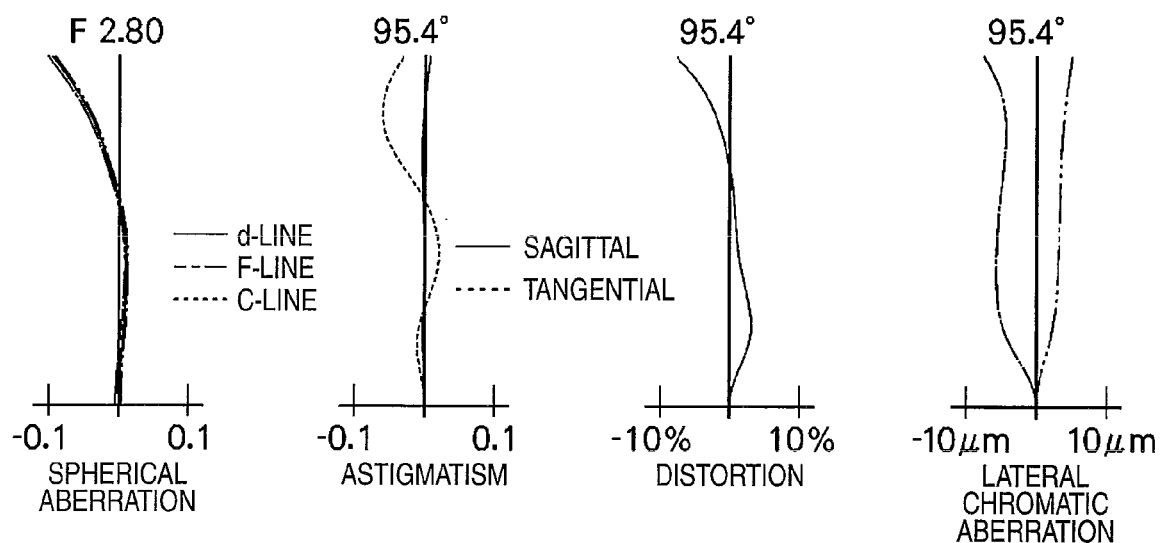
FIG. 26 is diagrams showing various aberrations of the imaging lens system according to Example 7.
Figure 27:
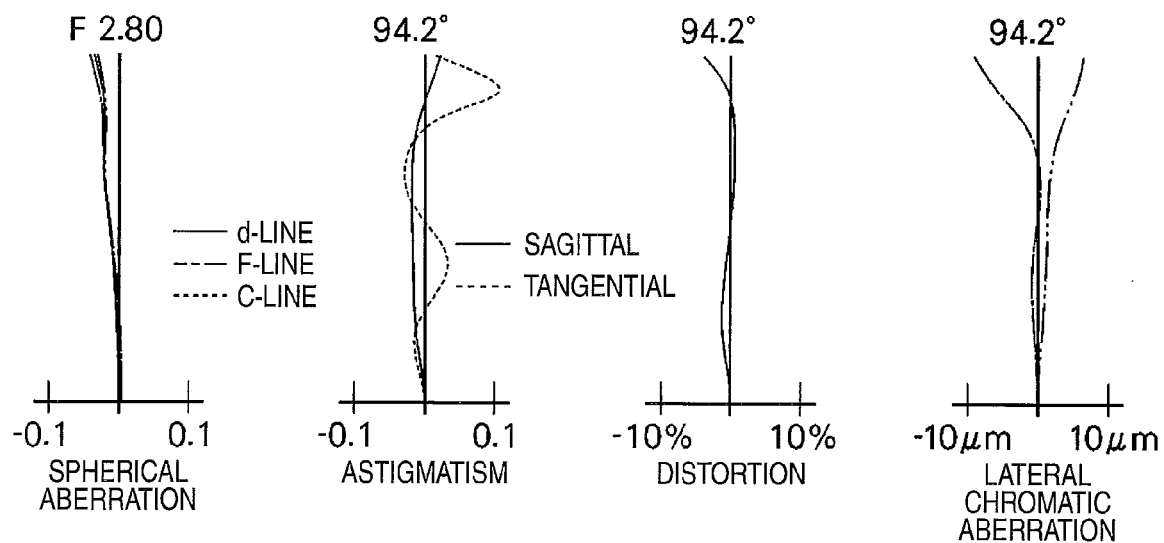
FIG. 27 is diagrams showing various aberrations of the imaging lens system according to Example 8.
Figure 28:
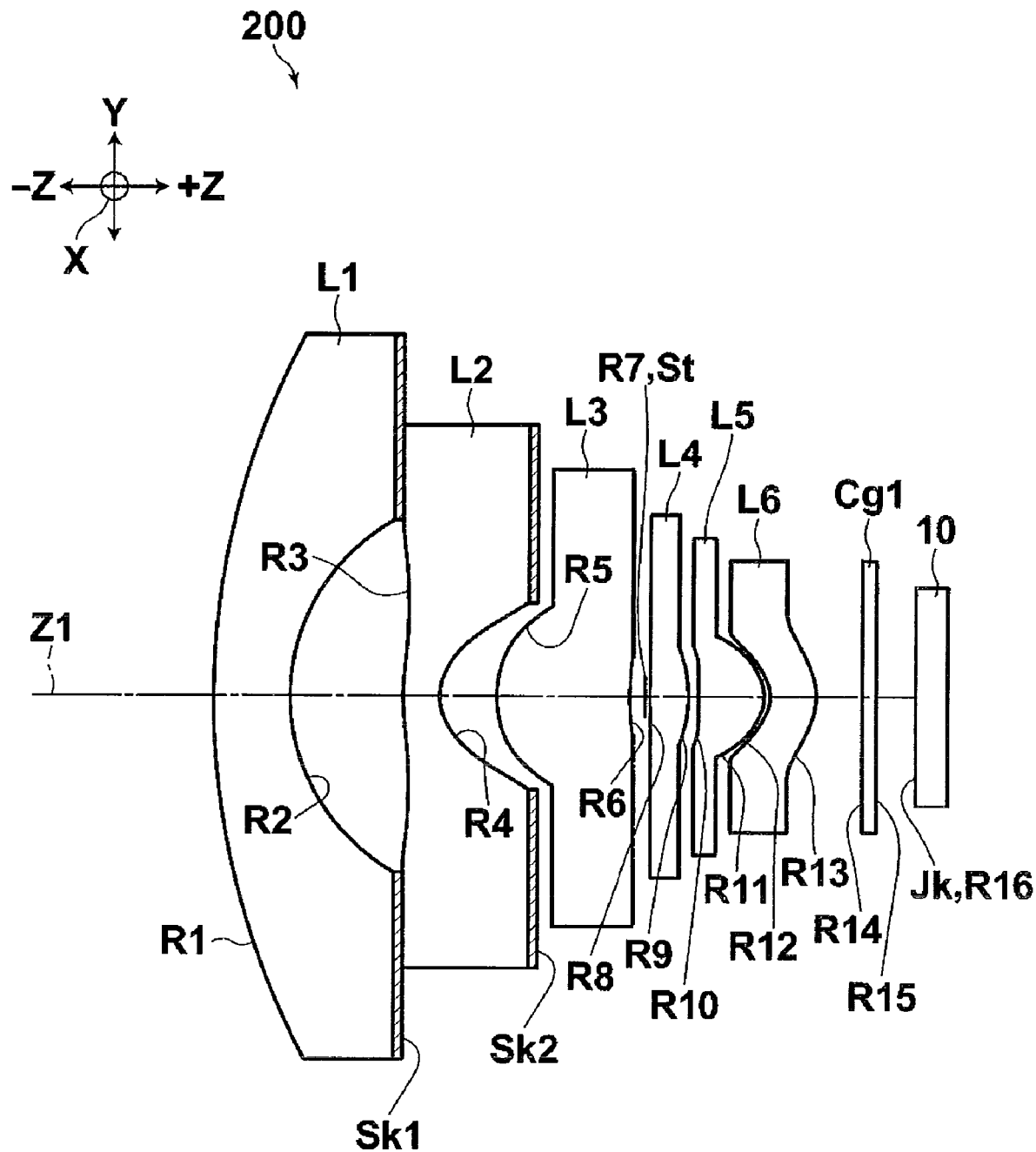
FIG. 28 is a diagram illustrating a schematic configuration of an imaging lens system according to an exemplary embodiment of the invention.
Figure 29:
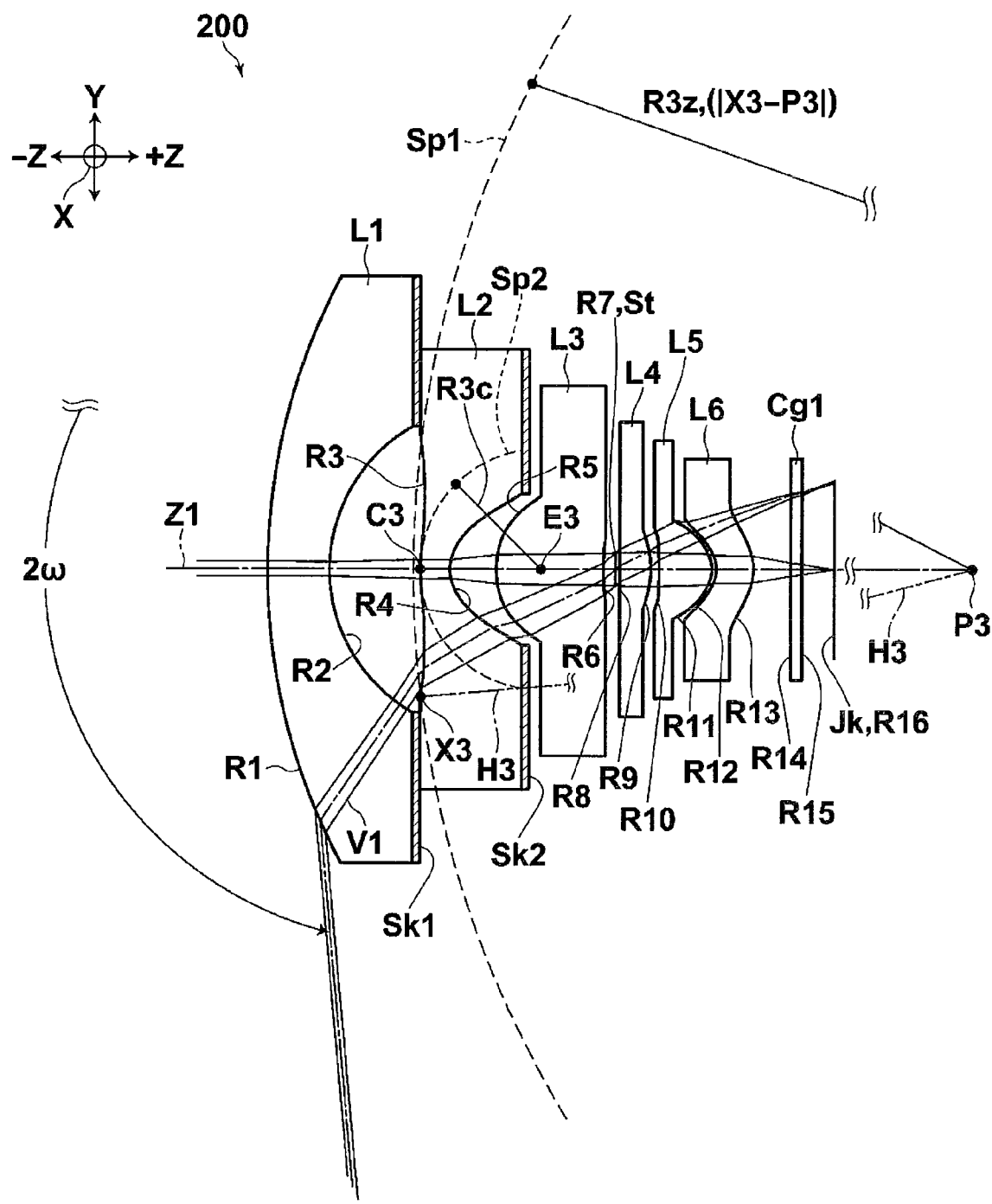
FIG. 29 is a diagram explaining the schematic configuration shown in FIG. 28 with additional lines for explanation.
Figure 30:
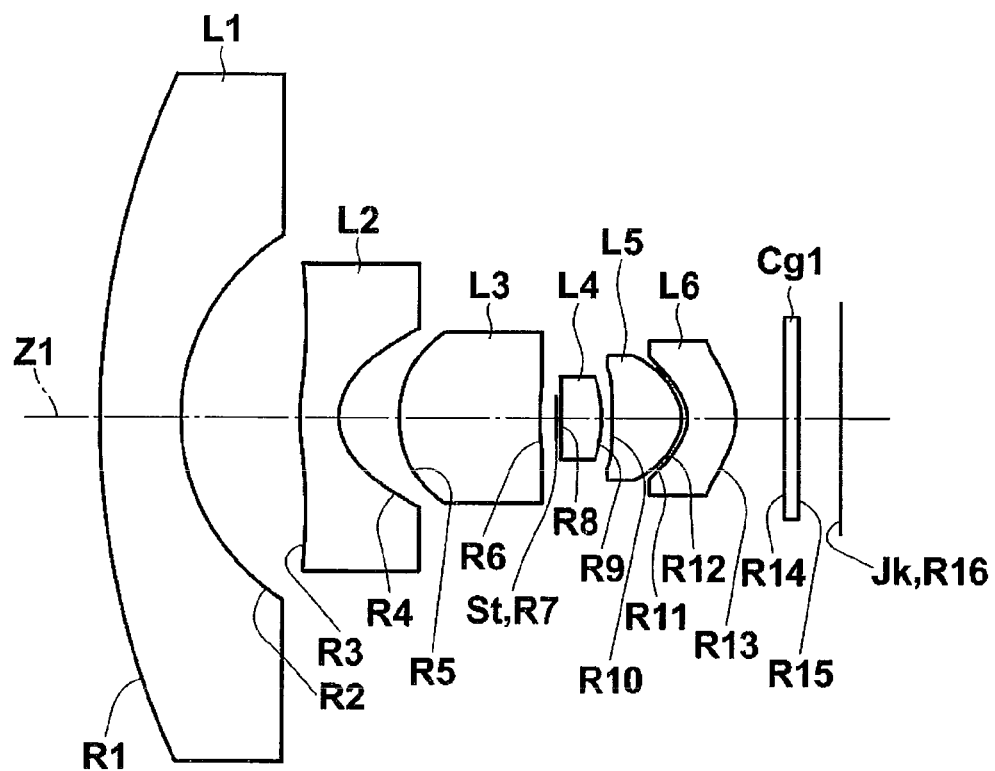
FIG. 30 is a sectional diagram illustrating a schematic configuration of an imaging lens system according to Example 9.
Figure 31:
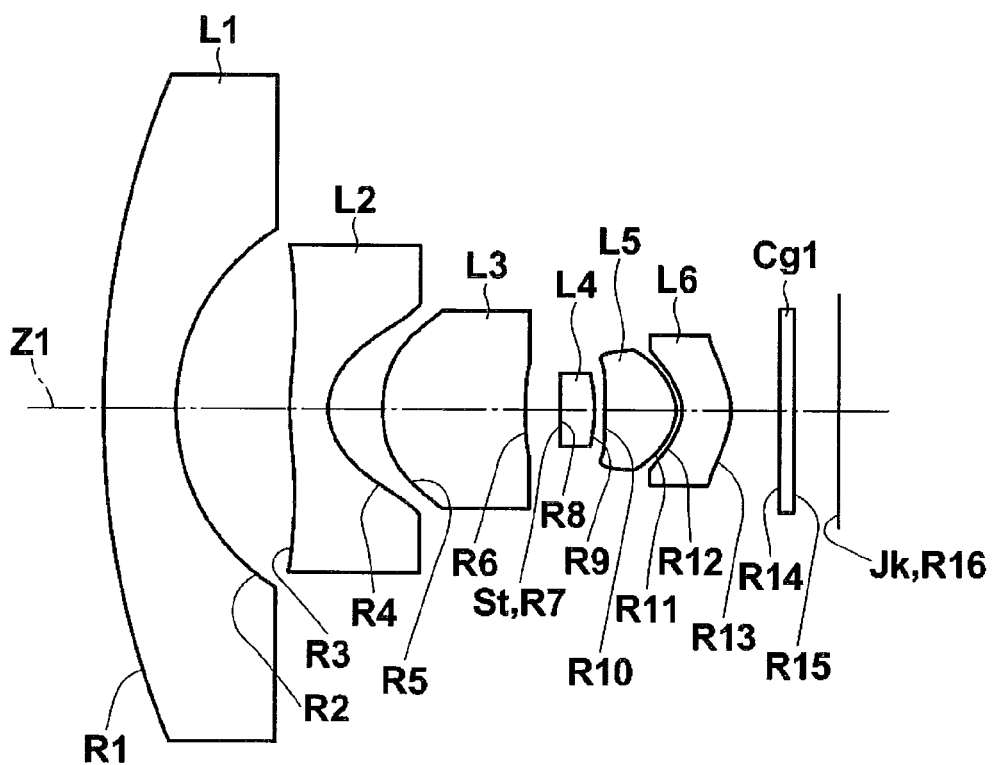
FIG. 31 is a sectional diagram illustrating a schematic configuration of an imaging lens system according to Example 10.
Figure 32:
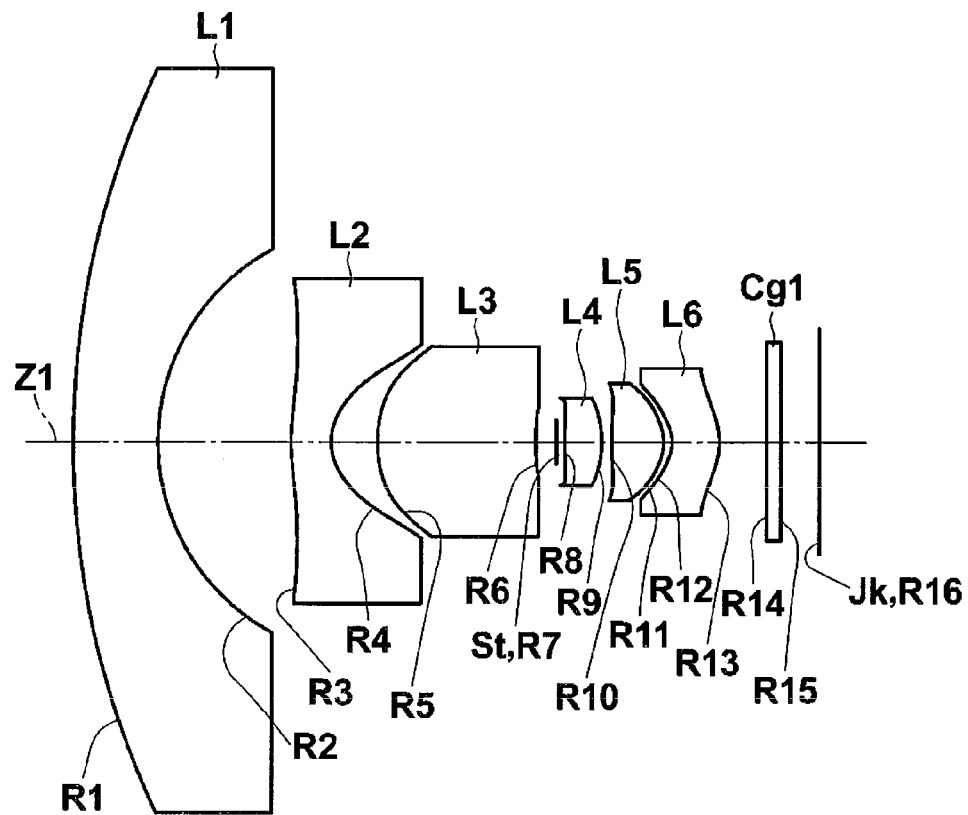
FIG. 32 is a sectional diagram illustrating a schematic configuration of an imaging lens system according to Example 11.
Figure 33:
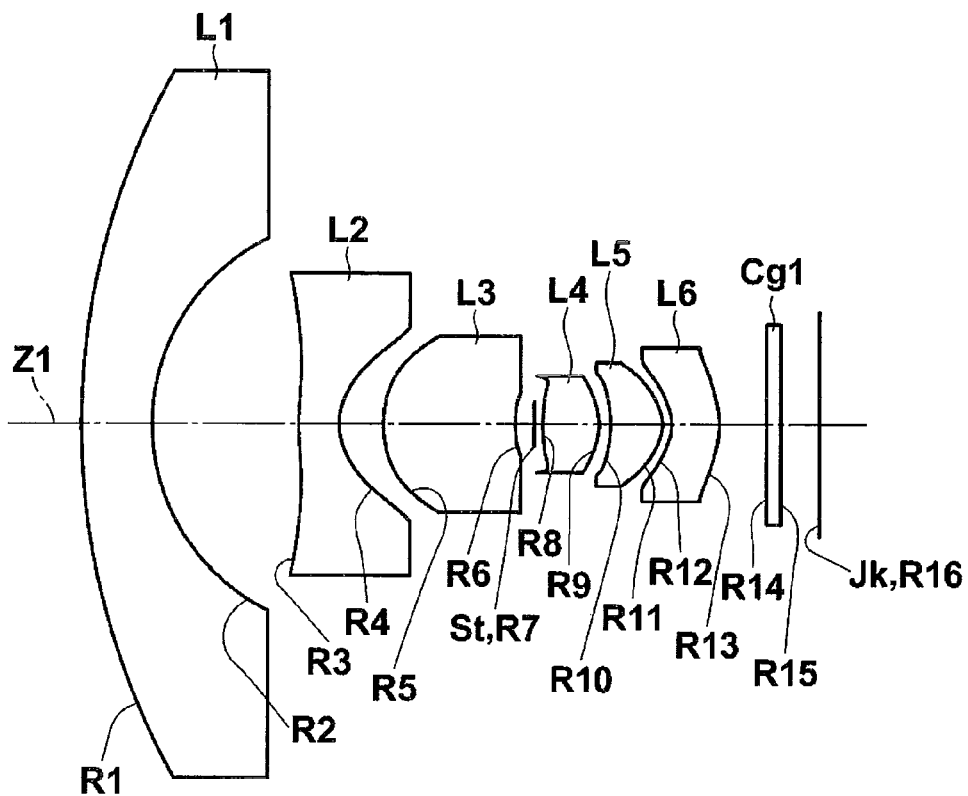
FIG. 33 is a sectional diagram illustrating a schematic configuration of an imaging lens system according to Example 12.
Figure 39:
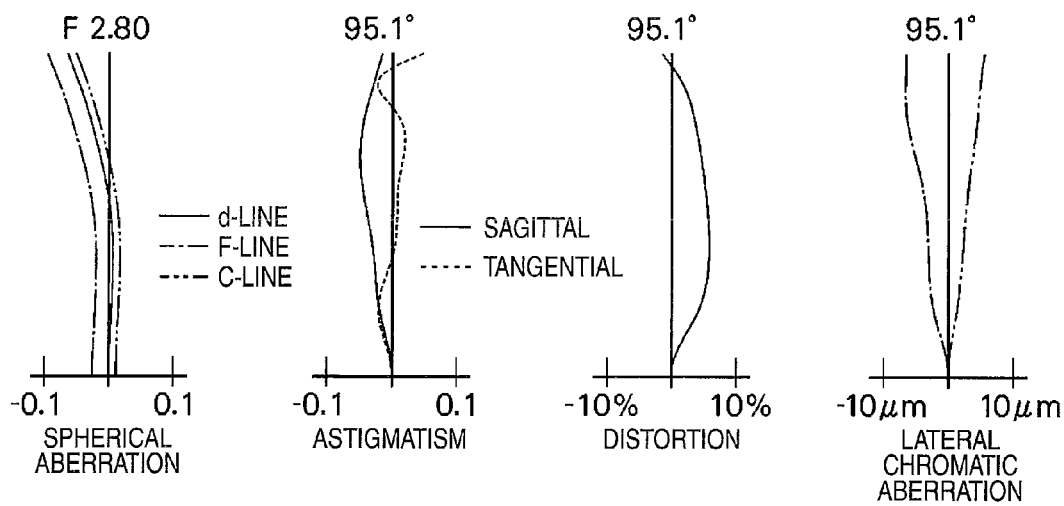
FIG. 39 is a diagram showing various aberrations of the imaging lens system according to Example 9.
Figure 40:
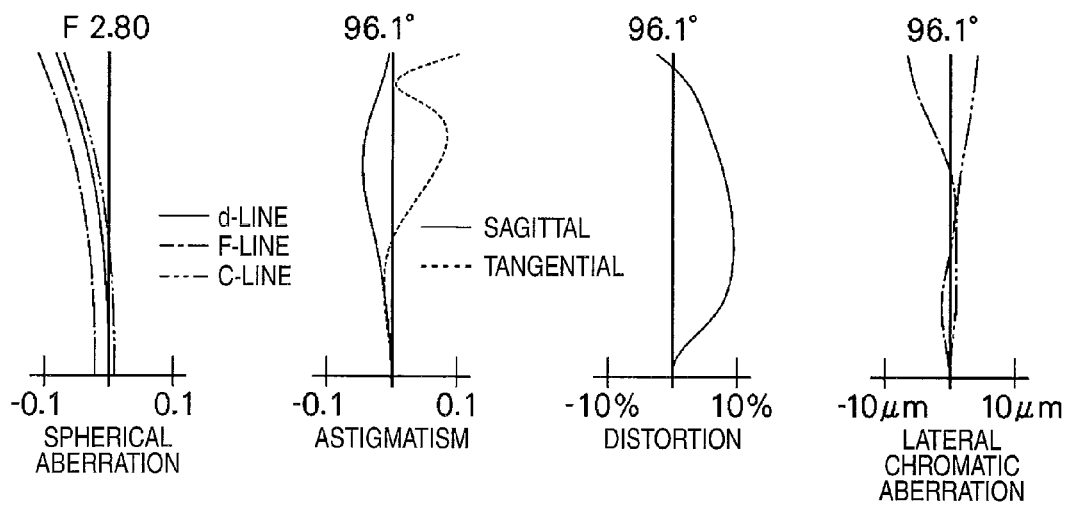
FIG. 40 is a diagram showing various aberrations of the imaging lens system according to Example 10.
Figure 41:
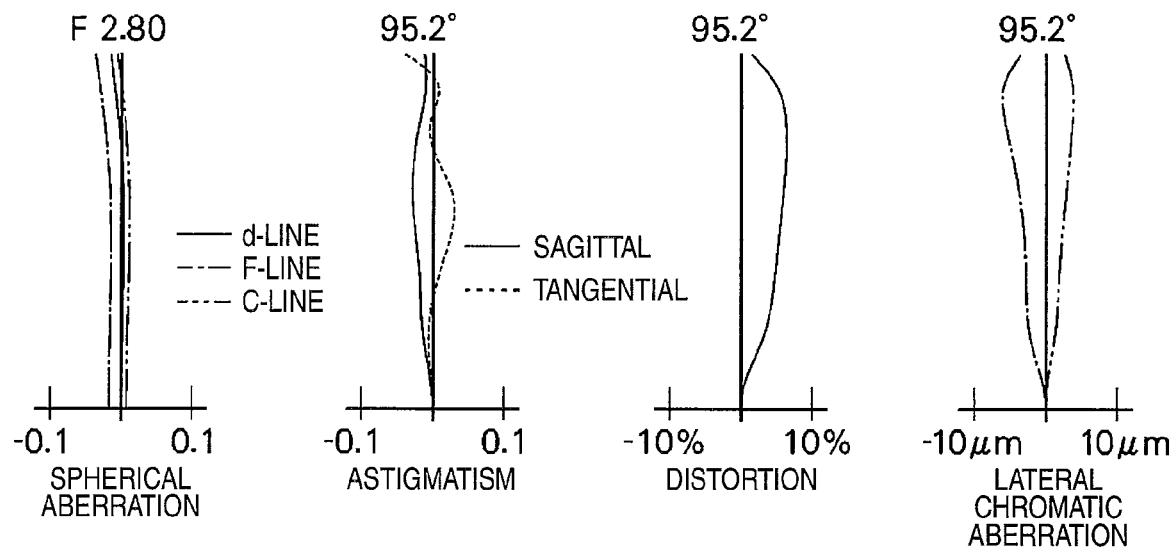
FIG. 41 is a diagram showing various aberrations of the imaging lens system according to Example 11.
Figure 42:
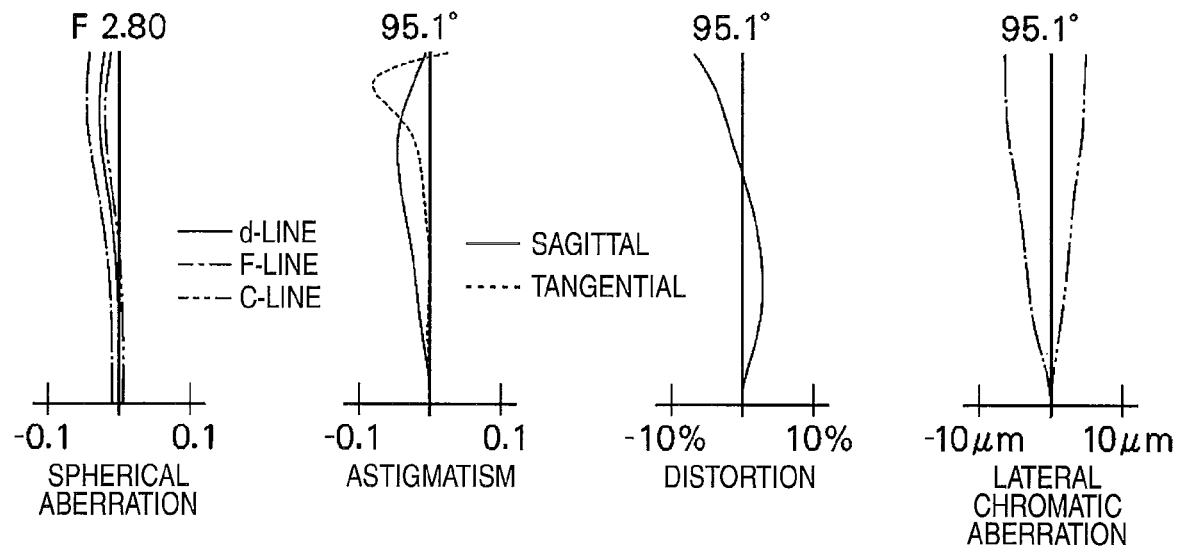
FIG. 42 is a diagram showing various aberrations of the imaging lens system according to Example 12.

FIG. 2 is a diagram explaining the schematic configuration shown in FIG. 1 with additional lines for explanation. FIG. 28 is a sectional diagram illustrating a schematic configuration of an imaging apparatus using the imaging lens system according to the third or fourth aspect of the invention. FIG. 29 is a diagram explaining the schematic configuration shown in FIG. 28 with additional lines for explanation.

The imaging lens systems 20 and 200 shown in the drawings are wide-angle imaging lens systems used in on-vehicle imaging apparatuses for taking pictures of the front, the side, and the rear of a vehicle. Each imaging lens system is configured to form an image of a subject on a light receiving surface Jk of an imaging device 10 such as CCD or CMOS. The imaging device 10 converts an optical image, which is formed by the imaging lens system 20 or 200, into an electric signal in order to obtain an image signal of the optical image.

<Basic Configuration of Imaging Lens System, and Effects and Advantages Thereof>

First, basic configurations of the imaging lens systems 20 and 200 will be described. Each of the imaging lens systems 20 and 200 includes, in order from the object side along the optical axis Z1, a first lens L1, a second lens L2, a third lens L3, an aperture diaphragm St, a fourth lens L4, a fifth lens L5, a sixth lens L6, and an optical member Cg1.

Here, a case where each lens of the first to sixth lenses L1 to L6 is formed of a single element lens is described. However, each of these lenses is not limited to a single element lens, and may be formed of a cemented lens or the like.

As shown in the drawings, the light receiving surface Jk of the imaging device 10 is disposed on an imaging plane R16 on which an image of a certain object as a target subject is formed through the imaging lens system 20 or 200.

When the imaging lens system is applied to the imaging apparatus, it is preferred to dispose a cover glass, a low pass filter, an infrared cut filter, and the like in accordance with a configuration of a camera equipped with the lens. FIG. 1 shows an example where the optical member Cg1, which is assumed as the above-mentioned optical elements and has a plane parallel plate shape, is disposed between the lens system and the imaging device 10.

Instead of the configuration in which various cut filters, such as a low pass filter, for cutting a specific wavelength band are disposed between the lens system and the imaging device, these various filters may be disposed between mutually adjacent lenses of the first to sixth lenses L1 to L6. Alternatively, a lens surface of any one of the first to sixth lenses L1 to L6 may be coated so as to have the same effect as various filters.

The reference numerals R1 to R16 in FIGS. 1 and 28 denote the following components. R1 and R2 denote an object side lens surface and an image side lens surface of the first lens L1. R3 and R4 denote an object side lens surface and image side lens surface of the second lens L2. R5 and R6 denote an object side lens surface and an image side lens surface of the third lens L3. R7 denotes an opening portion of the aperture diaphragm St. R8 and R9 denote an object side lens surface and an image side lens surface of the fourth lens L4. R10 and R11 denote an object side lens surface and an image side lens surface of the fifth lens L5. R12 and R13 denote an object side lens surface and an image side lens surface of the sixth lens L6. R14 and R15 denote an object side surface and an image side surface of the optical member Cg1. R16 denotes an imaging plane corresponding to the light receiving surface Jk of the imaging lens system 20.

Each of the lens surfaces R1 to R6 and R8 to R13 is formed as a curved surface which is gently curved from the central portion intersecting with the optical axis to the peripheral portion within the effective diameter range without a discontinuous region such as a difference in level.

<Basic Configurations of Imaging Lens System (First or Second Aspect), and Effects and Advantages Thereof>

Hereinafter, the imaging lens system 20 will be further described in detail.

The imaging lens system 20 is configured to include: a first lens L1 which has a negative power; a second lens L2 which has a negative power; a fourth lens L4 which has a positive power; and a sixth lens L6 which has a positive power.

In addition, the imaging lens system 20 is also configured such that the first lens L1 is made of glass, the second to sixth lenses L2 to L6 are made of plastic, at least one lens surface of each lens of the second to sixth lenses L2 to L6 is aspheric, and each of the third lens L3 and the fifth lens L5 is made of a material having an Abbe number of 45 or less at the d-line (Basic Configuration 1).

Since an Abbe number of the material of the third lens L3 at the d-line is set to 45 or less, it becomes easy to satisfactorily correct lateral chromatic aberration. However, when an Abbe number of the material of the third lens L3 at the d-line exceeds 45, it becomes difficult to correct lateral chromatic aberration.

Since an Abbe number of the material of the fifth lens L5 at the d-line is set to 45 or less, it becomes easy to satisfactorily correct longitudinal chromatic aberration. However, when an Abbe number of the material of the fifth lens L5 at the d-line exceeds 45, it becomes difficult to correct longitudinal chromatic aberration.

Applicable materials of the third lens L3 and the fifth lens L5 includes "Panlite SP-1516" (it is a product name of Teijin Chemicals Corporation, and the "Panlite" is Registered Trade Mark of the said corporation) which is a polycarbonate resin manufactured by the said corporation. This material is characterized in that a refractive index thereof is 1.6 or more, an Abbe number thereof is as small as 25.5, and optical distortion is small.

By applying this material to the third lens L3 or the fifth lens L5, it is possible to satisfactorily correct lateral chromatic aberration and longitudinal chromatic aberration, and simultaneously it is possible to minimize influence of deformation at the time of lens formation. As a result, it is possible to obtain a fine image even when the material is used in a lens used for, for example, a high-pixel imaging device having one million or more pixels.

Since the first lens L5 is made of glass, it is possible to improve antiweatherability of the imaging lens system. Since the second to sixth lenses L2 to L6 are formed as aspheric lenses, it is possible to satisfactorily correct spherical aberration, field curvature, and distortion while achieving a wide angle.

Furthermore, the imaging lens system 20 may be also configured as follows.

Specifically, the imaging lens system 20 includes, in order from an object side along the optical axis Z1: a first lens L1 which has a negative power and is a meniscus lens having a surface concave toward an image side; a second lens L2 which has a negative power and of which at least one lens surface is aspheric; a third lens L3 which has a positive power and in which at least an object side lens surface is aspheric, a central portion of the lens surface is convex, and the lens surface has a region, which has a larger positive power than the central portion thereof, between the central portion and the peripheral portion; a fourth lens L4 which has a positive power and of which at least one lens surface is aspheric; a fifth lens L5 of which at least one lens surface is aspheric; and a sixth lens L6 which has a positive power and of which at least one lens surface is aspheric (Basic Configuration 2).

The central portion of the lens surface constituting the lens is a portion (an intersection point between the optical axis and the lens surface) where the lens surface intersects with the optical axis passing through the lens.

The imaging lens system of the embodiment of the invention may satisfy any one or both of the two Basic Configurations 1 and 2.

According to the basic configurations, it is possible to achieve an increase in angle of view, reduction in size, and improvement in optical performance of the imaging lens system.

<Additional Configurations Defining Basic Configurations of Imaging Lens System 20, and Effects and Advantages Thereof>

Next, components, which additionally define the basic configurations of the imaging lens system 20, and effects and advantages thereof will be described. Such components additionally defining the basic configurations are not an essential configuration for the imaging lens system according to the embodiment of the invention.

<<Configuration of Conditional Expressions Defining Said Basic Configuration, and Effects and Advantages Thereof>>

First, the following Conditional Expressions (1) to (8), which additionally define the basic configurations of the imaging lens system, and effects and advantages thereof will be described. The imaging lens system may satisfy only one of the Conditional Expressions (1) to (8), or may satisfy combination of two or more of the Conditional Expressions (1) to (8).

Definitions of parameters represented by the reference signs in the Conditional Expressions (1) to (8) are as follows.

f: a focal length of the imaging lens system, that is, a composite focal length of the first to sixth lenses L1 to L6
f1: a focal length of the first lens L1
f2: a focal length of the second lens L2
f3: a focal length of the third lens L3
f4: a focal length of the fourth lens L4
f5: a focal length of the fifth lens L5
f6: a focal length of the sixth lens L6
f45: a composite focal length of the fourth lens L4 and the fifth lens L5
D1: a center thickness of the first lens L1
D4: an air space between the second lens L2 and the third lens L3
D5: a center thickness of the third lens L3
vd4: an Abbe number of the fourth lens L4 at the d-line
vd5: an Abbe number of the fifth lens L5 at the d-line
L: a distance from the object side lens surface of the first lens L1 to the imaging plane Here, a value of the distance L is a value obtained by adding an air conversion distance of the back focal length to an actual distance in which the back focal length is subtracted from the distance L.

The back focal length Bf is an air conversion length from the image side lens surface R13 of the sixth lens L6 to the imaging plane R16.

$2.0 < f45/f < 5.0$, this relates to aberration correction.     Conditional Expression (1)

When the lens system is configured to satisfy Conditional Expression (1), it becomes easy to correct chromatic aberration and field curvature.

However, when the lens system is configured such that a value of f45/f exceeds the upper limit of Conditional Expression (1), that is, when $f45/f \geq 5.0$ is satisfied, it becomes difficult to satisfactorily correct chromatic aberration.

In contrast, when the lens system is configured such that a value of f45/f falls below the lower limit of Conditional Expression (1), that is, $2.0 \geq f45/f$ is satisfied, it becomes difficult to satisfactorily correct field curvature.

$2.5 < (D4+D5)/f < 5.5$, this relates to aberration correction and a size of the lens system.     Conditional Expression (2)

When the lens system is configured to satisfy Conditional Expression (2), it is possible to satisfactorily correct spherical aberration, distortion, and comatic aberration, and it is also possible to secure a long back focal length. As a result, it is possible to increase an angle of view and obtain adequate optical performance for the imaging lens system.

However, when the lens system is configured such that a value of (D4+D5)/f exceeds the upper limit of Conditional Expression (2), a diameter of the object side lens surface of the first lens L1 increases, and also the total length of the lens system increases. As a result, it becomes difficult to achieve reduction in size thereof.

In contrast, when the lens system is configured such that a value of (D4+D5)/f falls below the lower limit of Conditional Expression (2), it becomes difficult to satisfactorily correct spherical aberration and comatic aberration. As a result, it becomes difficult to form a fast lens (which has a small F number).

$-0.1 < f/f3 < 0.5$, this relates to lateral chromatic aberration and a back focal length.     Conditional Expression (3)

When the lens system is configured to satisfy Conditional Expression (3), it is possible to satisfactorily correct lateral chromatic aberration without a decrease in a back focal length.

However, when lens system is configured such that a value of f/3 exceeds the upper limit of Conditional Expression (3), it becomes difficult to satisfactorily correct lateral chromatic aberration.

In contrast, when the lens system is configured such that a value of f/f3 falls below the lower limit of Conditional Expression (3), it is possible to satisfactorily correct lateral chromatic aberration, but a back focal length decreases. As a result, it becomes difficult to insert various filters between the imaging device 10 and the imaging lens system 20.

$7 < L/f < 14$, this relates to an angle of view and a size of the apparatus.     Conditional Expression (4)

When the lens system is configured to satisfy Conditional Expression (4), it is possible to achieve a wide-angle lens system with a small size.

However, when the lens system is configured such that a value of L/f exceeds the upper limit of Conditional Expression (4), it becomes easy to achieve an increase in angle of view, but a size of the lens system increases.

In contrast, when the lens system is configured such that a value of L/f falls below the lower limit of Conditional Expression (4), it is possible to downsize the lens system, but it becomes difficult to achieve an increase in angle of view.

$-4.2 < f5/f < -1.0$, this relates to lateral chromatic aberration and longitudinal chromatic aberration.     Conditional Expression (5)

When the lens system is configured to satisfy Conditional Expression (5), it is possible to satisfactorily correct lateral chromatic aberration and longitudinal chromatic aberration.

However, when the lens system is configured such that a value of f5/f exceeds the upper limit of Conditional Expression (5), lateral chromatic aberration increases.

In contrast, when the lens system is configured such that a value of f5/f falls below the lower limit of Conditional Expression (5), a negative power of the fifth lens L5 decreases. As a result, it becomes difficult to satisfactorily correct longitudinal chromatic aberration.

$0.70 < D4/f$, this relates to aberration correction.     Conditional Expression (6)

When Conditional Expression (6) is satisfied, it is possible to easily suppress an increase in size of the lens system, occurrence of aberration, and occurrence of ghost image.

When the lower limit of Conditional Expression (6) is not satisfied, it is possible to satisfactorily correct chromatic aberration, but the second lens L2 and the third lens L3 become too close to each other. Accordingly, the image side lens surface R4 of the second lens L2 and the object side lens surface R5 of the third lens L3 have limitation in aspheric surface shape. As a result, aberration correction becomes inadequate. Furthermore, assembly of the lens system becomes difficult, and a ghost image is also caused by reflection between the two lens surfaces R4 and R5.

$1.5 < vd4/vd5$, this relates to longitudinal chromatic aberration and lateral chromatic aberration.     Conditional Expression (7)

When the lens system is configured to satisfy Conditional Expression (7), it is possible to satisfactorily correct longitudinal chromatic aberration and lateral chromatic aberration.

However, when the lens system is configured such that a value of vd4/vd5 falls below the lower limit of Conditional Expression (7), it becomes difficult to satisfactorily correct longitudinal chromatic aberration and lateral chromatic aberration.

$0.8 < D1/f$, this relates to impact resistance of the first lens L1.     Conditional Expression (8)

When the lens system is configured to satisfy Conditional Expression (8), it is possible to increase hardness of the first lens L1 against various impacts in a case where the lens is used, for example, for an on-vehicle camera and the like.

However, when the lens system is configured such that a value of D1/f falls below the lower limit of Conditional Expression (8), a thickness of the first lens L1 decreases. As a result, the lens becomes brittle.

<<The Other Components Defining the Said Basic Configurations, and Effects and Advantages Thereof>>

Hereinafter, components other than the conditional expressions defining the lens system and effects and advantages thereof will be described.

Definition of Component Relating to Aperture Diaphragm

It is preferred that the aperture diaphragm St be disposed between the third lens L3 and the fourth lens L4.

Since the aperture diaphragm St is disposed between the third lens L3 and the fourth lens L4, the whole lens system can be downsized.

Definition of Components Relating to First Lens

When the imaging lens system is mounted on, for example, an on-vehicle camera or a surveillance camera used under a severe environment, it is preferred that a material excellent in water resistance, acid resistance, chemical resistance, and the like be used in the first lens L1.

It is preferred that the first lens L1 be made of a material of which a water resistance is $1^{st}$ to $4^{th}$ class based on a powder method prescribed by Japanese Optical Glass Industrial Standard.

It is preferred that the first lens L1 be made of a material of which an acid resistance is $1^{st}$ to $4^{th}$ class based on a powder method prescribed by Japanese Optical Glass Industrial Standard.

In addition, it is preferred that the first lens L1 be made of a durable material. For example, it is preferred that the first lens L1 be made of glass. Further, the first lens L1 may be made of transparent ceramics.

Since the first lens L1 is formed as a glass lens, it is possible to realize an unbreakable imaging lens system with high antiweatherability.

Further, the first lens L1 is not limited to be formed as a spherical glass lens, and one or both of lens surfaces of the first lens L1 may be configured to be aspheric. Since the first lens L1 is formed as an aspheric glass lens, it is possible to realize an imaging lens system which is excellent in water resistance, acid resistance, chemical resistance, and the like and which is able to further satisfactorily correct various aberrations.

Since the first lens L1 has an aspheric surface, it is possible to further satisfactorily correct various aberrations.

A cover glass for protecting a lens may be disposed closer to the object side than the first lens L1. Alternatively, a hard coating for improving antiweatherability in the first lens L1, for example, a thin film made of glass may be formed on the object side lens surface of the first lens L1.

When the first lens L1 is configured to be scarcely affected by external environment in the way that a cover glass is disposed closer to the object side than the first lens L1, the first lens L1 may be formed as an aspheric plastic lens. When the first lens L1 is formed as an aspheric plastic lens, it is possible to further satisfactorily correct field curvature and distortion.

Definition of Components Relating to Second Lens

It is preferred that the object side lens surface R3 of the second lens L2 be aspheric.

In addition, it is preferred that the central portion of the object side lens surface R3 of the second lens L2 be convex and the peripheral portion within the effective diameter range have a smaller positive power than the central portion. Alternatively, it is preferred that the central portion be convex and the peripheral portion within the effective diameter range have a negative power (the peripheral portion is concave).

As shown in FIG. 2, "the central portion of the object side lens surface R3 of the second lens L2 is convex (the central portion has a positive power) and the peripheral portion within the effective diameter range has a smaller positive power than the central portion", this configuration (hereinafter, it is referred to as an exemplary configuration of the lens surface R3) is more specifically described as follows.

That is, the central portion is convex (it has a positive power), and the intersection point P3 is defined as a point where the optical axis Z1 intersects with the normal line H3 of the point X3 located on the peripheral portion of the lens surface R3 within the effective diameter range. Furthermore, an absolute value of radius of curvature of the lens surface R3 at the point X3 is defined as a length of the segment X3-P3 which connects the point X3 to the intersection point P3. Further, the central portion C3 is defined as an intersection point between the lens surface R3 and the optical axis Z1. In this case, the exemplary configuration of the lens surface R3 is as follows. The lens surface R3 is convex (it has a positive power) on the optical axis Z1 (in the central portion C3). The intersection point P3 and the center of curvature E3 at the central portion C3 of the lens surface R3 are located closer to the image side than the central portion C3. A length (an absolute value of the radius of curvature R3$x$ of the lens surface R3 at the point X3) of the segment X3-P3 is set larger than an absolute value of the radius of curvature R3$c$ of the lens surface R3 at the central portion C3.

The drawing shows the circle Sp1 of which a length of the radius centered on the intersection point P3 is a length of the segment X3-P3. The drawing also shows the circle Sp2 of which a length of the radius centered on the center of curvature E3 is an absolute value of the radius of curvature R3c.

A value of radius of curvature is expressed by an absolute value. The reason is that it is necessary to be clear in magnitude correlation of radius of curvatures.

In the following description, when the description of the lens surface R3 is the same as that of the other surfaces to be described later, the reference numerals and signs used in the description of the other surfaces are omitted in the drawing.

In the following description, the reason why a magnitude of radius of curvature is expressed by an absolute value is as described above.

"The central portion of the object side lens surface R3 of the second lens L2 is convex (the central portion has a positive power) and the peripheral portion within the effective diameter range has a negative power (the peripheral portion is concave)", this configuration is more specifically described as follows. The point E3 representing the center of curvature of the central portion C3 of the lens surface R3 is located closer to the image side than the central portion C3 which is an intersection point between the lens surface R3 and the optical axis Z1. In addition, the point P3 representing the center of curvature of the point X3, which is the peripheral portion on the lens surface R3 within the effective diameter range, is located closer to the object side than the central portion C3.

As described above, it is possible to adopt such a configuration in which the central portion of the object side lens surface R3 of the second lens L2 is convex and the peripheral portion thereof within the effective diameter range has a smaller positive power than the central portion, or peripheral portion within the effective diameter range is concave. Accordingly, it is possible to satisfactorily correct field curvature while maintaining a wide angle.

It is preferred that the image side lens surface R4 of the second lens L2 be aspheric.

It is preferred that the central portion of the image side lens surface R4 of the second lens L2 be concave (the central portion has a negative power) and the peripheral portion within the effective diameter range have a smaller negative power than the central portion.

"The central portion of the lens surface R4 is concave, and the peripheral portion within the effective diameter range has a smaller negative power than the central portion", this configuration (hereinafter, it is referred to as an exemplary configuration of the lens surface R4) is more specifically described as follows.

That is, the central portion is concave (it has a negative power), and the intersection point P4 is defined as a point where the optical axis Z1 intersects with the normal line H4 of the point X4 located on the peripheral portion of the lens surface R4 within the effective diameter range. Furthermore, an absolute value of radius of curvature of the lens surface R4 at the point X4 is defined as a length of the segment X4-P4 which connects the point X4 to the intersection point P4. Further, the central portion C4 is defined as an intersection point between the lens surface R4 and the optical axis Z1. In this case, the exemplary configuration of the lens surface R4 is as follows. The lens surface R4 is concave (it has a negative power) on the optical axis Z1 (in the central portion C4). The intersection point P4 and the center of curvature E4 at the central portion C4 of the lens surface R4 are located closer to the image side than the central portion C4. A length (an absolute value of the radius of curvature R4x of the lens surface R4 at the point X4) of the segment X4-P4 is set larger than an absolute value of the radius of curvature R4c of the lens surface R4 at the central portion C4.

As described above, it is possible to adopt such a configuration in which the central portion of the image side lens surface R4 of the second lens L2 is concave, and the peripheral portion within the effective diameter range have a smaller negative power than the central portion. Accordingly, it is possible to concentrate rays without sudden deflection of rays passing through the periphery of the second lens L2. As a result, it is possible to satisfactorily correct distortion.

The R3x is defined as a radius of curvature of the object side lens surface R3 of the second lens L2 at the peripheral portion X3 within the effective diameter range. In this case, it is preferred that an absolute value (|X3-P3|) of the radius of curvature R3x be not less than 1.5 times the absolute value of the radius of curvature R3c at the central portion C3.

Since an absolute value of the radius of curvature R3x is not less than 1.5 times the absolute value of the radius of curvature R3c, it becomes easy to achieve an increase in angle of view, and simultaneously it is possible to satisfactorily correct field curvature.

The R4x is defined as a radius of curvature of the image side lens surface R4 of the second lens L2 at the peripheral portion X4 within the effective diameter range. In this case, it is preferred that an absolute value (|X4-P4|) of the radius of curvature R4x be not less than 1.5 times the absolute value of the radius of curvature R4c at the central portion C4.

Since an absolute value of the radius of curvature R4x is not less than 1.5 times the absolute value of the radius of curvature R4c, it is possible to satisfactorily correct distortion.

Definition of Components Relating to Third Lens

It is preferred that the object side lens surface R5 of the third lens L3 be aspheric.

In addition, it is preferred that the central portion of the object side lens surface R5 of the third lens L3 be convex (the central portion has a positive power), and it is also preferred that the lens surface have a region, which has a larger positive power than the central portion, between the central portion and the peripheral portion within the effective diameter range.

"The central portion of the lens surface R5 is convex, and the lens surface has a region, which has a larger positive power than the central portion, between the central portion and the peripheral portion within the effective diameter range", this configuration (hereinafter, it is referred to as an exemplary configuration of the lens surface R5) is more specifically described as follows.

That is, the central portion is convex (it has a positive power), and the intersection point P5A is defined as a point where the optical axis Z1 intersects with the normal line H5A of the point X5A located on the lens surface R5 within the effective diameter range. Furthermore, an absolute value of radius of curvature of the lens surface R5 at the point X5A is defined as a length of the segment X5A-P5A which connects the point X5A to the intersection point P5A. In this case, the lens surface is configured to have the region, which has a smaller absolute value of radius of curvature than the central portion, between the central portion and the peripheral portion within the effective diameter range.

In addition, it is preferred that the central portion of the object side lens surface R5 of the third lens L3 be convex (the central portion has a positive power), and it is also preferred that the peripheral portion within the effective diameter range have a larger positive power than the central portion.

"The central portion of the lens surface R5 is convex, and the peripheral portion within the effective diameter range has a larger positive power than the central portion" this configuration is more specifically described as follows.

That is, the central portion is convex (it has a positive power), and the intersection point P5 is defined as a point where the optical axis Z1 intersects with the normal line H5 of the point X5 located on the peripheral portion of the lens surface R5 within the effective diameter range. Furthermore, an absolute value of radius of curvature of the lens surface R5 at the point X5 is defined as a length of the segment X5-P5 which connects the point X5 to the intersection point P5. Further, the central portion C5 is defined as an intersection point between the lens surface R5 and the optical axis Z1. In this case, the exemplary configuration of the lens surface R5 is as follows. The lens surface R5 is convex (it has a positive power) on the optical axis Z1 (in the central portion C5). The intersection point P5 and the center of curvature E5 at the central portion C5 of the lens surface R5 are located closer to the image side than the central portion C5. A length (an absolute value of the radius of curvature R5$x$ of the lens surface R5 at the point X5) of the segment X5-P5 is set smaller than an absolute value of the radius of curvature R5$c$ of the lens surface R5 at the central portion C5.

In addition, it may be possible to adopt a configuration in which the central portion of the object side lens surface R5 of the third lens L3 is convex (the central portion has a positive power), the lens surface has a region, which has a larger positive power than the central portion, between the central portion and the peripheral portion within the effective diameter range, and the peripheral portion within the effective diameter range has a smaller positive power than the central portion.

In the object side lens surface R5 of the third lens L3, the peripheral portion within the effective diameter range may have a larger positive power than the central portion. Furthermore, the lens surface R5 may have a region, which has a larger positive power than the central portion, between the central portion and the peripheral portion within the effective diameter range. Further, the lens surface R5 may have a region, which has a larger positive power than the central portion, between the central portion and the peripheral portion within the effective diameter range, and the peripheral portion within the effective diameter range may have a smaller positive power than the central portion.

As described above, it is possible to adopt the configuration in which the object side lens surface R5 of the third lens L3 has a region, which has a larger positive power than the central portion, between the central portion and the peripheral portion thereof within the effective diameter range. Alternatively, it is also possible to adopt the configuration in which the central portion is convex, and the peripheral portion within the effective diameter range has a larger positive power than the central portion. Alternatively, it is also possible to adopt the configuration in which the lens surface has a region, which has a larger positive power than the central portion, between the central portion and the peripheral portion within the effective diameter range, and the peripheral portion within the effective diameter range has a smaller positive power than the central portion. Accordingly, it is possible to satisfactorily correct field curvature while securing a long back focal length.

It is preferred that the image side lens surface R6 of the third lens L3 be aspheric.

In addition, it is preferred that the central portion of the image side lens surface R6 of the third lens L3 be concave (the central portion has a negative power) and the peripheral portion within the effective diameter range have a larger negative power than the central portion.

Specifically, it is preferred that an absolute value of radius of curvature of the peripheral portion of the lens surface R6 within the effective diameter range be smaller than an absolute value of radius of curvature of the central portion of the lens surface R6.

As describe above, since the central portion of the image side lens surface R6 of the third lens L3 is concave and the peripheral portion within the effective diameter range has a larger negative power than the central portion, it is possible to satisfactorily correct field curvature and comatic aberration.

The R5$x$ is defined as a radius of curvature of the object side lens surface R5 of the third lens L3 at the peripheral portion X5 within the effective diameter range. In this case, it is preferred that an absolute value (|X5-P5|) of the radius of curvature R5$x$ be 0.3 to 1.5 times the absolute value of the radius of curvature R5$c$ at the central portion C5.

Since an absolute value of the radius of curvature R5$x$ is 0.3 to 1.5 times the absolute value of the radius of curvature R5$c$, it is possible to satisfactorily correct lateral chromatic aberration.

Definition of Components Relating to Fourth Lens

It is preferred that the image side lens surface R9 of the fourth lens L4 be aspheric.

It is preferred that the central portion of the image side lens surface R9 of the fourth lens L4 be convex (the central portion has a positive power) and the peripheral portion within the effective diameter range have a smaller positive power than the central portion.

"The central portion of the lens surface R9 is convex, and the peripheral portion within the effective diameter range has a smaller positive power than the central portion" this configuration (hereinafter, it is referred to as an exemplary configuration of the lens surface R9) is more specifically described as follows.

That is, the central portion is convex, and the intersection point P9 is defined as a point where the optical axis Z1 intersects with the normal line H9 of the point X9 located on the peripheral portion of the lens surface R9 within the effective diameter range. Furthermore, an absolute value of radius of curvature of the lens surface R9 at the point X9 is defined as a length of the segment X9-P9 which connects the point X9 to the intersection point P9. Further, the central portion C9 is defined as an intersection point between the lens surface R9 and the optical axis Z1. In this case, the exemplary configuration of the lens surface R9 is as follows. The lens surface R9 is convex (it has a positive power) on the optical axis Z1 (in the central portion C9). The intersection point P9 and the center of curvature E9 at the central portion C9 of the lens surface R9 are located closer to the image side than the central portion C9. A length (an absolute value of the radius of curvature R9$x$ of the lens surface R9 at the point X9) of the segment X9-P9 is set larger than an absolute value of the radius of curvature R9$c$ of the lens surface R9 at the central portion C9.

As described above, it is possible to adopt such a configuration in which the central portion of the image side lens surface R9 of the fourth lens L4 is convex (the central portion has a positive power) and the peripheral portion thereof within the effective diameter range has a smaller positive power than the central portion. Accordingly, it is possible to satisfactorily correct spherical aberration and field curvature.

The R9$x$ is defined as a radius of curvature of the image side lens surface R9 of the fourth lens L4 at the peripheral portion X9 within the effective diameter range. In this case, it is preferred that an absolute value (|X9-P9|) of the radius of curvature R9$x$ be not less than 1.2 times the absolute value of the radius of curvature R9$c$ at the central portion C9.

Since an absolute value of the radius of curvature R9x is not less than 1.2 times the absolute value of the radius of curvature R9c, it is possible to satisfactorily correct spherical aberration and field curvature.

Definition of Components Relating to Fifth Lens

It is preferred that fifth lens have a negative power. By adopting such a configuration, it is possible to further satisfactorily correct longitudinal chromatic aberration.

It is preferred that the object side lens surface R10 of the fifth lens L5 be aspheric.

It is preferred that the central portion of the object side lens surface R10 of the fifth lens L5 be concave (the central portion has a negative power) and the peripheral portion within the effective diameter range have a smaller negative power than the central portion.

"The central portion of the lens surface R10 is concave, and the peripheral portion within the effective diameter range has a smaller negative power than the central portion", this configuration (hereinafter, it is referred to as an exemplary configuration of the lens surface R10) is more specifically described as follows.

That is, the central portion is concave (it has a negative power), and the intersection point P10 is defined as a point where the optical axis Z1 intersects with the normal line H10 of the point X10 located on the peripheral portion of the lens surface R10 within the effective diameter range. Furthermore, an absolute value of radius of curvature of the lens surface R10 at the point X10 is defined as a length of the segment X10-P10 which connects the point X10 to the intersection point P10. Further, the central portion C10 is defined as an intersection point between the lens surface R10 and the optical axis Z1. In this case, the exemplary configuration of the lens surface R10 is as follows. The lens surface R10 is concave (it has a negative power) on the optical axis Z1 (in the central portion C10). The intersection point P10 and the center of curvature E10 at the central portion C10 of the lens surface R10 are located closer to the object side than the central portion C10. A length (an absolute value of the radius of curvature R10x of the lens surface R10 at the point X10) of the segment X10-P10 is set larger than an absolute value of the radius of curvature R10c of the lens surface R10 at the central portion C10.

As described above, it is possible to adopt such a configuration in which the central portion of the object side lens surface R10 of the fifth lens L5 is concave (the central portion has a negative power), and the peripheral portion within the effective diameter range have a smaller negative power than the central portion. Accordingly, it is possible to satisfactorily correct chromatic aberration and field curvature.

It is preferred that the image side lens surface R11 of the fifth lens L5 be aspheric.

It is preferred that the fifth lens L5 be formed as a meniscus lens having a surface concave toward the object side.

In addition, it is preferred that the central portion of the image side lens surface R11 of the fifth lens L5 be convex (the central portion has a positive power) and the peripheral portion within the effective diameter range have a smaller positive power than the central portion.

"The central portion of the lens surface R11 is convex and the peripheral portion within the effective diameter range has a smaller positive power than the central portion", this configuration (hereinafter, it is referred to as an exemplary configuration of the lens surface R11) is more specifically described as follows.

That is, the central portion is convex (it has a positive power), and the intersection point P11 is defined as a point where the optical axis Z1 intersects with the normal line H11 of the point X11 located on the peripheral portion of the lens surface R11 within the effective diameter range. Furthermore, an absolute value of radius of curvature of the lens surface R11 at the point X11 is defined as a length of the segment X11-P11 which connects the point X11 to the intersection point P11. Further, the central portion C11 is defined as an intersection point between the lens surface R11 and the optical axis Z1. In this case, the exemplary configuration of the lens surface R11 is as follows. The lens surface R11 is convex (it has a positive power) on the optical axis Z1 (in the central portion C11). The intersection point P11 and the center of curvature E11 at the central portion C11 of the lens surface R11 are located closer to the object side than the central portion C11. A length (an absolute value of the radius of curvature R11x of the lens surface R11 at the point X11) of the segment X11-P11 is set larger than an absolute value of the radius of curvature R11c of the lens surface R11 at the central portion C11.

As described above, it is possible to adopt such a configuration in which the central portion of the image side lens surface R11 of the fifth lens L5 is convex (the central portion has a positive power), and the peripheral portion within the effective diameter range have a smaller positive power than the central portion. Accordingly, it is possible to satisfactorily correct spherical aberration and comatic aberration.

Definition of Components Relating to Sixth Lens

It is preferred that the object side lens surface R12 of the sixth lens L6 be aspheric.

In addition, it is preferred that the central portion of the object side lens surface R12 of the sixth lens L6 be convex, and it is also preferred that the peripheral portion within the effective diameter range have a larger positive power than the central portion.

"The central portion of the lens surface R12 is convex, and the peripheral portion within the effective diameter range has a larger positive power than the central portion" this configuration (hereinafter, it is referred to as an exemplary configuration of the lens surface R12) is more specifically described as follows.

That is, the central portion is convex (it has a positive power), and the intersection point P12 is defined as a point where the optical axis Z1 intersects with the normal line H12 of the point X12 located on the peripheral portion of the lens surface R12 within the effective diameter range. Furthermore, an absolute value of radius of curvature of the lens surface R12 at the point X12 is defined as a length of the segment X12-P12 which connects the point X12 to the intersection point P12. Further, the central portion C12 is defined as an intersection point between the lens surface R12 and the optical axis Z1. In this case, the exemplary configuration of the lens surface R12 is as follows. The lens surface R12 is convex (it has a positive power) on the optical axis Z1 (in the central portion C12). The intersection point P12 and the center of curvature E12 at the central portion C12 of the lens surface R12 are located closer to the image side than the central portion C12. A length (an absolute value of the radius of curvature R12x of the lens surface R12 at the point X12) of the segment X12-P12 is set smaller than an absolute value of the radius of curvature R12c of the lens surface R12 at the central portion C12.

Since the object side lens surface R12 of the sixth lens L6 is configured as described above, it is possible to satisfactorily correct spherical aberration and field curvature.

It is preferred that the image side lens surface R13 of the sixth lens L6 be aspheric.

In addition, it is preferred that the central portion of the image side lens surface R13 of the sixth lens L6 be convex (the central portion has a positive power) and the peripheral portion within the effective diameter range have a negative power.

"The central portion of the image side lens surface R13 of the sixth lens L6 is convex (the central portion has a positive power) and the peripheral portion within the effective diameter range has a negative power" this configuration is more specifically described as follows. The point E13, which is the center of curvature of the lens surface R13 at the central portion C13, is located closer to the object side than the intersection point C13 (which corresponds to the point C13 representing the central portion) between the lens surface R13 and the optical axis Z1. In addition, the point P13, which is the center of curvature of the lens surface R13 at the point X13 on the peripheral portion within the effective diameter range, is disposed closer to the image side than the intersection point C13.

Since the image side lens surface R13 of the sixth lens L6 is configured as described above, it is possible to satisfactorily correct comatic aberration and field curvature.

The R13x is defined as a radius of curvature of the image side lens surface R13 of the sixth lens L6 at the peripheral portion X13 within the effective diameter range. In this case, it is preferred that an absolute value (|X13-P13|) of the radius of curvature R13x be 0.2 to 2.5 times the absolute value of the radius of curvature R13c at the central portion C13.

Since an absolute value of the radius of curvature R13x is 0.2 to 2.5 times the absolute value of the radius of curvature R13c, it is possible to satisfactorily correct spherical aberration and field curvature.

Definition of the Other Components

In the imaging lens system according to the embodiment of the invention, assuming that an ideal image height is 2f×tan (θ/2), it is preferred that distortion be in the range of ±10%.

Since rays passing through the outside of the effective diameter ranges of the first lens L1 and the second lens L2 reach the imaging plane as stray light and become a ghost image, it is preferred to shield the stray light by providing light shielding plates Sk1 and Sk2, which are light shielding means, on areas out of the effective diameter ranges on the first lens L1 and the second lens L2.

The light shielding means can be realized by adopting a configuration in which a light shielding plate is disposed on the area out of the effective diameter range on the lens or the area out of the effective diameter range on the lens is coated with a light-shielding coating material.

Further, the light shielding means may be disposed between the first lens L1 and the second lens L2, if necessary. Furthermore, the light shielding means may be disposed on the areas out of the effective diameter ranges on the second to sixth lenses L2 to L6 or may be disposed between these lenses.

It is preferred that the second to sixth lenses L2 to L6 be made of plastic (resin material).

As a lens material applicable to the second to sixth lenses L2 to L6, a so-called nanocomposite material may be used, in which particulates having smaller sizes than wavelengths of light is mixed with a resin material.

Each lens of the first to sixth lenses L1 to L6 is not limited to a lens made of a material having a constant refractive index, and a gradient index lens may be applied to at least one of the six lenses.

Each lens of the second to sixth lenses L2 to L6 is not limited to a lens having at least one aspheric surface, and may be formed as a lens having a diffractive optical surface. That is, a diffractive optical element may be formed on at least one lens surface of the second to sixth lenses L2 to L6.

In order to further satisfactorily correct lateral chromatic aberration, it is preferred that at least one of the third lens L3 and the fifth lens L5 be made of a material having an Abbe number of 30 or less at the d-line.

In order to satisfactorily correct longitudinal chromatic aberration, it is preferred that at least one of the third lens L3 and the fifth lens L5 be made of a material having an Abbe number of 28 or less at the d-line.

Furthermore, it is preferred that each of the first lens L1, the second lens L2, the fourth lens L4, and the sixth lens L6 be made of a material having an Abbe number of 40 or more at the d-line.

Since each of the first lens L1, the second lens L2, the fourth lens L4, and the sixth lens L6 is made of a material having an Abbe number of 40 or more at the d-line, it is possible to suppress occurrence of chromatic aberration, and also it is possible to obtain an excellent resolving performance.

As described above, since the first lens L1 is made of glass, it is possible to fabricate an imaging lens system excellent in antiweatherability. Further, since the second to sixth lenses L2 to L6 are aspheric, it is possible to satisfactorily correct spherical aberration, field curvature, and distortion while achieving a wide angle.

As describe above, the wide-angle imaging lens system according to the embodiment of the invention is configured to be able to achieve reduction in size and improvement in optical performance, as compared with the known wide-angle imaging lens systems.

<Basic Configurations of Imaging Lens System (Third or Forth Aspect), and Effects and Advantages Thereof>

Hereinafter, the imaging lens system 200 will be further described in detail.

The imaging lens system 200 is configured to include: a first lens L1 which has a negative power; a second lens L2 which has a negative power; a fourth lens L4 which has a positive power; a fifth lens L5 which has a positive power; and a sixth lens L6 which has a negative power.

In addition, the imaging lens system 200 is also configured such that at least one lens surface of each lens of the second lens L2, third lens L3, fourth lens L4, fifth lens L5, and sixth lens L6 is aspheric, and each of the third lens L3 and the sixth lens L6 is made of a material having an Abbe number of 45 or less at the d-line (Basic Configuration 3).

Since an Abbe number of the material of the third lens L3 at the d-line is set to 45 or less, it becomes easy to satisfactorily correct lateral chromatic aberration. However, when an Abbe number of the material of the third lens L3 at the d-line exceeds 45, it becomes difficult to correct lateral chromatic aberration.

e number of the material of the sixth lens L6 at the d-line is set to 45 or less, it becomes easy to satisfactorily correct longitudinal chromatic aberration. However, when an Abbe number of the material of the sixth lens L6 at the d-line exceeds 45, it becomes difficult to correct longitudinal chromatic aberration.

Applicable materials of the third lens L3 and the sixth lens L6 includes "PANLITE SP-1516" (it is a product name of Teijin Chemicals Corporation, and the "PANLITE" is Registered Trade Mark of the said corporation) which is a polycarbonate resin manufactured by the said corporation. This material is characterized in that a refractive index thereof is 1.6 or more, an Abbe number thereof is as small as 25.5, and optical distortion is small.

By applying this material to the third lens L3 or the sixth lens L6, it is possible to satisfactorily correct lateral chromatic aberration and longitudinal chromatic aberration, and simultaneously it is possible to minimize influence of deformation at the time of lens formation. As a result, it is possible to obtain a fine image even when the material is used in a lens used for a high-pixel imaging device having one million or more pixels.

Since at least one surface of each lens of the second to sixth lenses L2 to L6 is aspheric, it is possible to satisfactorily correct spherical aberration, field curvature, and distortion while achieving a wide angle.

Furthermore, the imaging lens system 200 may be also configured as follows.

Specifically, the imaging lens system 200 includes, in order from an object side along the optical axis Z1: a first lens L1 which has a negative power and is a meniscus lens having a surface concave toward an image side; a second lens L2 in which at least an image side lens surface is aspheric, a central portion of the lens surface is concave, and a peripheral portion thereof within an effective diameter range has a smaller negative power than the central portion; a third lens L3 of which at least one lens surface is aspheric; a fourth lens L4 which has a positive power and of which at least one lens surface is aspheric; a fifth lens L5 which has a positive power and of which at least one lens surface is aspheric; and a sixth lens L6 which has a negative power and of which at least one lens surface is aspheric (Basic Configuration 4).

Since the image side lens surface of the second lens L2 is configured as described above, it is possible to satisfactorily correct distortion.

Since the sixth lens L6 has a negative power, it is possible to further satisfactorily correct longitudinal chromatic aberration.

The central portion of the lens surface constituting the lens is a portion (an intersection point between the optical axis and the lens surface) where the lens surface intersects with the optical axis passing through the lens.

The imaging lens system of the embodiment of the invention may satisfy any one or both of the two Basic Configurations 3 and 4.

According to the basic configurations, it is possible to achieve an increase in angle of view, reduction in size, and improvement in optical performance.

<Additional Configurations Defining Basic Configurations of Imaging Lens System 200, and Effects and Advantages Thereof>

Next, components, which additionally define the basic configurations of the imaging lens system 200, and effects and advantages thereof will be described. Such components additionally defining the basic configurations are not an essential configuration for the imaging lens system according to the embodiment of the invention.

<<Configuration of Conditional Expressions Defining Said Basic Configuration, and Effects and Advantages Thereof>>

First, the following Conditional Expressions (11) to (19), which additionally define the basic configurations of the imaging lens system, and effects and advantages thereof will be described. The imaging lens system may satisfy only one of the Conditional Expressions (11) to (19), or may satisfy combination of two or more of the Conditional Expressions (11) to (19).

Definitions of parameters represented by the reference signs in the Conditional Expressions (11) to (19) are as follows.

f: a focal length of the imaging lens system, that is, a composite focal length of the first to sixth lenses L1 to L6 f1: a focal length of the first lens L1 f2: a focal length of the second lens L2 f3: a focal length of the third lens L3 f4: a focal length of the fourth lens L4 f5: a focal length of the fifth lens L5 f6: a focal length of the sixth lens L6 f12: a composite focal length of the first lens L1 and the second lens L2 f56: a composite focal length of the fifth lens L5 and the sixth lens L6 f123: a composite focal length of the first lens L1, the second lens L2, and the third lens L3 f456: a composite focal length of the fourth lens L4, the fifth lens L5, and the sixth lens L6

D1: a center thickness of the first lens L1

D4: an air space between the second lens L2 and the third lens L3

D5: a center thickness of the third lens L3 vd3: an Abbe number of the third lens L3 at the d-line vd5: an Abbe number of the fifth lens L5 at the d-line vd6: an Abbe number of the sixth lens L6 at the d-line L: a distance from the object side lens surface of the first lens L1 to the imaging plane Here, a value of the distance L is a value obtained by adding an air conversion distance of the back focal length to an actual distance in which the back focal length is subtracted from the distance L.

The back focal length Bf is an air conversion length from the image side lens surface R13 of the sixth lens L6 to the imaging plane R16.

$2.0 < f56/f < 5.5$, this relates to aberration correction.              Conditional Expression (11)

When the lens system is configured to satisfy Conditional Expression (11), it becomes easy to correct chromatic aberration and field curvature.

However, when the lens system is configured such that a value of f56/f exceeds the upper limit of Conditional Expression (11), that is, when $f56/f \geqq 5.5$ is satisfied, it becomes difficult to satisfactorily correct chromatic aberration.

When the lens system is configured such that a value of f56/f falls below the lower limit of Conditional Expression (11), that is, when $2.0 \geqq f56/f$ is satisfied, it becomes difficult to satisfactorily correct field curvature.

$2.5 < (D4+D5)/f < 5.5$, this relates to aberration correction and a size of the lens system.     Conditional Expression (12)

When the lens system is configured to satisfy Conditional Expression (12), it is possible to satisfactorily correct spherical aberration, distortion, and comatic aberration, and it is also possible to secure a long back focal length. As a result, it is possible to increase an angle of view and obtain adequate optical performance for the imaging lens system.

However, when the lens system is configured such that a value of (D4+D5)/f exceeds the upper limit of Conditional Expression (12), a diameter of the object side lens surface of the first lens L1 increases, and also the total length of the lens system increases. As a result, it becomes difficult to achieve reduction in size thereof.

In contrast, when the lens system is configured such that a value of (D4+D5)/f falls below the lower limit of Conditional Expression (12), it becomes difficult to satisfactorily correct spherical aberration and comatic aberration. As a result, it becomes difficult to form a fast lens (which has a small F number).

$4.0 < f3/f < 9.0$, this relates to lateral chromatic aberration and a back focal length.     Conditional Expression (13)

When the lens system is configured to satisfy Conditional Expression (13), it is possible to satisfactorily correct lateral chromatic aberration without a decrease in a back focal length.

However, when the lens system is configured such that a value of f3/f exceeds the upper limit of Conditional Expression (13), it becomes difficult to satisfactorily correct lateral chromatic aberration.

In contrast, when the lens system is configured such that a value of f3/f falls below the lower limit of Conditional Expression (13), it is possible to satisfactorily correct lateral chromatic aberration, but a back focal length decreases. As a result, it becomes difficult to insert various filters between the imaging device 10 and the imaging lens system 200.

$11 < L/f < 18$, this relates to an angle of view and a size of the apparatus. Conditional Expression (14)

When the lens system is configured to satisfy Conditional Expression (14), it is possible to achieve a wide-angle lens system with a small size.

However, when the lens system is configured such that a value of L/f exceeds the upper limit of Conditional Expression (14), it becomes easy to achieve an increase in angle of view, but a size of the lens system increases.

In contrast, when the lens system is configured such that a value of L/f falls below the lower limit of Conditional Expression (14), it is possible to downsize the lens system, but it becomes difficult to achieve an increase in angle of view.

$-4.2 < f6/f < -1.0$, this relates to lateral chromatic aberration and longitudinal chromatic aberration. Conditional Expression (15)

When the lens system is configured to satisfy Conditional Expression (15), it is possible to satisfactorily correct lateral chromatic aberration and longitudinal chromatic aberration.

However, when the lens system is configured such that a value of f6/f exceeds the upper limit of Conditional Expression (15), lateral chromatic aberration increases.

In contrast, when the lens system is configured such that a value of f6/f falls below the lower limit of Conditional Expression (15), a negative power of the fifth lens L5 decreases. As a result, it becomes difficult to satisfactorily correct longitudinal chromatic aberration.

$-2.0 < f12/f < -1.0$, this relates to an angle of view, a size of the apparatus, and aberration. Conditional Expression (16)

When the lens system is configured to satisfy Conditional Expression (16), it is possible to achieve a wide-angle lens system with a small size without increasing field curvature.

However, when the lens system is configured such that a value of f12/f exceeds the upper limit of Conditional Expression (16), it becomes easy to achieve an increase in angle of view, but field curvature increases.

In contrast, when the lens system is configured such that a value of f12/f falls below the lower limit of Conditional Expression (16), a negative power of the first lens L1 and second lens L2 disposed close to the object side becomes smaller. Accordingly, it becomes difficult to deflect rays, which passes through these lenses, at a large angle. As a result, it becomes difficult to achieve both of increasing an angle of view and reducing a size of the lens system.

$vd5/vd6 > 1.5$, this relates to longitudinal chromatic aberration and lateral chromatic aberration. Conditional Expression (17)

When the lens system is configured to satisfy Conditional Expression (17), it is possible to satisfactorily correct longitudinal chromatic aberration and lateral chromatic aberration.

However, when the lens system is configured such that a value of vd5/vd6 falls below the lower limit of Conditional Expression (17), it becomes difficult to satisfactorily correct longitudinal chromatic aberration and lateral chromatic aberration.

$-2.5 < f123/f456 < -0.5$, this relates to an angle of view, a back focal length, and aberration. Conditional Expression (18)

When the lens system is configured to satisfy Conditional Expression (18), it is possible to achieve an increase in angle of view and secure a predetermined back focal length without increasing field curvature.

However, when the lens system is configured such that a value of f123/f456 exceeds the upper limit of the Conditional Expression (18), it is becomes easy to achieve an increase in angle of view, but field curvature increases. As a result, it becomes difficult to form a fine image.

In contrast, when the lens system is configured such that a value of f123/f456 falls below the lower limit of the Conditional Expression (18), it becomes difficult to achieve both of increasing an angle of view and securing a predetermined back focal length. When a back focal length decreases, it becomes difficult to insert various filters and a cover glass between the image side lens surface and the light receiving surface of the imaging device 10.

$0.8 < D1/f$, this relates to impact resistance of the first lens L1. Conditional Expression (19)

When the lens system is configured to satisfy Conditional Expression (19), it is possible to increase hardness of the first lens L1 against various impacts in a case where the lens is used, for example, for an on-vehicle camera and the like.

However, when the lens system is configured such that a value of D1/f falls below the lower limit of Conditional Expression (19), a thickness of the first lens L1 decreases. As a result, the lens becomes brittle.

<<The Other Components Defining the Said Basic Configurations, and Effects and Advantages Thereof>>

Hereinafter, components other than the conditional expressions defining the lens system and effects and advantages thereof will be described.

Additional Definition of Materials for Forming Lens

Since the first lens L1 is made of glass, it is possible to fabricate an unbreakable imaging lens system with high anti-weatherability. Since the second to sixth lenses L2 to L6 are made of plastic, it is possible to accurately form an aspheric shape, and it is possible to provide a low-cost and lightweight lens system.

In order to further satisfactorily correct lateral chromatic aberration, it is preferred that each of the third lens L3 and the sixth lens L6 be made of a material having an Abbe number of 30 or less at the d-line.

In order to satisfactorily correct longitudinal chromatic aberration, it is preferred that each of the third lens L3 and the sixth lens L6 be made of a material having an Abbe number of 28 or less at the d-line.

Furthermore, it is preferred that each of the first lens L1, the second lens L2, the fourth lens L4, and the fifth lens L5 be made of a material having an Abbe number of 40 or more at the d-line. With such a configuration, it is possible to suppress occurrence of chromatic aberration, and also it is possible to obtain an excellent resolving performance.

Definition of Component Relating to Aperture Diaphragm

The defined condition of the aperture diaphragm in the imaging lens system 20 is also applicable to that of the imaging lens system 200.

Definition of Components Relating to First Lens

The defined condition of the first lens L1 in the imaging lens system 20 is also applicable to the first lens L1 of the imaging lens system 200.

Definition of Components Relating to Second Lens

The defined condition of the second lens L2 in the imaging lens system 20 is also applicable to the second lens L2 of the imaging lens system 200.

FIG. 29 shows a configuration (hereinafter, it is referred to as an exemplary configuration of the lens surface R3) in which "the central portion of lens surface R3 is convex (the central portion has a positive power) and the peripheral portion within the effective diameter range has a smaller positive power than the central portion". The reference signs and numerals, and the description thereof in FIG. 29 are the same as that of FIG. 2.

Definition of Components Relating to Third Lens

It is preferred that the third lens L3 have a positive power and the central portion of the object side lens surface R5 thereof be convex. With such a configuration, it is possible to further satisfactorily correct field curvature.

The third lens L3 may have a negative power.

It is preferred that the object side lens surface R5 of the third lens L3 be aspheric.

In addition, it is preferred that the central portion of the object side lens surface R5 of the third lens L3 be convex (the central portion has a positive power), and it is also preferred that the lens surface have a region, which has a larger positive power than the central portion, between the central portion and the peripheral portion within the effective diameter range.

"The central portion of the lens surface R5 is convex, and the lens surface has a region, which has a larger positive power than the central portion, between the central portion and the peripheral portion within the effective diameter range", this configuration (hereinafter, it is referred to as an exemplary configuration of the lens surface R5) is more specifically described as follows.

That is, the central portion is convex (it has a positive power), and the intersection point P5A is defined as a point where the optical axis Z1 intersects with the normal line H5A of the point X5A located on the lens surface R5 within the effective diameter range. Furthermore, an absolute value of radius of curvature of the lens surface R5 at the point X5A is defined as a length of the segment X5A-P5A which connects the point X5A to the intersection point P5A. In this case, the lens surface is configured to have the region, which has a smaller absolute value of radius of curvature than the central portion, between the central portion and the peripheral portion within the effective diameter range.

In addition, it may be possible to adopt a configuration in which the central portion of the object side lens surface R5 of the third lens L3 is convex and the peripheral portion within the effective diameter range has a larger positive power than the central portion.

"The central portion of the lens surface R5 is convex, and the peripheral portion within the effective diameter range has a larger positive power than the central portion" this configuration is more specifically described as follows.

That is, the central portion is convex (it has a positive power), and the intersection point P5 is defined as a point where the optical axis Z1 intersects with the normal line H5 of the point X5 located on the peripheral portion of the lens surface R5 within the effective diameter range. Furthermore, an absolute value of radius of curvature of the lens surface R5 at the point X5 is defined as a length of the segment X5-P5 which connects the point X5 to the intersection point P5. Further, the central portion C5 is defined as an intersection point between the lens surface R5 and the optical axis Z1. In this case, the exemplary configuration of the lens surface R5 is as follows. The lens surface R5 is convex (it has a positive power) on the optical axis Z1 (in the central portion C5). The intersection point P5 and the center of curvature E5 at the central portion C5 of the lens surface R5 are located closer to the image side than the central portion C5. A length (an absolute value of the radius of curvature R5x of the lens surface R5 at the point X5) of the segment X5-P5 is set smaller than an absolute value of the radius of curvature R5c of the lens surface R5 at the central portion C5.

As described above, it is possible to adopt the configuration in which the central portion of the object side lens surface R5 of the third lens L3 is convex and the lens surface has a region, which has a larger positive power than the central portion, between the central portion and the peripheral portion thereof within the effective diameter range. Alternatively, it is also possible to adopt the configuration in which the central portion of the object side lens surface R5 of the third lens L3 is convex and the peripheral portion within the effective diameter range has a larger positive power than the central portion. Accordingly, it is possible to satisfactorily correct field curvature while securing a long back focal length.

In addition, it is also possible to adopt the configuration in which the central portion of the object side lens surface R5 of the third lens L3 is convex (the central portion has a positive power), and the lens surface has a region, which has a larger positive power than the central portion, between the central portion and the peripheral portion thereof within the effective diameter range, and the peripheral portion within the effective diameter range has a smaller positive power than the central portion.

It is preferred that the image side lens surface R6 of the third lens L3 be aspheric.

In addition, it is preferred that the central portion of the image side lens surface R6 of the third lens L3 be concave and the peripheral portion within the effective diameter range have a larger negative power than the central portion.

Specifically, it is preferred that an absolute value of radius of curvature of the peripheral portion of the lens surface R6 within the effective diameter range be smaller than an absolute value of radius of curvature of the central portion of the lens surface R6.

As describe above, since the central portion of the image side lens surface R6 of the third lens L3 is concave and the peripheral portion within the effective diameter range has a larger negative power than the central portion, it is possible to satisfactorily correct field curvature and comatic aberration.

The R5x is defined as a radius of curvature of the object side lens surface R5 of the third lens L3 at the peripheral portion X5 within the effective diameter range. In this case, it is preferred that an absolute value (|X5-P5|) of the radius of curvature R5x be 0.4 to 1.5 times the absolute value of the radius of curvature R5c at the central portion C5.

Since an absolute value of the radius of curvature R5x is 0.4 to 1.5 times the absolute value of the radius of curvature R5c, it is possible to satisfactorily correct lateral chromatic aberration.

Definition of Components Relating to Fourth Lens

It is preferred that the image side lens surface R9 of the fourth lens L4 be aspheric.

It is preferred that the central portion of the image side lens surface R9 of the fourth lens L4 be convex and the peripheral portion within the effective diameter range have a smaller positive power than the central portion.

"The central portion of the lens surface R9 is convex, and the peripheral portion within the effective diameter range has a smaller positive power than the central portion", this configuration (hereinafter, it is referred to as an exemplary configuration of the lens surface R9) is more specifically described as follows.

That is, the central portion is convex (it has a positive power), and the intersection point P9 is defined as a point where the optical axis Z1 intersects with the normal line H9 of the point X9 located on the peripheral portion of the lens surface R9 within the effective diameter range. Furthermore, an absolute value of radius of curvature of the lens surface R9 at the point X9 is defined as a length of the segment X9-P9 which connects the point X9 to the intersection point P9. Further, the central portion C9 is defined as an intersection point between the lens surface R9 and the optical axis Z1. In this case, the exemplary configuration of the lens surface R9 is as follows. The lens surface R9 is convex (it has a positive power) on the optical axis Z1 (in the central portion C9). The intersection point P9 and the center of curvature E9 at the central portion C9 of the lens surface R9 are located closer to the image side than the central portion C9. A length (an absolute value of the radius of curvature R9$x$ of the lens surface R9 at the point X9) of the segment X9-P9 is set larger than an absolute value of the radius of curvature R9$c$ of the lens surface R9 at the central portion C9.

As described above, it is possible to adopt such a configuration in which the central portion C9 of the lens surface R9 is convex and the peripheral portion thereof within the effective diameter range has a smaller positive power than the central portion C9. Accordingly, it is possible to satisfactorily correct field curvature.

Definition of Components Relating to Fifth Lens

It is preferred that the object side lens surface R10 of the fifth lens L5 be aspheric.

It is preferred that the central portion of the object side lens surface R10 of the fifth lens L5 be concave (the central portion has a negative power) and the peripheral portion within the effective diameter range have a larger negative power than the central portion.

"The central portion of the lens surface R10 is concave, and the peripheral portion within the effective diameter range has a larger negative power than the central portion", this configuration (hereinafter, it is referred to as an exemplary configuration of the lens surface R10) is more specifically described as follows.

That is, the central portion is concave (it has a negative power), and the intersection point P10 is defined as a point where the optical axis Z1 intersects with the normal line H10 of the point X10 located on the peripheral portion of the lens surface R10 within the effective diameter range. Furthermore, an absolute value of radius of curvature of the lens surface R10 at the point X10 is defined as a length of the segment X10-P10 which connects the point X10 to the intersection point P10. Further, the central portion C10 is defined as an intersection point between the lens surface R10 and the optical axis Z1. In this case, the exemplary configuration of the lens surface R10 is as follows. The lens surface R10 is concave (it has a negative power) on the optical axis Z1 (in the central portion C10). The intersection point P10 and the center of curvature E10 at the central portion C10 of the lens surface R10 are located closer to the object side than the central portion C10. A length (an absolute value of the radius of curvature R10$x$ of the lens surface R10 at the point X10) of the segment X10-P10 is set smaller than an absolute value of the radius of curvature R10$c$ of the lens surface R10 at the central portion C10.

Further, it may be possible to adopt a configuration in which the central portion of the object side lens surface R10 of the fifth lens L5 is convex (the central portion has a positive power) and the peripheral portion within the effective diameter range has a negative power.

"The central portion of the lens surface R10 is convex, and the peripheral portion within the effective diameter range has a negative power", this configuration is more specifically described as follows.

That is, the central portion is convex (it has a positive power), and the intersection point P10 is defined as a point where the optical axis Z1 intersects with the normal line H10 of the point X10 located on the peripheral portion of the lens surface R10 within the effective diameter range. Furthermore, an absolute value of radius of curvature of the lens surface R10 at the point X10 is defined as a length of the segment X10-P10 which connects the point X10 to the intersection point P10. Further, the central portion C10 is defined as an intersection point between the lens surface R10 and the optical axis Z1. In this case, the configuration in which "the central portion of the lens surface R10 is convex, and the peripheral portion within the effective diameter range has a negative power" is as follows. The lens surface R10 is convex (it has a positive power) on the optical axis Z1 (in the central portion C10). The center of curvature E10 at the central portion C10 of the lens surface R10 is located closer to the object side than the central portion C10. The intersection point P10 is located closer to the image side than the central portion C10.

As described above, it is possible to adopt such a configuration in which the central portion of the object side lens surface R10 of the fifth lens L5 is concave (the central portion has a negative power) and the peripheral portion within the effective diameter range have a larger negative power than the central portion. Alternatively, it is possible to adopt such a configuration in which the central portion is convex and the peripheral portion within an effective diameter range is concave. Accordingly, it is possible to satisfactorily correct field curvature.

It is preferred that the image side lens surface R11 of the fifth lens L5 be aspheric.

In addition, it is preferred that the central portion of the image side lens surface R11 of the fifth lens L5 be convex (the central portion has a positive power) and the peripheral portion within the effective diameter range have a smaller positive power than the central portion.

"The central portion of the lens surface R11 is convex and the peripheral portion within the effective diameter range has a smaller positive power than the central portion", this configuration (hereinafter, it is referred to as an exemplary configuration of the lens surface R11) is more specifically described as follows.

That is, the central portion is convex (it has a positive power), and the intersection point P11 is defined as a point where the optical axis Z1 intersects with the normal line H11 of the point X11 located on the peripheral portion of the lens surface R11 within the effective diameter range. Furthermore, an absolute value of radius of curvature of the lens surface R11 at the point X11 is defined as a length of the segment X11-P11 which connects the point X11 to the intersection point P11. Further, the central portion C11 is defined as an intersection point between the lens surface R11 and the optical axis Z1. In this case, the exemplary configuration of the lens surface R11 is as follows. The lens surface R11 is convex (it has a positive power) on the optical axis Z1 (in the central portion C11). The intersection point P11 and the center of curvature E11 at the central portion C11 of the lens surface R11 are located closer to the object side than the central portion C11. A length (an absolute value of the radius of curvature R11$x$ of the lens surface R11 at the point X11) of the segment X11-P11 is set larger than an absolute value of the radius of curvature R11c of the lens surface R11 at the central portion C1.

As described above, it is possible to adopt such a configuration in which the central portion of the image side lens surface R11 of the fifth lens L5 is convex (the central portion has a positive power), and the peripheral portion within the effective diameter range have a smaller positive power than the central portion. Accordingly, it is possible to satisfactorily correct spherical aberration.

Definition of Components Relating to Sixth Lens

It is preferred that the object side lens surface R12 of the sixth lens L6 be aspheric.

In addition, it is preferred that the central portion of the object side lens surface R12 of the sixth lens L6 be concave (the central portion has a negative power), and it is also preferred that the peripheral portion within the effective diameter range have a smaller negative power than the central portion.

"The central portion of the lens surface R12 is concave, and the peripheral portion within the effective diameter range has a smaller negative power than the central portion" this configuration (hereinafter, it is referred to as an exemplary configuration of the lens surface R12) is more specifically described as follows.

That is, the central portion is concave (it has a negative power), and the intersection point P12 is defined as a point where the optical axis Z1 intersects with the normal line H12 of the point X12 located on the peripheral portion of the lens surface R12 within the effective diameter range. Furthermore, an absolute value of radius of curvature of the lens surface R12 at the point X12 is defined as a length of the segment X12-P12 which connects the point X12 to the intersection point P12. Further, the central portion C12 is defined as an intersection point between the lens surface R12 and the optical axis Z1. In this case, the exemplary configuration of the lens surface R12 is as follows. The lens surface R12 is concave (it has a negative power) on the optical axis Z1 (in the central portion C12). The intersection point P12 and the center of curvature E12 at the central portion C12 of the lens surface R12 are located closer to the object side than the central portion C12. A length (an absolute value of the radius of curvature R12x of the lens surface R12 at the point X12) of the segment X12-P12 is set larger than an absolute value of the radius of curvature R12c of the lens surface R12 at the central portion C12.

As described above, since the central portion of the lens surface R12 of the sixth lens L6 is concave (the central portion has a negative power) and the peripheral portion within the effective diameter range has a smaller negative power than the central portion, it is possible to satisfactorily correct chromatic aberration and field curvature.

It is preferred that the image side lens surface R13 of the sixth lens L6 be aspheric.

In addition, it is preferred that the central portion of the image side lens surface R13 of the sixth lens L6 be convex (the central portion has a positive power) and the peripheral portion within the effective diameter range have a smaller positive power than the central portion.

"The central portion of the lens surface R13 is convex and the peripheral portion within the effective diameter range has a smaller positive power than the central portion", this configuration (hereinafter, it is referred to as an exemplary configuration of the lens surface R13) is more specifically described as follows.

That is, the central portion is convex (it has a positive power), and the intersection point P13 is defined as a point where the optical axis Z1 intersects with the normal line H13 of the point X13 located on the peripheral portion of the lens surface R13 within the effective diameter range. Furthermore, an absolute value of radius of curvature of the lens surface R13 at the point X13 is defined as a length of the segment X13-P13 which connects the point X13 to the intersection point P13. Further, the central portion C13 is defined as an intersection point between the lens surface R13 and the optical axis Z1. In this case, the exemplary configuration of the lens surface R13 is as follows. The lens surface R13 is convex (it has a positive power) on the optical axis Z1 (in the central portion C13). The intersection point P13 and the center of curvature E13 at the central portion C13 of the lens surface R13 are located closer to the object side than the central portion C13. A length (an absolute value of the radius of curvature R13x of the lens surface R13 at the point X13) of the segment X13-P13 is set larger than an absolute value of the radius of curvature R13c of the lens surface R13 at the central portion C13.

Further, it may be possible to adopt a configuration in which the central portion of the image side lens surface R13 of the fifth lens L6 is convex (the central portion has a positive power) and the peripheral portion within the effective diameter range has a negative power.

"The central portion of the lens surface R13 is convex, and the peripheral portion within the effective diameter range has a negative power", this configuration is more specifically described as follows.

That is, the central portion is convex (it has a positive power), and the intersection point P13 is defined as a point where the optical axis Z1 intersects with the normal line H13 of the point X13 located on the peripheral portion of the lens surface R13 within the effective diameter range. Furthermore, an absolute value of radius of curvature of the lens surface R13 at the point X13 is defined as a length of the segment X13-P13 which connects the point X13 to the intersection point P13. Further, the central portion C13 is defined as an intersection point between the lens surface R13 and the optical axis Z1. In this case, the configuration in which "the central portion of the lens surface R13 is convex, and the peripheral portion within the effective diameter range has a negative power" is as follows. The lens surface R13 is convex (it has a positive power) on the optical axis Z1 (in the central portion C13). The center of curvature E13 at the central portion C13 of the lens surface R13 is located closer to the object side than the central portion C13. The intersection point P13 is located closer to the image side than the central portion C13.

As described above, it is possible to adopt the configuration in which the central portion of the image side lens surface R13 of the sixth lens L6 is convex, and the peripheral portion within the effective diameter range has a smaller positive power than the central portion. Alternatively, it is possible to adopt the configuration in which the central portion of the lens surface R13 is convex and the peripheral portion within the effective diameter range is concave (the peripheral portion has a negative power). Accordingly, it is possible to satisfactorily correct spherical aberration and comatic aberration.

The R12x is defined as a radius of curvature of the object side lens surface R12 of the sixth lens L6 at the peripheral portion X12 within the effective diameter range. In this case, it is preferred that an absolute value (|X12-P12|) of the radius of curvature R12x be not less than 1.5 times the absolute value of the radius of curvature R12c at the central portion C13.

As described above, since an absolute value of the radius of curvature R12x is not less than 1.5 times the absolute value of the radius of curvature R12c, it is possible to satisfactorily correct chromatic aberration and field curvature.

The R13x is defined as a radius of curvature of the image side lens surface R13 of the sixth lens L6 at the peripheral portion X13 within the effective diameter range. In this case, it is preferred that an absolute value (|X13-P13|) of the radius of curvature R13x be not less than 2 times the absolute value of the radius of curvature R13c at the central portion C13.

As described above, since an absolute value of the radius of curvature R13x is not less than 2 times the absolute value of the radius of curvature R13c, it is possible to satisfactorily correct spherical aberration and comatic aberration.

Definition of the Other Components

In the imaging lens system according to the embodiment of the invention, assuming that an ideal image height is 2f×tan (θ/2), it is preferred that distortion be in the range of ±10%.

Since rays passing through the outside of the effective diameter ranges of the first lens L1 and the second lens L2 reach the imaging plane as stray light and become a ghost image, it is preferred to shield the stray light by providing light shielding plates Sk1 and Sk2, which are light shielding means, on areas out of the effective diameter ranges on the first lens L1 and the second lens L2.

The light shielding means can be realized by adopting a configuration in which a light shielding plate is disposed on the area out of the effective diameter range on the lens or the area out of the effective diameter range on the lens is coated with a light-shielding coating material.

Further, the light shielding means may be disposed between the first lens L1 and the second lens L2, if necessary. Furthermore, the light shielding means may be disposed on the areas out of the effective diameter ranges on the second to sixth lenses L2 to L6 or may be disposed between these lenses.

It is preferred that the second to sixth lenses L2 to L6 be made of plastic (resin material).

As a lens material applicable to the second to sixth lenses L2 to L6, a so-called nanocomposite material may be used, in which particulates having smaller sizes than wavelengths of light are mixed with a resin material.

Each lens of the first to sixth lenses L1 to L6 is not limited to a lens made of a material having a constant refractive index, and a gradient index lens may be applied to at least one of the six lenses.

Each lens of the second to sixth lenses L2 to L6 is not limited to a lens having at least one aspheric surface, and may be formed as a lens having a diffractive optical surface. That is, a diffractive optical element may be formed on at least one lens surface of the second to sixth lenses L2 to L6.

Since at least one lens surface of each lens of the second to sixth lenses L2 to L6 is aspheric, it is possible to satisfactorily correct spherical aberration, field curvature, comatic aberration, and distortion while maintaining a wide angle.

It is preferred that the first lens be made of glass and the second to sixth lenses be made of plastic.

When the imaging lens system is mounted on, for example, an on-vehicle camera or a surveillance camera used under a severe environment, a material of the first lens L1 is required to have high antiweatherability. Accordingly, it is preferred to use a material excellent in water resistance, acid resistance, chemical resistance, and the like.

In addition, it is preferred that the first lens L1 be made of a durable material.

It is preferred that the first lens L1 be made of glass. The first lens L1 may be made of transparent ceramics.

Since the first lens L1 is formed as a glass lens, it is possible to realize an unbreakable lens with high antiweatherability.

Further, the first lens L1 is not limited to be formed as a spherical glass lens. An aspheric glass lens of which one or both of lens surfaces is aspheric may be used in the first lens L1. Since the lens surface of the first lens L1 is aspheric, it is possible to further satisfactorily correct various aberrations.

Since the second to sixth lenses L2 to L6 are made of plastic, it is possible to accurately form an aspheric shape. In addition, it is possible to fabricate the lens system with low costs.

The both surface of each lens of the second to sixth lenses L2 to L6 may be aspheric.

Further, it is preferred that a cemented lens be not used in the lens system.

When a cemented lens is used, it is possible to easily correct chromatic aberration, but costs increase. By adopting the configurations according to the embodiments of the invention, it is possible to fabricate a high-performance lens capable of correcting chromatic aberration without using a cemented lens.

SPECIFIC EXAMPLES

Hereinafter, numerical data and the like of the imaging lens systems according to Examples 1 to 12 of the invention will be described with reference to FIGS. 3 to 27 and 30 to 42. Furthermore, FIGS. 3 to 10 are sectional diagrams illustrating schematic configurations of the imaging lens systems according to Examples 1 to 8, respectively. The reference numerals and signs of FIGS. 3 to 8 corresponding to those of FIGS. 1 and 2 denote the corresponding components. Further, FIGS. 30 to 33 are sectional diagrams illustrating schematic configurations of the imaging lens systems according to Examples 9 to 12, respectively. The reference numerals and signs of FIGS. 30 to 33 corresponding to those of FIGS. 28 and 29 denote the corresponding components.

FIGS. 11 to 18 and 34 to 37 are diagrams showing basic data of the imaging lens systems according to Examples 1 to 12. In each diagram, the upper left part thereof (table A in each diagram) shows lens data, and the upper central part thereof (table B in each diagram) shows an outline specification of the imaging lens system. Furthermore, the lower left part thereof (table C in each diagram) shows coefficients of the aspheric expression representing shapes of lens surfaces (shapes of aspheric surfaces). Further, the lower right part thereof (table D in each diagram) shows absolute values of radius of curvature at the peripheral portions of the lens surfaces within the effective diameter range.

In the lens data of each upper left part of FIGS. 11 to 18 and 34 to 37, each surface of optical members such as lens is represented by the sequential number of i-th (i=1, 2, 3 . . . ) surface that sequentially increases as it gets closer to the image side from the object side. Furthermore, in the lens data, a surface number (i=7) of the aperture diaphragm St and surface numbers (i=14, 15) of the object side surface and the image side surface of the optical member Cg1 which is a plane parallel plate, a surface number (i=16) of the imaging plane, and the like are also noted. Further, the reference sign * is noted on each surface number of aspheric surfaces.

Ri represents a paraxial radius of curvature of the i-th (i=1, 2, 3 . . . ) surface, and Di represents an on-axis surface spacing on the optical axis Z1 between the i-th (i=1, 2, 3 . . . ) surface and the (i+1)th surface. In addition, the reference sign Ri of the lens data corresponds to the reference sign Ri (i=1, 2, 3 . . . ) representing each lens surface in FIG. 1 or 28.

In each lens data, Ndj represents a refractive index at the d-line (a wavelength of 587.6 nm) in a j-th (j=1, 2, 3 . . . ) optical element of which the sequential number sequentially increases as it gets closer to the image side from the object side. In addition, νdj represents an Abbe number of the j-th optical element at the d-line.

In addition, the unit of the paraxial radius of curvature and the on-axis surface spacing is mm. In addition, the paraxial radius of curvature has a positive value when it is convex toward the object side, and the paraxial radius of curvature has a negative value when it is convex toward the image side.

Furthermore, each aspheric surface is defined by the following aspheric expression.

$$Z = \frac{Y^2/R}{1+(1-K\cdot Y^2/R^2)^{1/2}} + \sum_{i=3}^{20} AiY^i \quad \text{(Numerical Expression 1)}$$

Z: an aspheric depth (a length of a perpendicular from a point on an aspheric surface, which has a height of Y, to a tangential plane, which is perpendicular to the optical axis, of the vertex of the aspheric surface) (mm)
Y: a height (a distance from the optical axis) (mm)
R: a paraxial radius of curvature (mm)
Ai: an aspheric coefficient (i=30 to 20)
K: a conic constant The outline specification in each upper central part of FIGS. 11 to 18 and 33 to 37 shows values of the following data.

F number: Fno, half angle of view: ω, image height: IH, back focal length: Bf (in Air), distance from the object side lens surface of the first lens L1 to the imaging plane: L, effective ray diameter: ED, focal length of the whole lens system (composite focal length of the first to sixth lenses L1 to L6): f, focal length of the first lens L1: f1, focal length of the second lens L2: f2, focal length of the third lens L3: f3, focal length of the fourth lens L4: f4, focal length of the fifth lens L5: f5, focal length of the sixth lens L6: f6, and composite focal length of the fourth lens L4 and the fifth lens L5: f45, these data are shown therein. In addition, composite focal length of the first lens L1 and the second lens L2: f12, composite focal length of the fifth lens L5 and the sixth lens L6: f56, composite focal length of the first lens L1, the second lens L2, and the third lens L3: f123, composite focal length of the fourth lens L4, the fifth lens L5, and the sixth lens L6: f456, these data are also shown therein.

A value of the distance L is a value obtained by adding an air conversion distance of the back focal length to an actual distance in which the back focal length is subtracted from the distance L, as described above.

In addition, the lower left part of FIGS. 11 to 18 and 33 to 37 shows values of coefficients K, A3, A4, A5 of the aspheric expression representing the aspheric surfaces Ri (i=3, 4 . . . ).

FIG. 19 is a diagram showing values of various parameters in Conditional Expressions (1) to (8) for each of Examples 1 to 8. FIG. 38 is a diagram showing values of various parameters in Conditional Expressions (11) to (19) for each of Examples 9 to 12.

FIGS. 20 to 27 and 39 to 42 are diagrams illustrating various aberrations of the imaging lens systems according to Examples 1 to 12. Each of FIGS. 20 to 27 and 39 to 42 shows aberrations at the d-line (a wavelength of 587.6 nm), the F-line (a wavelength of 486.1 nm), and the C-line (a wavelength of 656.3 nm) for each imaging lens system of the examples.

In addition, each distortion diagram shows an amount of deviation when an ideal image height is set as 2f×tan (θ/2) by use of a focal length f of the whole lens system and an angle of view θ (which is assumed as a variable in the range of 0≦θ≦ω).

A peripheral portion within an effective diameter range on a lens surface of a rotationally symmetric lens is generally a circular area formed at a certain distance from the optical distance of the lens. The circular area corresponds to an edge of the effective area on the lens surface.

As can be seen from the drawings showing basic data and various aberrations according to Examples 1 to 12, the wide-angle imaging lens systems according to the embodiments of the invention are configured to be able to achieve improvement in optical performance and reduction in size by optimizing materials and shapes of the six lenses.

The invention is not limited to the embodiments and the examples, and may be modified into various forms. For example, the values of radius of curvature, the on-axis surface spacing, and the refractive index in the lens components are not limited to the numerical values shown in the drawings, and may have different values.

The imaging lens systems according to the embodiments of the invention is also configured to be able to achieve reduction in size of the lens system and fabricate the lens system with low costs by using plural aspheric surfaces in the second lens L2 and the other lenses subsequent thereto.

What is claimed is:

1. An imaging lens system consisting of: in order from an object side thereof,
    a first lens which has a negative power;
    a second lens which has a negative power;
    a third lens;
    a fourth lens which has a positive power;
    a fifth lens; and
    a sixth lens which has a positive power,
    wherein
    the first lens is made of glass,
    the second to sixth lenses are made of plastic,
    at least one lens surface of each of the second to sixth lenses is aspheric, and
    each of the third lens and the fifth lens is made of a material having an Abbe number of 45 or less at the d-line, wherein
    a stop is disposed between the third lens and the fourth lens, and
    the following Conditional Expression (2) is satisfied:

$2.5 < (D4+D5)/f < 5.5$ \hfill (2), where D4 is an air space between the second lens and the third lens,
    D5 is a center thickness of the third lens, and
    f is a focal length of the imaging lens system.

2. The imaging lens system according to claim 1, wherein the third lens has a positive power and has an object side lens surface of which a central portion is convex.

3. The imaging lens system according to claim 1, wherein the fifth lens has a negative power.

4. The imaging lens system according to claim 1, wherein the following Conditional Expression (3) is satisfied:

$-0.1 < f/f3 < 0.5$ \hfill (3), wherein
    f3 is a focal length of the third lens, and
    f is a focal length of the imaging lens system.

5. The imaging lens system according to claim 1, wherein the following Conditional Expression (4) is satisfied:

$7 < L/f < 18$ \hfill (4), wherein f is a focal length of the imaging lens system, and L is a distance from an object side lens surface of the first lens to an imaging plane.

6. An imaging apparatus comprising:

an imaging lens system according to claim 1; and an imaging device which converts an optical image formed by the imaging lens system into an electric signal.

7. An imaging lens system comprising: in order from an object side thereof, a first lens which has a negative power and is a meniscus lens having a surface concave toward an image side of the imaging lens system;

a second lens which has a negative power and of which at least one lens surface is aspheric;

a third lens which has a positive power and in which at least an object side lens surface is aspheric, a central portion of the lens surface is convex, and the lens surface has a region, which has a larger positive power than the central portion, between the central portion and the peripheral portion within an effective diameter range;

a fourth lens which has a positive power and of which at least one lens surface is aspheric;

a fifth lens of which at least one lens surface is aspheric; and a sixth lens which has a positive power and of which at least one lens surface is aspheric.

8. The imaging lens system according to claim 7, wherein the following Conditional Expression (1) is satisfied:

$$2.0<f45/f<5.0 \qquad (1),$$

wherein f45 is a composite focal length of the fourth lens and the fifth lens, and f is a focal length of the imaging lens system.

9. An imaging lens system comprising: in order from an object side thereof, a first lens which has a negative power;

a second lens which has a negative power;

a third lens;

a fourth lens which has a positive power;

a fifth lens which has a positive power; and a sixth lens which has a negative power, wherein at least one lens surface of each of the second to sixth lenses is aspheric, and each of the third lens and the sixth lens is made of a material having an Abbe number of 45 or less at the d-line.

10. The imaging lens system according to claim 9, wherein a stop is disposed between the third lens and the fourth lens.

11. The imaging lens system according to claim 9, wherein the third lens has a positive power and has an object side lens surface of which a central portion is convex.

12. The imaging lens system according to claim 9, wherein the following Conditional Expression (12) is satisfied:

$$2.5<(D4+D5)/f<5.5 \qquad (12),$$

wherein f is a focal length of the imaging lens system,

D4 is an air space between the second lens and the third lens, and

D5 is a center thickness of the third lens.

13. The imaging lens system according to claim 9, wherein the following Conditional Expression (13) is satisfied:

$$4.0<f3/f<9.0 \qquad (13),$$

wherein f is a focal length of the imaging lens system, and f3 is a focal length of the third lens.

14. The imaging lens system according to claim 9, wherein the following Conditional Expression (14) is satisfied:

$$11<L/f<18 \qquad (14),$$

wherein f is a focal length of the imaging lens system, and

L is a distance from an object side lens surface of the first lens to an imaging plane.

15. An imaging apparatus comprising:

an imaging lens system according to claim 9; and an imaging device which converts an optical image formed by the imaging lens system into an electric signal.

16. An imaging lens system comprising: in order from an object side thereof, a first lens which has a negative power and is a meniscus lens having a surface concave toward an image side of the imaging lens system;

a second lens in which at least an image side lens surface is aspheric, a central portion of the lens surface is concave, and a peripheral portion thereof within an effective diameter range has a smaller negative power than the central portion;

a third lens of which at least one lens surface is aspheric;

a fourth lens which has a positive power and of which at least one lens surface is aspheric;

a fifth lens which has a positive power and of which at least one lens surface is aspheric; and a sixth lens which has a negative power and of which at least one lens surface is aspheric.

17. The imaging lens system according to claim 16, wherein the following Conditional Expression (11) is satisfied:

$$2.0<f56/f<5.5 \qquad (11),$$

wherein f is a focal length of the imaging lens system, and f56 is a composite focal length of the fifth lens and the sixth lens.

18. An imaging lens system consisting of: in order from an object side thereof, a first lens which has a negative power;

a second lens which has a negative power;

a third lens;

a fourth lens which has a positive power;

a fifth lens; and a sixth lens which has a positive power, wherein the first lens is made of glass, the second to sixth lenses are made of plastic, at least one lens surface of each of the second to sixth lenses is aspheric, and each of the third lens and the fifth lens is made of a material having an Abbe number of 45 or less at the d-line, wherein a stop is disposed between the third lens and the fourth lens, and the fifth lens is a meniscus lens the concave surface of which is toward the object side.

* * * * *